(12) United States Patent
Saito et al.

(10) Patent No.: US 11,587,434 B2
(45) Date of Patent: Feb. 21, 2023

(54) INTELLIGENT VEHICLE PASS-BY INFORMATION SHARING

(71) Applicant: International Business Machines Corporation, Armonk, NY (US)

(72) Inventors: Akira Saito, Ichikawa (JP); Hayato Uenohara, Funabashi (JP); Hiroki Yoshinaga, Tokyo (JP); Kazuhiro Konno, Ichikawa (JP); Masakuni Okada, Abiko (JP); Takeyuki Shimura, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 391 days.

(21) Appl. No.: 16/451,370

(22) Filed: Jun. 25, 2019

(65) Prior Publication Data
US 2020/0410851 A1   Dec. 31, 2020

(51) Int. Cl.
*G08G 1/16* (2006.01)
*G08G 1/09* (2006.01)
(Continued)

(52) U.S. Cl.
CPC ......... *G08G 1/0145* (2013.01); *G08G 1/0112* (2013.01); *G08G 1/091* (2013.01);
(Continued)

(58) Field of Classification Search
CPC .... G08G 1/0145; G08G 1/0112; G08G 1/091; G08G 1/096708; G08G 1/096741; G08G 1/162; H04W 4/46
See application file for complete search history.

(56) References Cited

U.S. PATENT DOCUMENTS 9,997,074 B2 *  6/2018  Kim ................. G08G 1/096741
10,535,257 B2    1/2020  Ishikawa
(Continued)

FOREIGN PATENT DOCUMENTS

CN   106604853 A   4/2017
CN   106875751 A   6/2017
(Continued)

OTHER PUBLICATIONS

List of IBM Patents or Patent Applications Treated as Related, Jun. 25, 2019, 2 pgs.
(Continued)

*Primary Examiner* — Adam D Tissot
*Assistant Examiner* — Laura E Linhardt
(74) *Attorney, Agent, or Firm* — Mark Bergner

(57) ABSTRACT

A device and related method are associated with a focus vehicle. The device comprises a sensor that senses area information about an information area usable to assist the focus vehicle and an oncoming vehicle to pass each other, a transmitter that broadcasts the area information via a vehicle-to-vehicle network protocol, and a controller. The controller produces an assisting result from the area information and vehicle information related to the focus vehicle and the oncoming vehicle. The vehicle information includes first distance information of the focus vehicle from the information area, and second distance information of the oncoming vehicle from the information area. The device includes a display that displays virtual traffic information representing at least stopping and proceeding of the focus vehicle onto a windshield of the vehicle.

20 Claims, 29 Drawing Sheets

(51) Int. Cl.
*G08G 1/07* (2006.01)
*G08G 1/0967* (2006.01)
*G08G 1/01* (2006.01)
*H04W 4/46* (2018.01)

(52) U.S. Cl.
CPC . *G08G 1/096708* (2013.01); *G08G 1/096741* (2013.01); *G08G 1/162* (2013.01); *H04W 4/46* (2018.02)

(56) References Cited

U.S. PATENT DOCUMENTS

| | | | |
|---|---|---|---|
| 10,583,843 | B2 | 3/2020 | Tamagaki |
| 10,834,552 | B1 | 11/2020 | Saito |
| 11,017,670 | B2 | 5/2021 | Cunningham |
| 2016/0086305 | A1 | 3/2016 | Watanabe |
| 2017/0336629 | A1* | 11/2017 | Suzuki ................ G05D 1/0253 |
| 2018/0173970 | A1 | 6/2018 | Bayer et al. |
| 2019/0122540 | A1 | 4/2019 | Ishikawa et al. |
| 2019/0272756 | A1* | 9/2019 | Naito .................... B60L 3/0015 |
| 2019/0375410 | A1 | 12/2019 | Zinner |
| 2020/0385020 | A1 | 12/2020 | Komuro |

FOREIGN PATENT DOCUMENTS

| | | |
|---|---|---|
| CN | 206374737 U | 8/2017 |
| CN | 107709126 A | 2/2018 |
| CN | 109030021 A | 12/2018 |
| CN | 109416542 A | 3/2019 |
| CN | 109774626 A | 5/2019 |
| CN | 109922439 A | 5/2019 |
| CN | 110789450 A | 2/2020 |
| CN | 110796853 A | 2/2020 |
| CN | 111942378 A | 11/2020 |
| CN | 113593224 A | 11/2021 |
| CN | 113906486 A | 1/2022 |
| CN | 112634632 B | 5/2022 |
| CN | 216623479 U | 5/2022 |
| DE | 112020002330 T5 | 2/2022 |
| EP | 3187389 A1 | 7/2017 |
| GB | 2600278 A | 4/2022 |
| JP | 2004203365 A | 7/2004 |
| JP | 2005202678 A | 7/2005 |
| JP | 2010202194 A | 9/2010 |
| WO | 2018003866 A1 | 1/2018 |
| WO | 2018116795 A1 | 6/2018 |
| WO | 2018163856 A1 | 9/2018 |
| WO | 2019071065 A1 | 4/2019 |
| WO | 2020261000 A1 | 12/2020 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

Saito et al., "Intelligent Vehicle Pass-By Information Sharing," U.S. Appl. No. 16/451,435, filed Jun. 25, 2019.

Sekisui Chemical Co., Ltd., "Development of Interlayer film t meet the demands to increase the amount of Information displayed on a vehicle windshield," https://www.sekisuichemical.com/whatsnew/2015/1275380_23622.html. Press Release, Dec. 8, 2015, 6 pgs.

PCT International Search Report, PCT/IB2020/055280, filed Jun. 4, 2020, 9 pages, dated Sep. 18, 2020.

Chinese Office Action dated Jul. 8, 2022 from Chinese Application No. CN202080038102.6 filed Jun. 4, 2020.

* cited by examiner

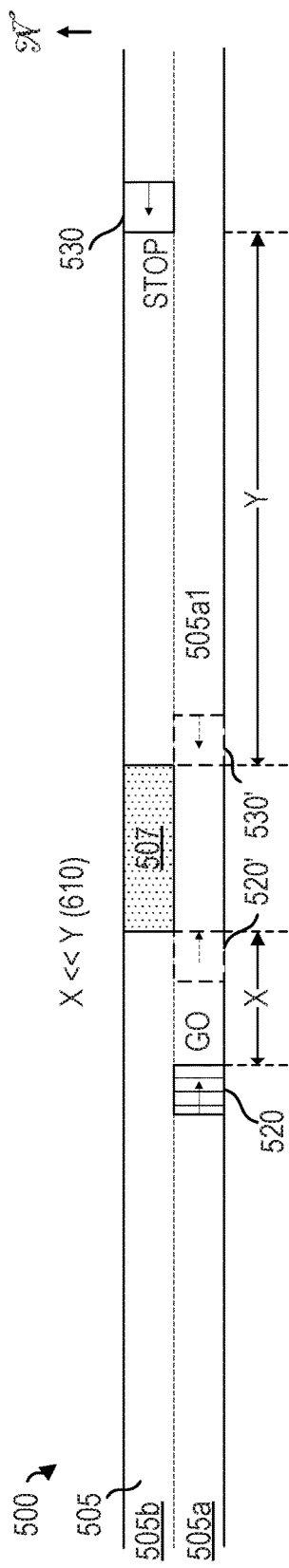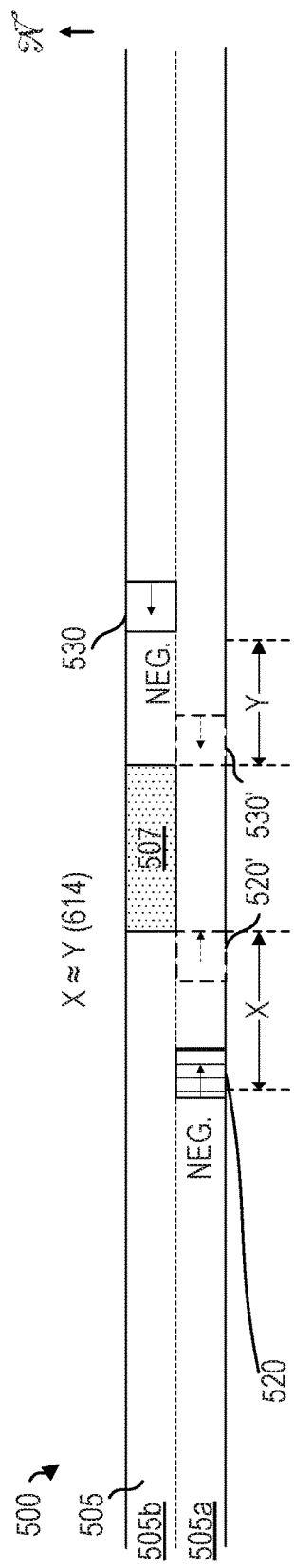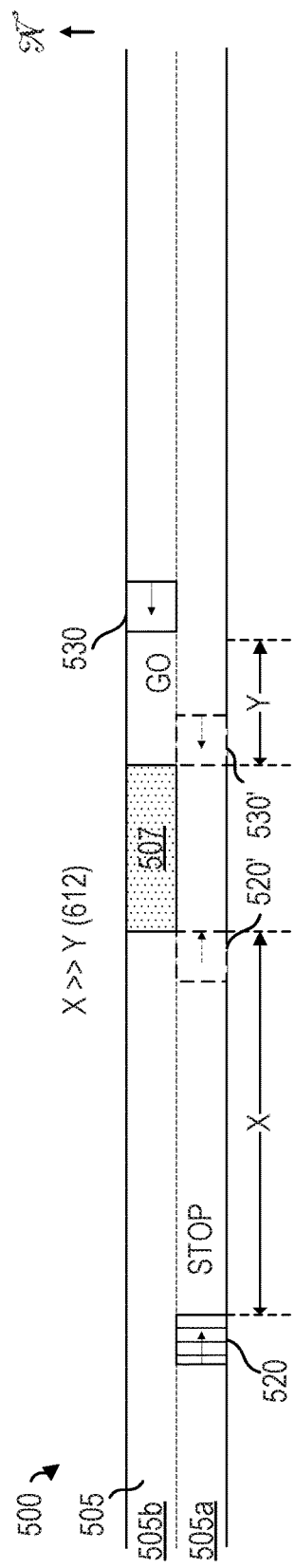

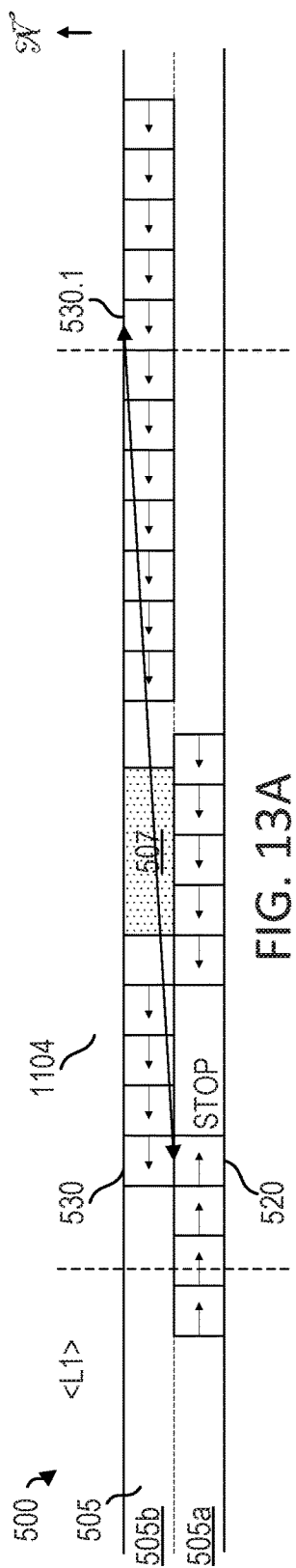
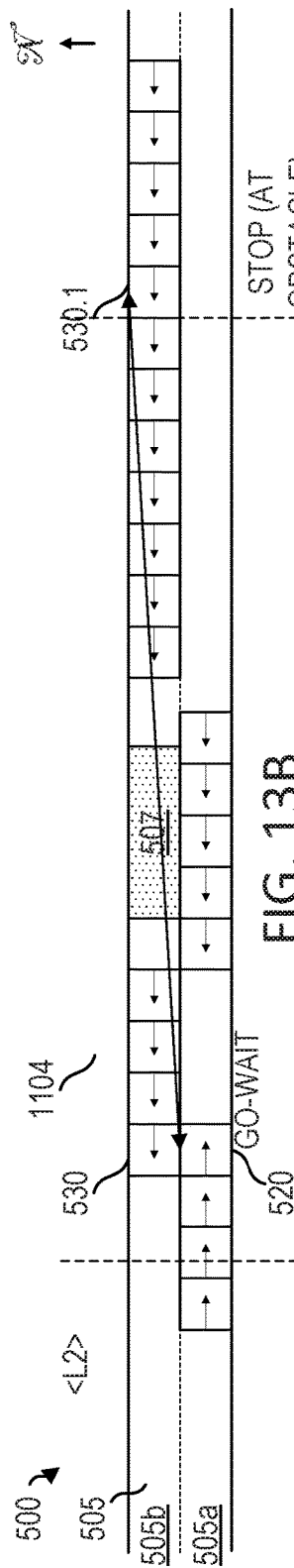
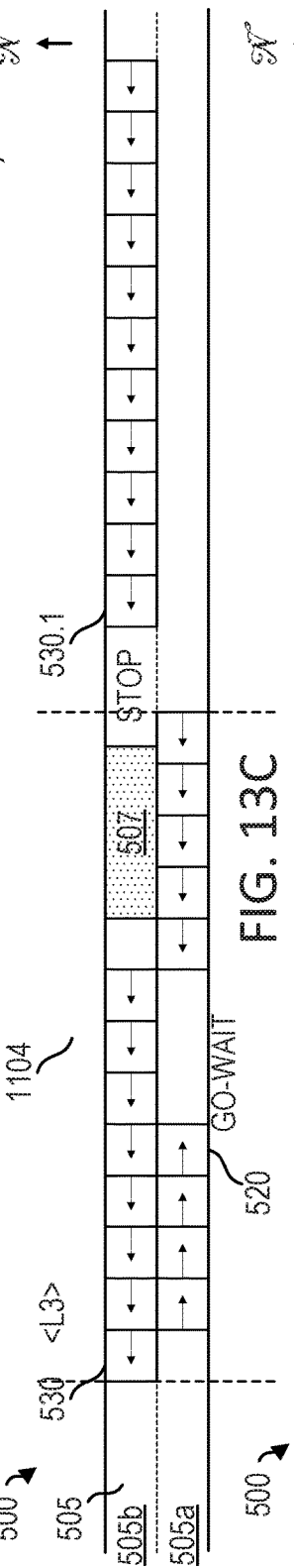
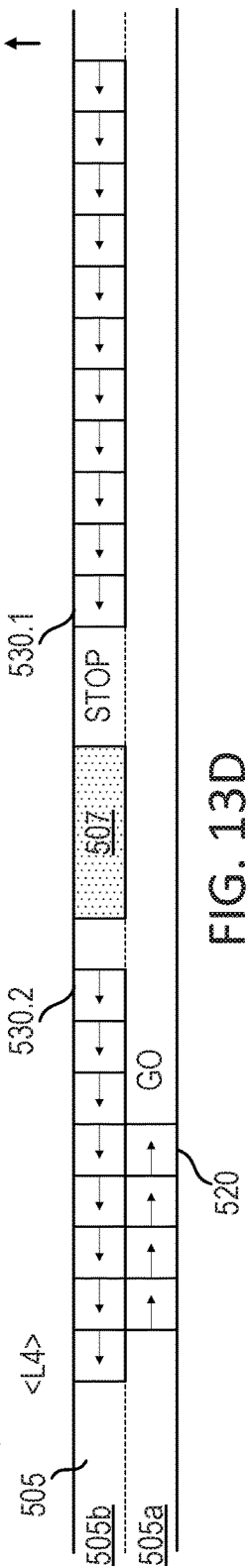

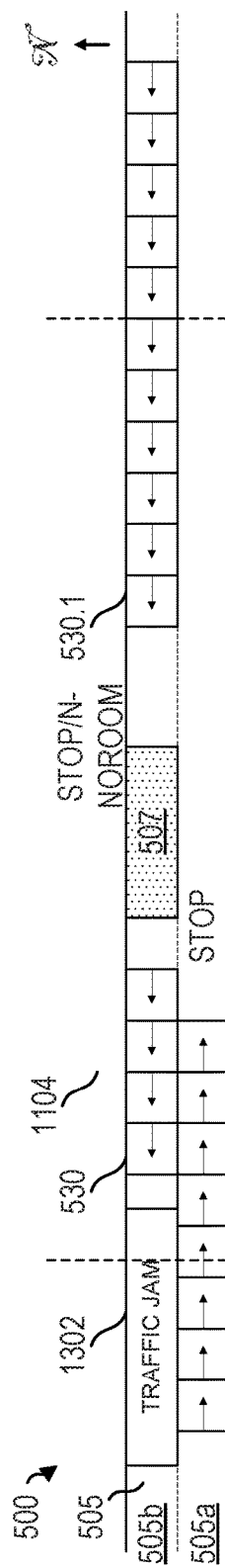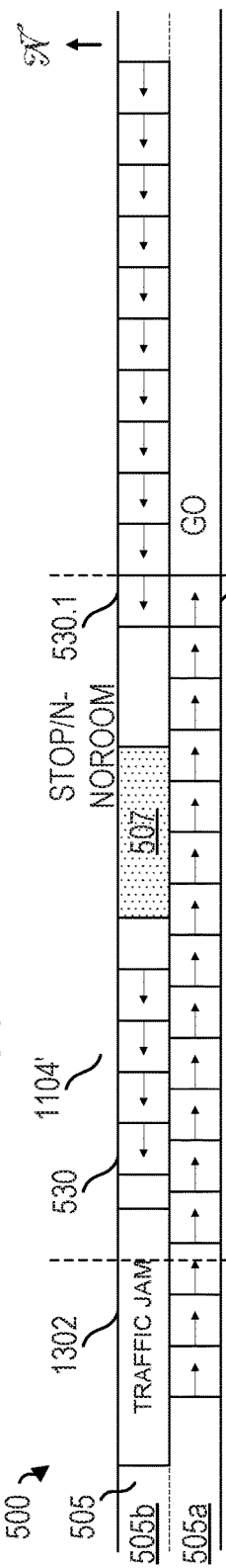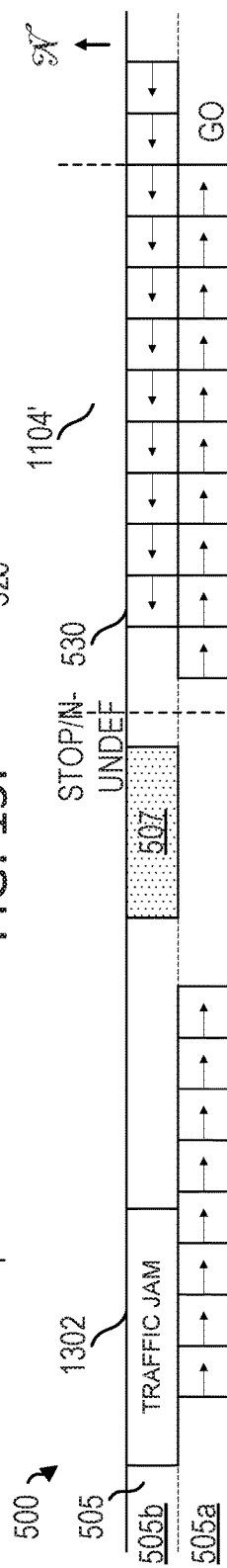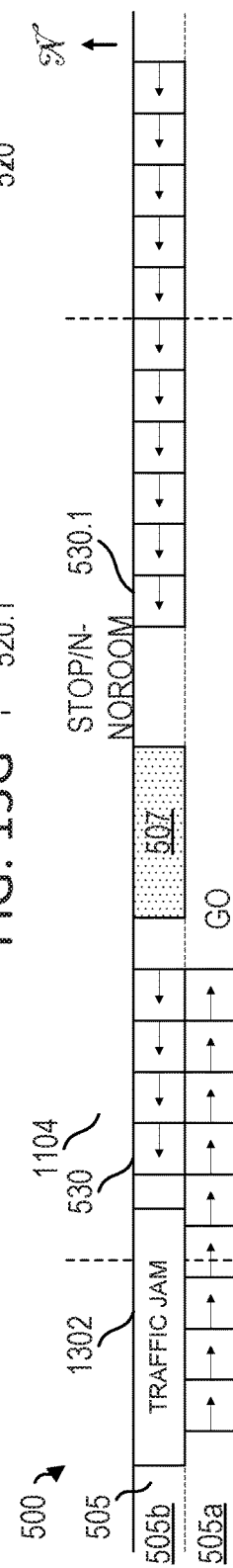

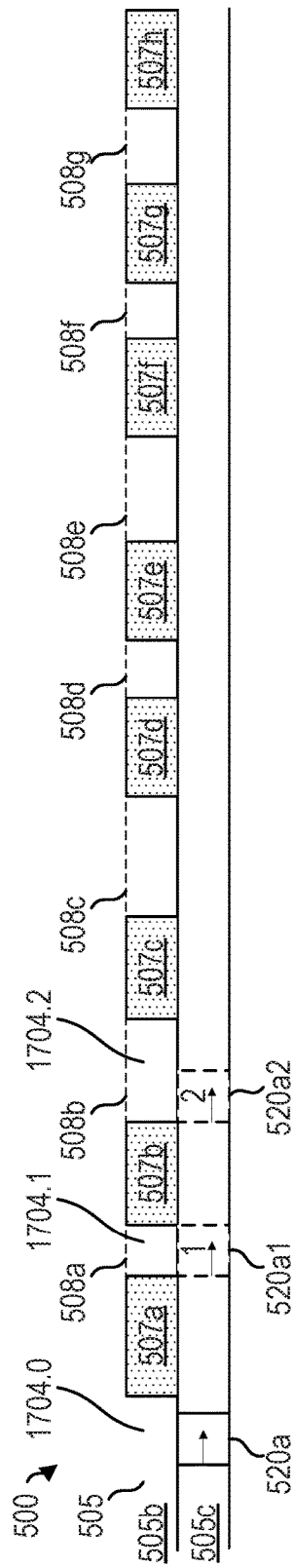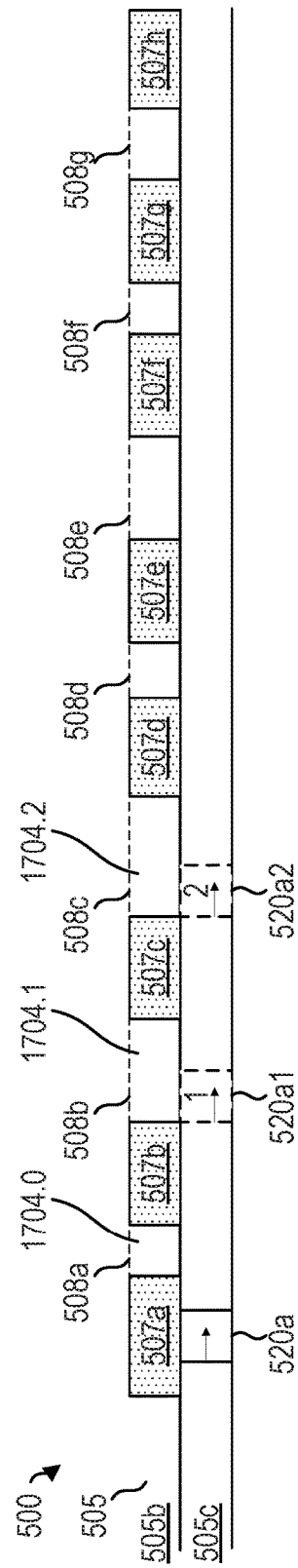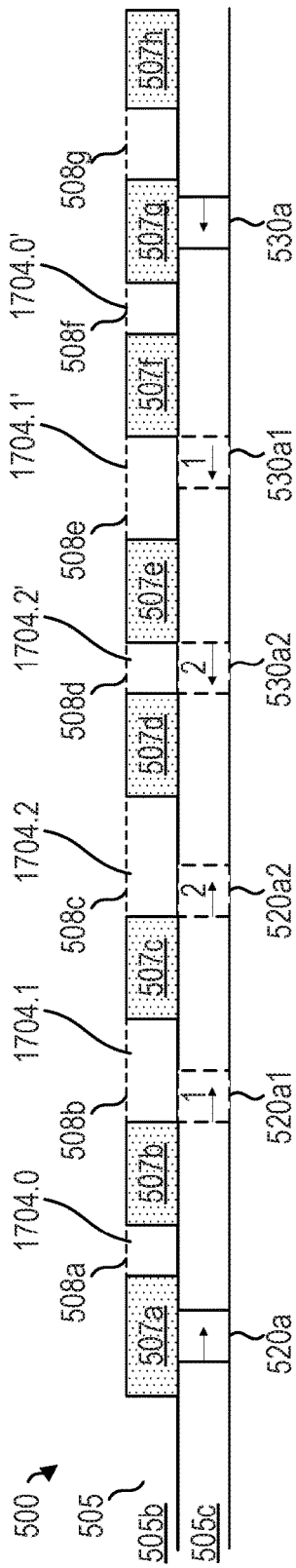

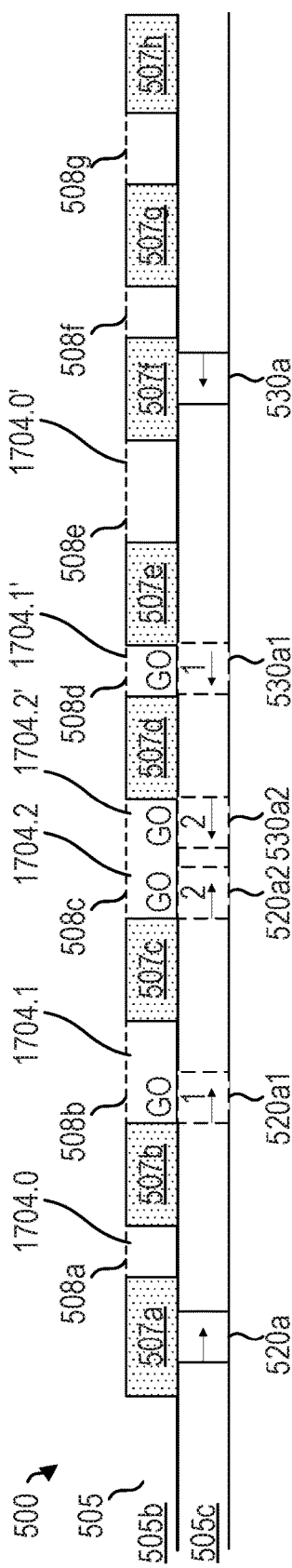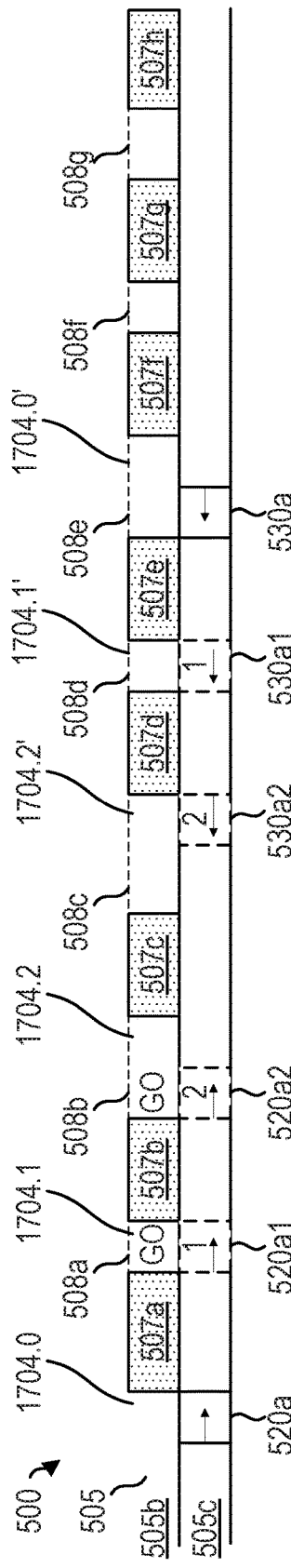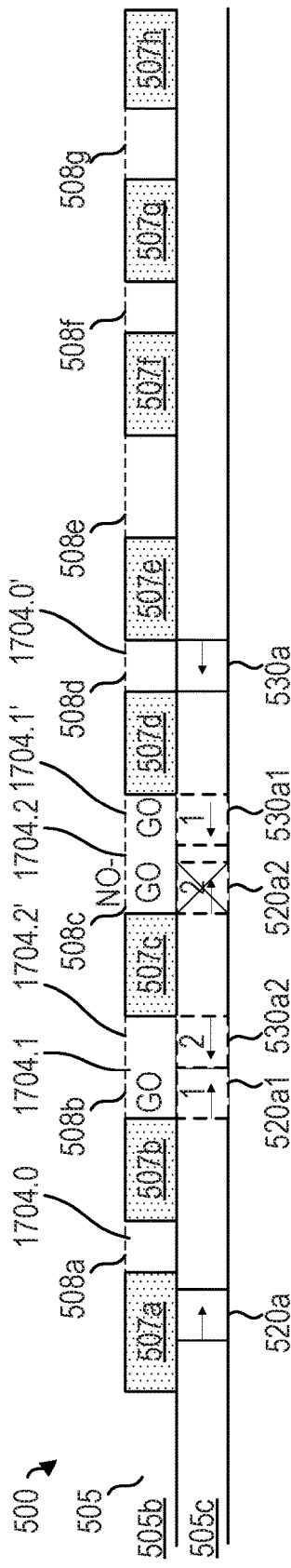
FIG. 17D
FIG. 17E
FIG. 17F

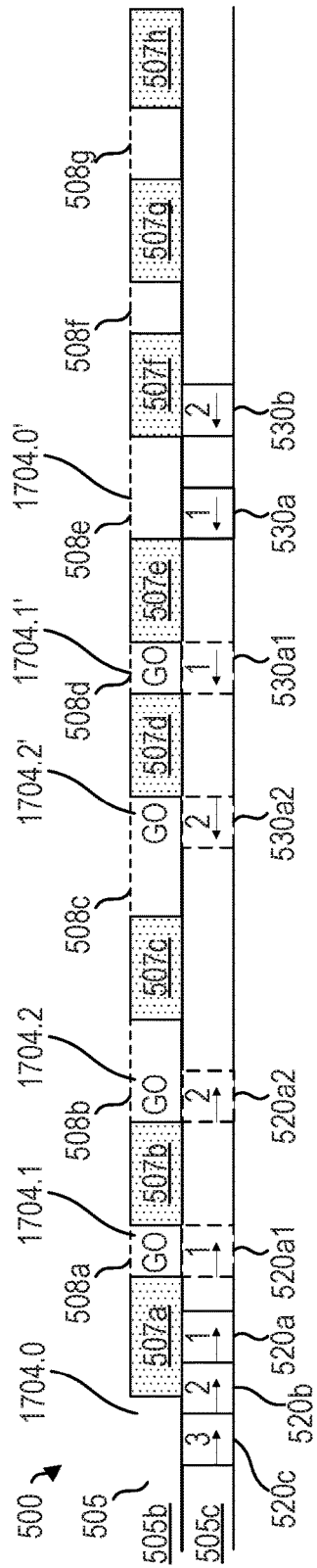
FIG. 18A
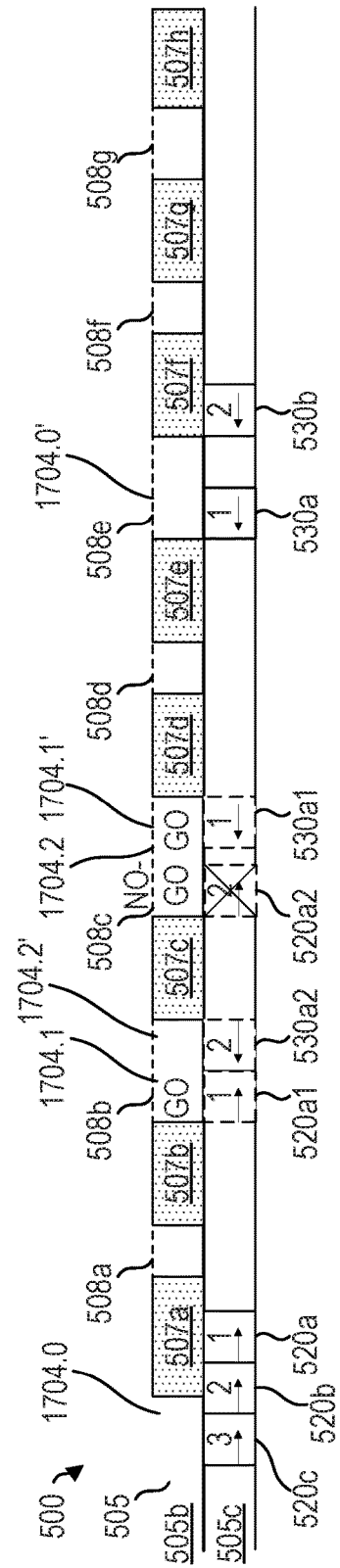
FIG. 18B
FIG. 18C
FIG. 18E

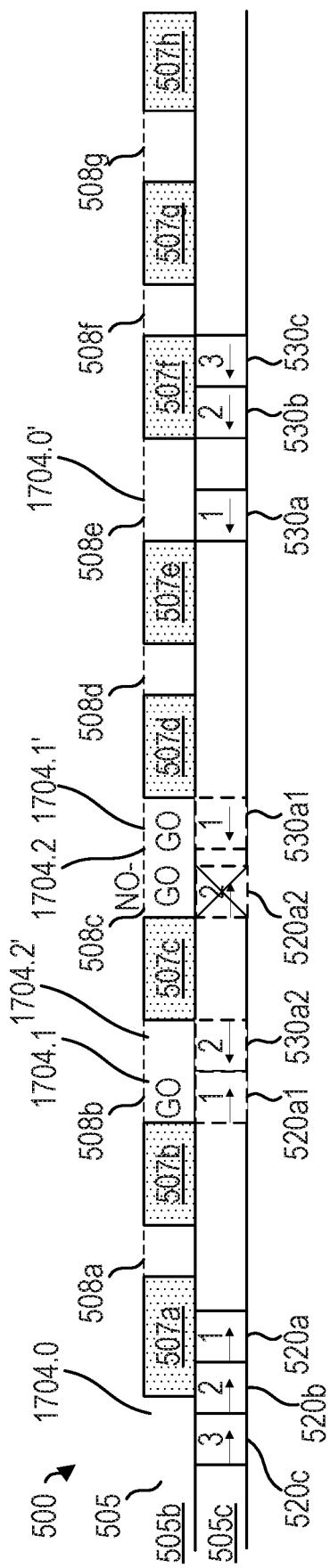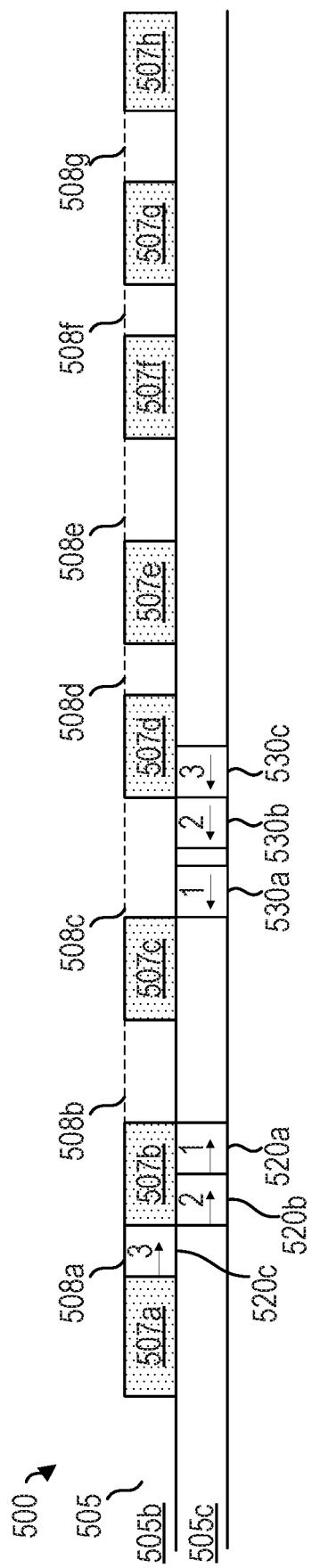

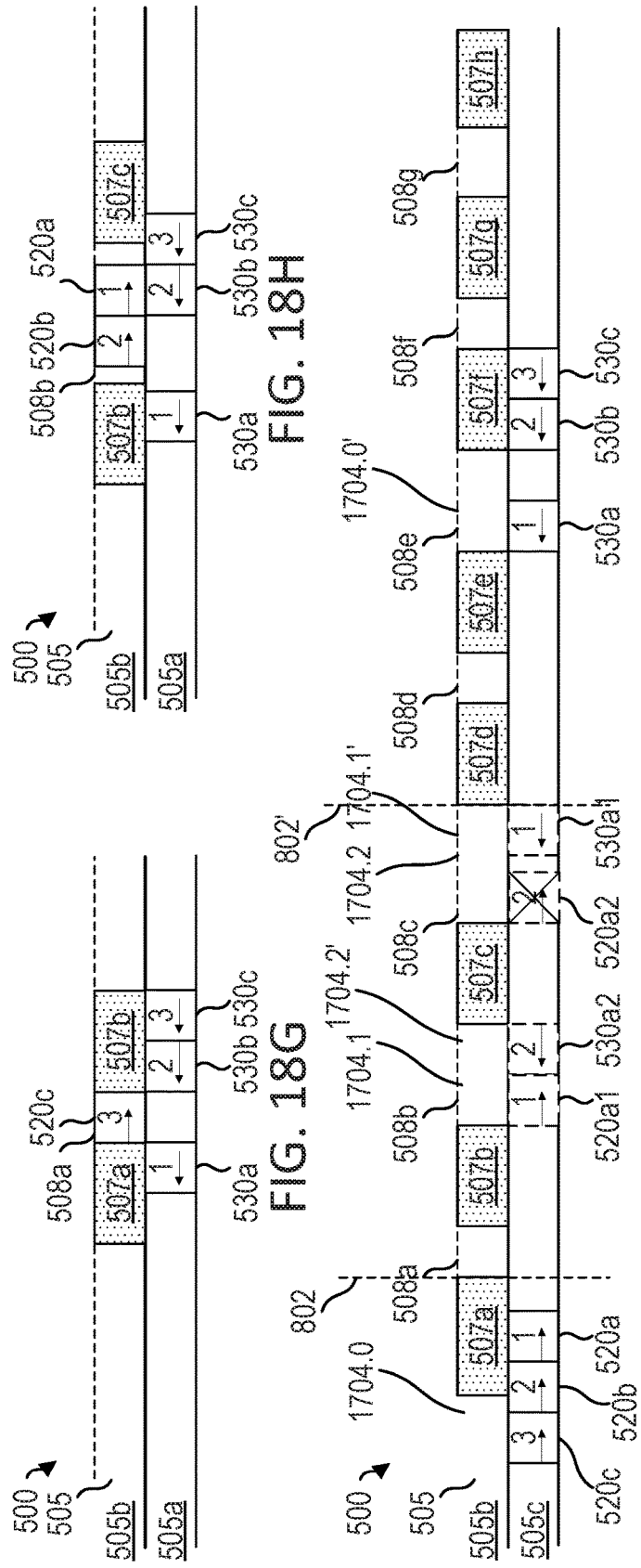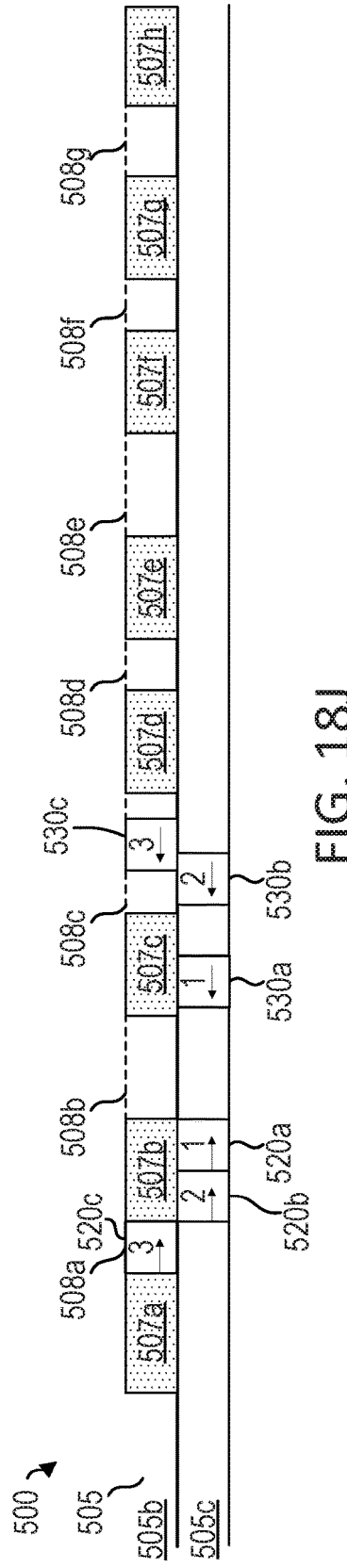

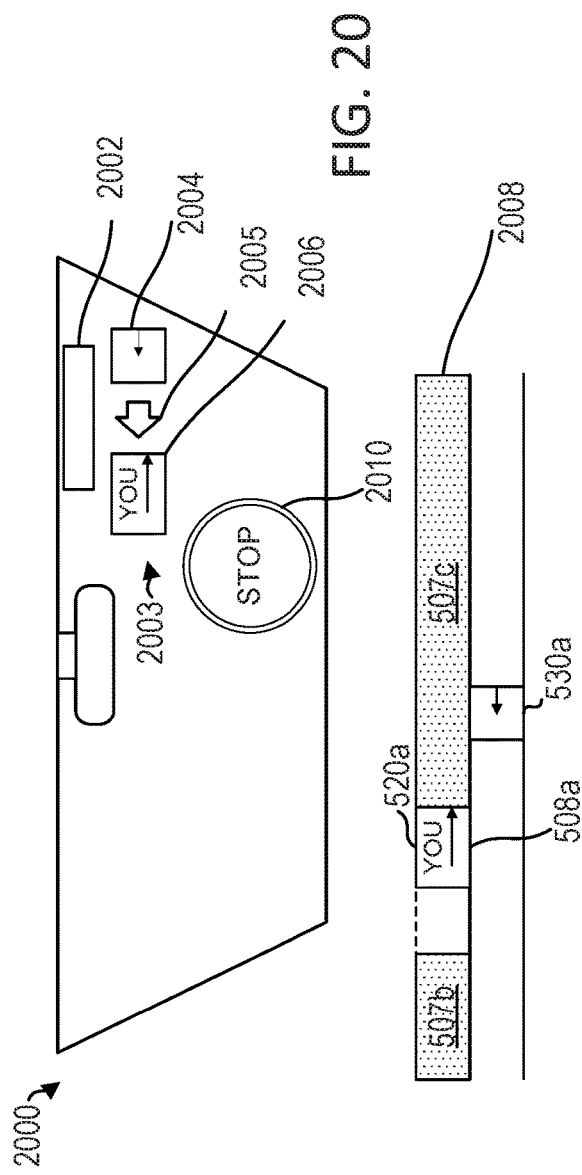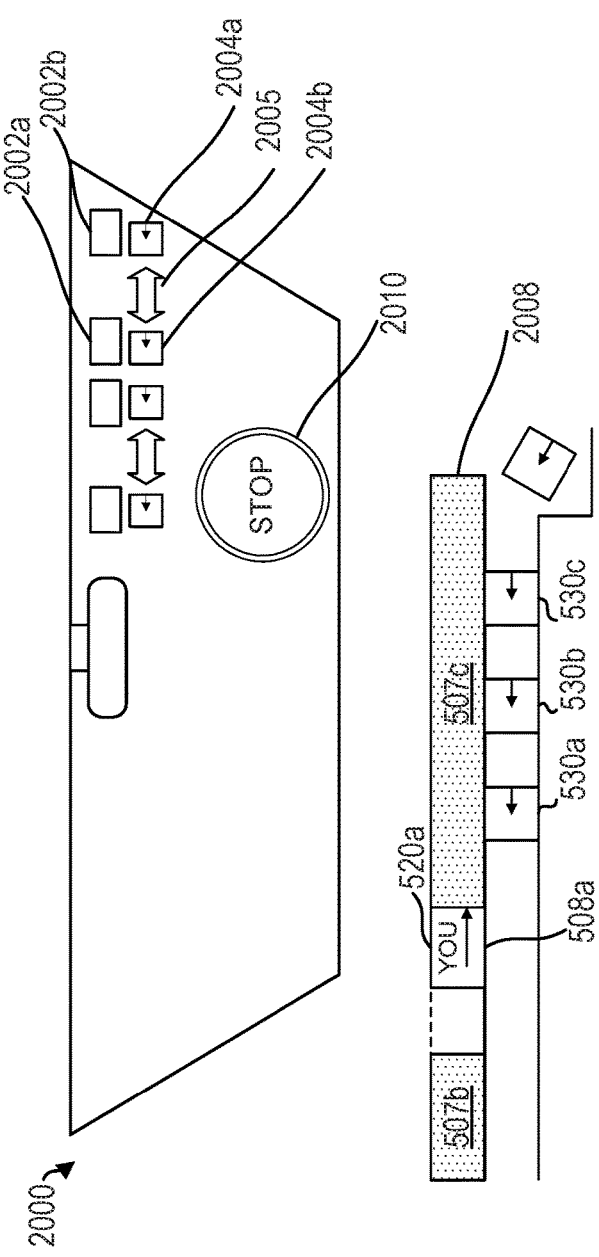

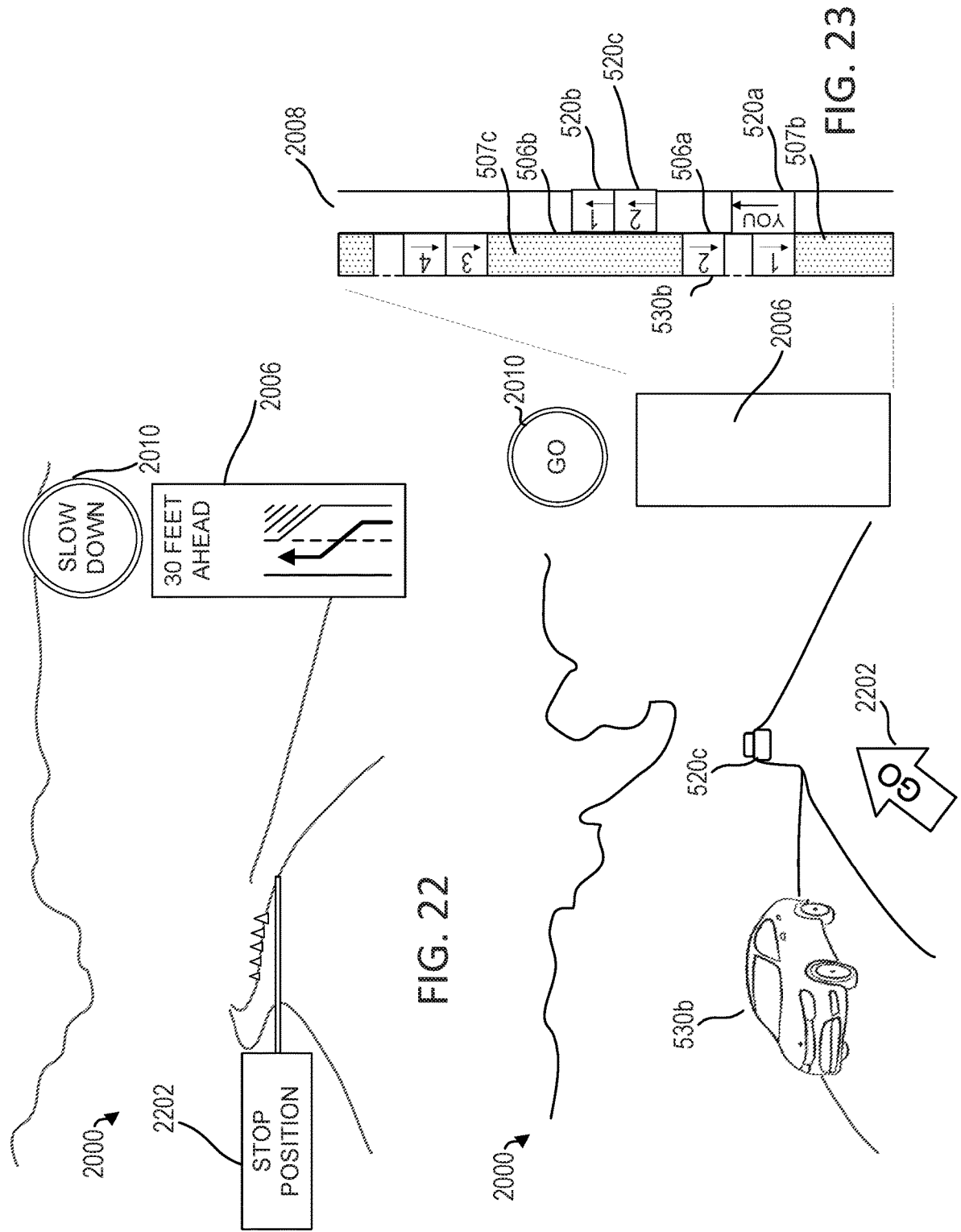

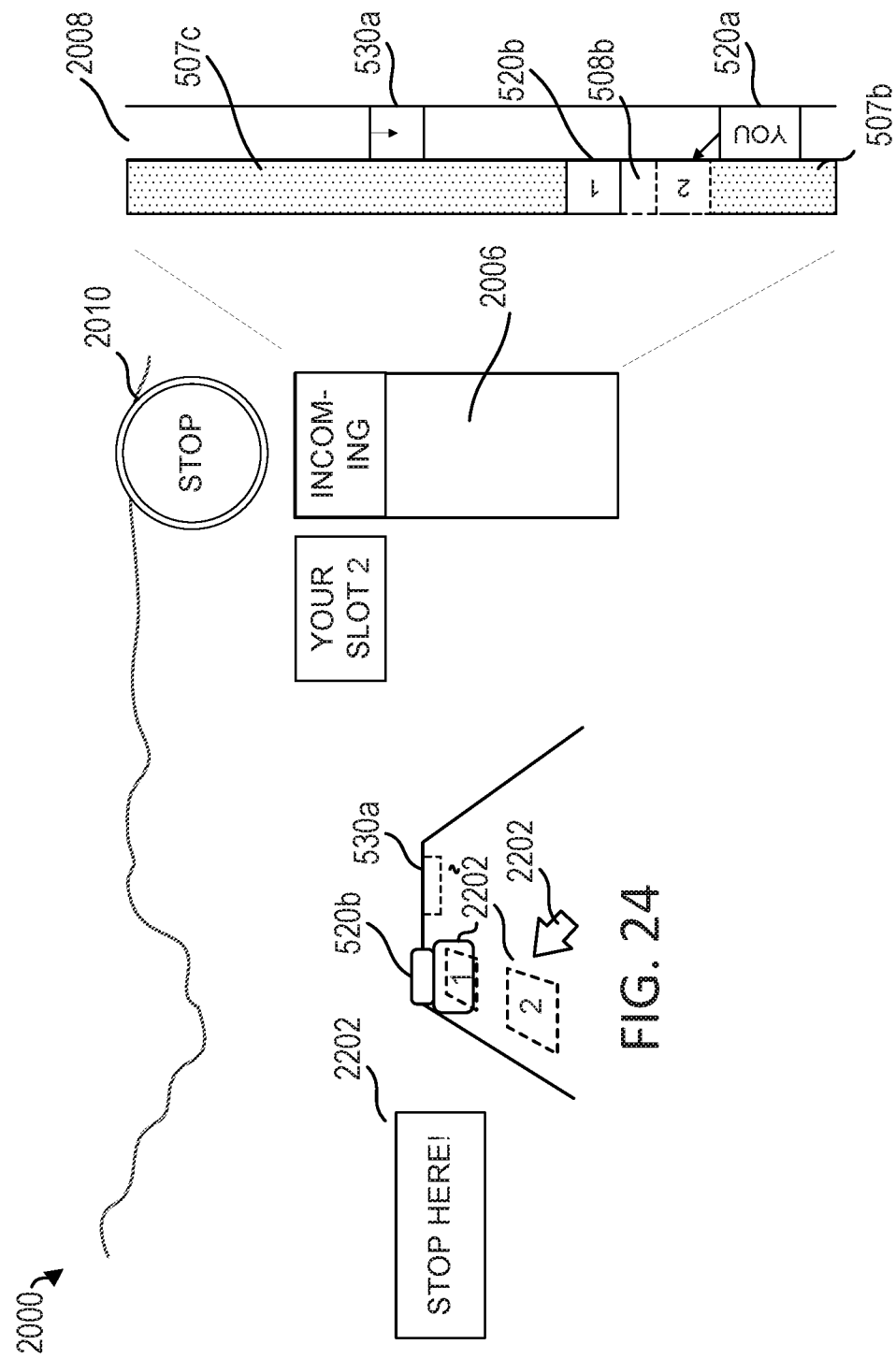

INTELLIGENT VEHICLE PASS-BY INFORMATION SHARING

BACKGROUND

Disclosed herein is a system and related method for intelligent vehicle pass-by information sharing.

Obstacles on two-way roads may sometimes require single lane alternating traffic in which traffic flows in only one direction at a time and the travel lane must completely clear before traffic can flow in the other direction. Traditionally, when such obstacles are known in advance, alternating traffic may be implemented by people at each end of the obstacle in communication with one another who can direct traffic to transition between the various states of flow. For obstacles that may be present for an extended period of time, automated traffic lights may be placed at opposite ends of the obstacle and be automatically controlled by a traffic light controlling unit. A stop position may be displayed using vehicle-mounted sensors. However, this technique is usable only when the obstacles are visible, and cannot control traffic including succeeding vehicles.

Providing instructions to vehicles that permit an efficient overall traffic flow represents a technological challenge because a mere starting and stopping of vehicles over long stretches of road that include within these stretches additional areas or points for vehicles to pass one another may be a less-than-optimal solution. Increasing the efficiency of traffic passing by each other in areas that have narrowed road saves human time and resources in addition to vehicle resources in a context of reduced travel time. In order to analyze dynamic conditions sensed by vehicles and shared with others, and to instruct vehicles in actions they should take with respect to narrowed and widened road areas is a technically challenging and demanding problem that has yet to be resolved.

A technological challenge is presented of making efficient determinations of locations where vehicles may pass each other by. While current systems may apply some basic algorithms to enhance passing-by traffic flow, these algorithms may be wasteful in terms of the information that is stored within the memories of such systems as well as the network bandwidth that is used to communicate information to other vehicles.

SUMMARY

Disclosed herein is a device associated with a focus vehicle, the device comprising a sensor that senses area information about an information area usable to assist the focus vehicle and an oncoming vehicle to pass each other, a transmitter that broadcasts the area information via a vehicle-to-vehicle network (V2VN) protocol, and a controller. The controller produces an assisting result from the area information and vehicle information related to the focus vehicle and the oncoming vehicle. The vehicle information includes first distance information of the focus vehicle from the information area, and second distance information of the oncoming vehicle from the information area. The device includes a display that displays virtual traffic information representing at least stopping and proceeding of the focus vehicle onto a windshield of the vehicle.

By taking into consideration of the differences in the distances of the vehicles from the information area, the algorithms may be more effectively and efficiently employed by vehicles that include the system, and may result in increased traffic efficiency and less delay for vehicles. Furthermore, by displaying virtual traffic information in a meaningful and clear way to vehicle drivers may produce a sense of certainty and reduce a chance of error for the drivers in driving situations involving multiple vehicles.

Disclosed herein is also a device associated with a focus vehicle, the device comprising a sensor that senses area information about an information area usable to assist the focus vehicle and an oncoming vehicle to pass each other, a transmitter that broadcasts the area information via a vehicle-to-vehicle network (V2VN) protocol, and a controller. The controller, in a basic assessment, produces an assisting result from the area information and vehicle information related to the focus vehicle and the oncoming vehicle. The vehicle information includes first distance information of the focus vehicle from the information area, and second distance information of the oncoming vehicle from the information area. The controller produces the assisting result in: a first assisting mode for wide roads primarily having a plurality of lanes that permit vehicles to pass by each other but that contain narrowing sections that obstruct all but one lane, and a second assisting mode on narrow roads primarily having narrow sections of one lane that do not permit vehicles to pass by each other, but that contain widening sections where vehicles can pass by each other. In the first assisting mode, the controller compares a first distance from the information area to the focus vehicle and a second distance from the information area to the oncoming vehicle to select a focus vehicle action. The focus vehicle action may be to stop the focus vehicle. This results from the first distance being much larger than the second distance, based on a predefined distance criterion. The focus vehicle action may be to proceed, with the focus vehicle resulting from the second distance being much larger than the first distance, based on the predefined distance criterion. The focus vehicle action may be to negotiate with the oncoming vehicle in other cases. The device may further comprise a display that displays virtual traffic information in accordance with the result of the selection that differentiates the stop, proceed, and negotiation vehicle action.

By using the different assisting modes for the vehicles, the system may collect and share only the information necessary to allow efficient interaction of vehicles in passing areas. This efficient use of data may reduce memory requirements on these devices, and reduce network traffic required to convey the information to other vehicles.

Disclosed herein is also a computer-implemented method for operating a focus vehicle device. The method includes sensing area information with a sensor about an information area usable to assist the focus vehicle and an oncoming vehicle to pass each other. The method further comprises broadcasting with a transmitter the area information via a vehicle-to-vehicle network (V2VN) protocol. The method further comprises producing, with a controller, an assisting result from the area information and vehicle information related to the focus vehicle and the oncoming vehicle, the vehicle information including first distance information of the focus vehicle from the information area, and second distance information of the oncoming vehicle from the information area. The method further comprises displaying, with a display, virtual traffic information representing at least stopping and proceeding of the focus vehicle onto a windshield of the vehicle.

Use of a computer-implemented method may provide technical advantages discussed above, e.g., that by taking into consideration of the differences in the distances of the vehicles from the information area, the algorithms may be more effectively and efficiently employed by vehicles that include the system, and may result in increased traffic efficiency and less delay for vehicles. The method of displaying virtual traffic information in a meaningful and clear way to vehicle drivers, as described herein, may produce a sense of certainty and reduce a chance of error for the drivers in driving situations involving multiple vehicles.

Disclosed herein is also a computer-implemented method for operating a focus vehicle device. The method comprises sensing area information with a sensor about an information area usable to assist the focus vehicle and an oncoming vehicle to pass each other. The method further comprises broadcasting with a transmitter the area information via a vehicle-to-vehicle network (V2VN) protocol. The method further comprises producing, in a basic assessment operation using a controller, an assisting result from the area information and vehicle information related to the focus vehicle and the oncoming vehicle, the vehicle information including first distance information of the focus vehicle from the information area, and second distance information of the oncoming vehicle from the information area. The controller produces the assisting result in different assisting modes. A first assisting mode is for wide roads primarily having a plurality of lanes that permit vehicles to pass by each other but that contain narrowing sections that obstruct all but one lane. A second assisting mode is for narrow roads primarily having narrow sections of one lane that do not permit vehicles to pass by each other, but that contain widening sections where vehicles can pass by each other. In the first assisting mode, the method comprises comparing a first distance from the information area to the focus vehicle and a second distance from the information area to the oncoming vehicle to select a focus vehicle action. The focus vehicle action comprises stop, when the focus vehicle resulting from the first distance being much larger than the second distance, based on a predefined distance criterion. The focus vehicle action comprises proceed, when the focus vehicle resulting from the second distance being much larger than the first distance, based on the predefined distance criterion. The focus vehicle action comprises negotiating with the oncoming vehicle in other cases. The method further comprises displaying, with a display, virtual traffic information representing at least stopping and proceeding of the focus vehicle onto a windshield of the vehicle.

The computer-implemented method, by using the different assisting modes for the vehicles, similarly result in the collection and sharing of only the information necessary to allow efficient interaction of vehicles in passing areas, which, as noted above, may result in a reduction of memory requirements on these devices, and reduce network traffic required to convey the information to other vehicles.

Disclosed herein is a computer product for implementing the system or device, or method operations described above. The computer program product may comprise a computer readable storage medium having computer-readable program code embodied therewith to execute, on a processor, method operations as described herein.

Disclosed herein, according to some embodiments, is a system and method that allow a determination to be made that fairly permit vehicles to take turns passing by each other. Here, a vehicle may receive a signal that indicates it is within a trafficable are permitting its passing through an obstruction area without interruption, based on the determination of whether the focus vehicle is within the trafficable area.

Advantageously, this may permit groups of vehicles heading in opposite directions to efficiently take turns in a fair manner without burdening any particular vehicle or vehicle groups with unfair delays.

Disclosed herein, according to some embodiments, is a system and method in which the controller determines when a space area is available beyond a narrow obstruction area, and, when a determination is made that no space is available, always selecting for the focus vehicle to stop until a determination is made that space is available beyond the narrowing obstruction area. Advantageously, this approach may prevent a vehicle from prematurely attempting to pass an obstacle when there is no room on the other side. This may help prevent temporary gridlock conditions or at least a blocking of the passing area when other vehicles may be able to use it.

Various embodiments provided herein address the technical problem of how to assist vehicles in passing one another in various situations that may exist in both wide and narrow roads. As information on a place where vehicles are to pass by each other is shared in advance via a vehicle-to-vehicle network, vehicles may be allowed to let other vehicles go past them in places where obstacles cannot be probed. In addition, since a leading vehicle and succeeding vehicles may be assisted, it may be possible to assist a number of vehicles approaching from the other way to pass by a vehicle in an alternate manner, thus providing an improvement in the efficiency of travel.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings:

FIGS. 7A through 7C are pictorial diagrams illustrating the basic assessment process, according to some embodiments.

FIGS. 13A through 13H are pictorial diagrams illustrating a long vehicle procession passing by with a traffic jam, according to some embodiments.

FIGS. 17A and 17B are pictorial diagrams illustrating characteristics of a narrow road, according to some embodiments.

FIGS. 17C through 17F are pictorial diagrams illustrating determining a point for vehicles to pass by each other on a narrow road, according to some embodiments.

FIGS. 18A through 18J are pictorial diagrams illustrating vehicle processions passing by each other on a narrow road, according to some embodiments.

FIG. 20 is a pictorial illustration of a vehicle display for one oncoming vehicle, according to some embodiments.

FIG. 21 is a pictorial illustration of a vehicle display for multiple oncoming vehicles, according to some embodiments.

FIG. 22 is a pictorial illustration of a HUD showing stop guidance, according to some embodiments.

FIG. 23 is a pictorial illustration of a HUD showing go guidance, according to some embodiments.

FIG. 24 is a pictorial illustration of a HUD showing further stop guidance, according to some embodiments.

DETAILED DESCRIPTION

Figure 1:
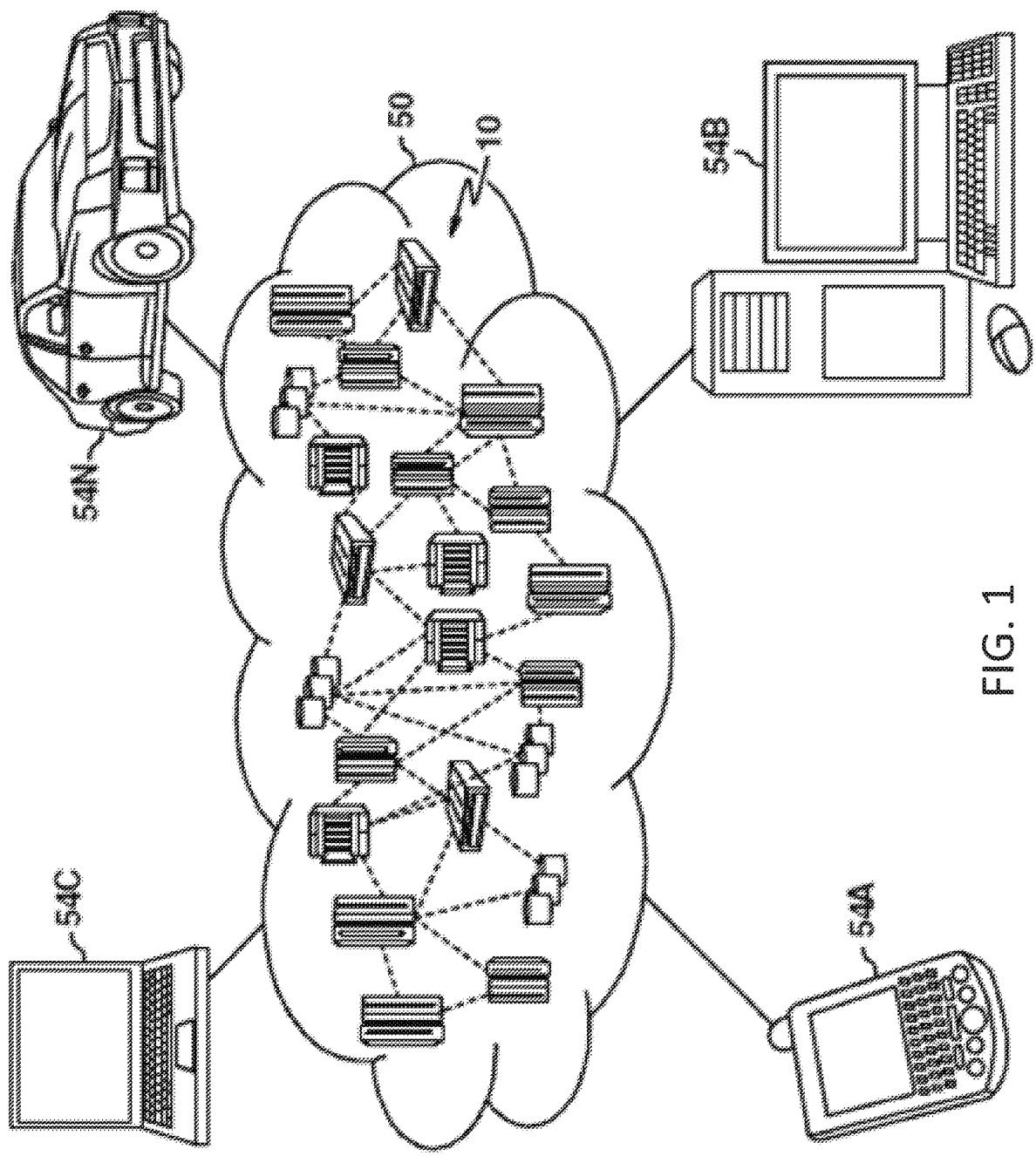
FIG. 1 depicts a cloud computing environment according to an embodiment of the present invention.

In order to more efficiently allow vehicles to navigate wide roads with obstructions in obstruction areas and narrow roads having limited widened areas for vehicles traveling in opposite directions to pass one another in passing areas, the vehicles themselves may serve as a collection tool for gathering information about such areas. Area information obtained in this way may be shared among vehicles and utilized to efficiently allow the vehicles to pass by each other. Various strategies may be deployed depending on a location of the vehicles vis-à-vis an obstruction or passing area, and analysis of this data may produce instructions to vehicle drivers on their windshield that may be followed to create a much more efficient overall traffic result.

Terms and Acronyms

The following acronyms may be used below:
CD-ROM compact disc ROM
CPU central processing unit
DPS data processing system
DVD digital versatile disk
EPROM erasable programmable read-only memory
FPGA field-programmable gate arrays
GPS global positioning system
HUD heads up display
IaaS infrastructure as a service
I/O input/output
IPL initial program load
ISA instruction-set-architecture
LAN local-area network
OPAII out of propagation area information items
PaaS platform as a service
PAI passing assistance information (also "area information")
PDA personal digital assistant
PLA programmable logic arrays
PP passing point
PPC PP candidate
RAM random access memory
RISC reduced instruction set computer
ROM read-only memory
SaaS software as a service
SLA service level agreement
SOI search optimization service
SRAM static random access memory
VICS vehicle information and communication system
V2VN vehicle-to-vehicle (V2V) network
WAN wide-area network The following conventions, definitions, terms and/or expressions may be used herein.

The term "area information" may refer to, in some embodiments, descriptive information about a particular area (also called an "information area" which is an area that the area information may refer to), and may include at least location, shape, and type information. Location information may contain a location of a reference point on the area, such as GPS coordinates, mile marker data, intersection points, and/or relative position to some known/established reference point. Area information may also be referred to as passing-by-each-other assisting place information herein. It may refer to information or data on a particular area that originates from vehicle sensors as they pass by a particular area and detect various attributes of the area.

Shape information may refer to, in some embodiments, a shape of the area. In many cases (and typically herein), a rectangular shape may be sufficient to describe the shape. In this case, a width and length information may be sufficient. In other cases, the shape may be more complex, and other types of descriptive information may be utilized. For example, when the shape is a polygon, the shape may be described by coordinates of the vertices. When other mathematical forms describe the shape better (e.g., circle, ellipse, spline-shaped boundaries, etc.) then different information may be used to describe these. A definition of mathematical shape types and definitions of boundaries using conventional techniques may be utilized. In some instances herein, the area may be an actual area of an obstruction, passing place, and the like—however, in most instances, an area may include adjacent road portions as well, and this may generally be determined by the context. By way of example, an obstacle area may include the passable road segment adjacent to the obstacle so that a reference to a "vehicle in the obstacle area" may be interpreted as "vehicle in the road segment adjacent to the obstacle".

Type information may refer to, in some embodiments, the type of area under consideration, and may include:
"obstacle area", which may refer to, in some embodiments, a road area on a normally wide road in which a lane in one direction is blocked by a temporary obstacle that is not displayed on a traditional printed map but that may dynamically appear and be detected. An obstacle area may be due to an extended time parked vehicle, an area containing an obstruction or blocking element in a normally wide road, also referred to as a "narrow area"
"passing area" or "passing point": also referred to as "wide area"; may refer to, in some embodiments, an area in which two vehicles are able to pass by each other or have been detected to have passed each other in a normally narrow, or one-lane, road; a passing area or point may also describe road areas adjacent to an obstacle or obstacle area on a wide road
"passing-obstacle area": may refer to, in some embodiments, an area normally designated as a passing area but that is currently obstructed and does not permit passing; similar to a narrow area
"sharing area" may refer to, in some embodiments, areas in which two vehicles are able to share information and which may be defined relative to one of the vehicles
"propagation area" may, in some embodiments, refer to an area in which an area information item is to be propagated to other vehicles
"stop area" may, in some embodiments, refer to an area adjacent to an obstacle in which vehicles in a lane unobstructed by the obstacle wait for vehicles coming from the opposite direction to clear going around the obstacle
"trafficable area" may, in some embodiments, refer to a temporary area in which all vehicles of a vehicle train passing an obstruction area (where vehicles from the opposing direction are stopped and waiting for their passage) are allowed to pass the obstruction without interruption
"holding area" may, in some embodiments, refer to an area in which an area information item is to be held or maintained within the vehicle's database. Such an area is larger than the propagation area and contains the propagation area. For example, the holding area may be an area with a radius of ten kilometers (km) from an end of the road segment, or within a distance of ten km along a road, in which vehicles require assistance for passing by each other.

A "predetermined negotiation completion distance" may refer to, in some embodiments, a distance from an obstacle or passing area by which status negotiations must be completed to avoid stopping the negotiating vehicles to complete negotiations.

The terms "assisting result" and "assessment result" may be used interchangeably herein and may refer to, in some embodiments, a result that may be presented to drivers or associated vehicle devices in the form of an instruction related to passing other vehicles.

A simplified "shape" may be used in some embodiments. For example, the obstacle area may be further defined as an area of the road that permits a single car to travel in a single direction, and a passing area may be further defined as an area of the road that permits two cars to pass each other. In these cases, only a reference point on the road and length may be sufficient to define the areas, although lane information may be included as well.

When area information is detected by a vehicle sensor of a detecting vehicle and stored, such information may further include time of detection information along with information about any other circumstances associated with the detection. When area information is relayed by a vehicle, such information may further include information about the relaying vehicle, and/or may include a ledger of information about any or all relaying vehicles and associated data back to the detecting vehicle. The information of collective vehicles may allow a resolution of conflicting or incomplete information on a particular area.

The term "narrow road" may, in some embodiments, refer to a road that, for most of its length, is a single-lane road that under normal usage is intended to permit a vehicle traveling in only one direction at any point along the road. Such a road may be designated on a map as a single-lane road and have a width that is, e.g., at least twelve feet. By design, such roads have locally wide areas scattered along them that permit vehicles traveling in an opposite direction to pull off the lane to allow a first vehicle to pass by it. In some embodiments, when a detecting vehicle travels along a narrow road, it is efficient for the vehicle detectors to detect and store the wide areas (which are few/small in size/number) and ignore the narrow areas (which are many/large in size/number).

The narrow road characteristics may include the following. In a certain segment on a narrow road, points where vehicles can pass by each other may appear intermittently. As the number of vehicles entering the road is small, the traffic amount is such that frequently a pair of vehicles pass by each other and occasionally a pair of several vehicles pass by each other. The narrow road segment to be processed is a segment that is found as having a certain length and a narrow width based on map information and thus vehicles require assistance for passing by each other. The points where vehicles can pass by each other, which determine the basis of assistance, may be determined based on map information or other geographical information.

The points where vehicles can pass by each other may also, in some embodiments, be dynamically registered with a registration by a user and on the basis of an actual experience of vehicles that have passed by each other. However, such a passing point or passing area may be obstructed, and unusable for passing. This may occur, e.g., when another vehicle has parked in the passing area, rendering it unsuitable for allowing passing to occur.

The term "wide road" may, in some embodiments, refer to a road that, for most of its length, is a double lane road that under normal usage is intended to permit vehicles traveling in opposite directions to pass each other at any given point. Such a road may be designated on a map as a multi-lane or multi-direction road, and may have a width that is, e.g., at least twenty-four feet, or as primarily having a plurality of lanes that permit vehicles to pass by each other. These roads may have, at times, vicinities that are locally narrow due to an obstacle or the like and thus do not allow vehicles to pass by each other. In some embodiments, when a detecting vehicle travels along a wide road, it is efficient for the vehicle detectors to detect and store the narrow or obstructed areas (which are few/small in size/number) and ignore the wide areas (which are many/large in size/number).

The term "temporarily parked vehicle" may, in some embodiments, refer to a vehicle that has stopped to wait until an oncoming vehicle passes by, or has stopped due to congestion. Such a vehicle may be capable of moving again as soon as surrounding circumstances permit it to do so, e.g., a driver or automated vehicle control system will move the car when surrounding circumstances permit movement. Such a vehicle is generally not considered an obstacle and generally not regarded as something to be passed by another vehicle moving in the same direction.

The term "extended-time parked vehicle" may, in some embodiments, refer to a vehicle that is stopped due to an issue with the vehicle itself, such as a breakdown, lack of driver (i.e., deliberately parked), an accident, and the like. Such a vehicle is generally considered an obstacle and generally regarded as something to be passed by another vehicle moving in the same direction.

The term "focus vehicle" may, in some embodiments, refer to a user's "own vehicle", i.e., one that is operating the intelligent vehicle pass-by information sharing system and serving as the vehicle for the purpose of the discussion. Since vehicles in the system are generally presumed to operate under the same set of rules, a "focus vehicle" in one context or from one view/perspective may be "another vehicle" (such as an "oncoming vehicle") in another context or from another view/perspective. A focus vehicle may be referred to as a reference vehicle.

The term "vehicle to vehicle network" may refer to any known network utilized for inter-vehicle communications.

The term "periodic broadcasting" may, in some embodiments, refer to a broadcast that is based on, e.g., a predefined periodic time criteria, such as an absolute time (e.g., "at every 10 minute interval past the hour", or "at 5:00 pm CDT" or the like), a relative time (e.g., "at every 10 minute interval past the last transmission"). It may also refer to a broadcast that is based on some other predefined broadcast criteria, trigger, and/or event (e.g., "any time the vehicle stops"). The period for periodic broadcasting and its nature (e.g., trigger) may be predefined and shared upon the establishment of the V2VN or when a new member is added to the V2VN. Thus, all vehicles participating in the V2VN may be in agreement as to the conditions of the periodic broadcast and may recognize if they have missed an expected periodic broadcast.

The term "passing assistance information" may refer to, in some embodiments, any information that may be utilized to assist a vehicle in passing another vehicle travelling in an opposite or oncoming direction when lane conditions on a part of the road prohibit them from passing each other at a particular point on the road. Such lane conditions may include an aspect of the road itself, such as a one-way road, or may include temporary conditions, such as when one of the lanes is obstructed.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
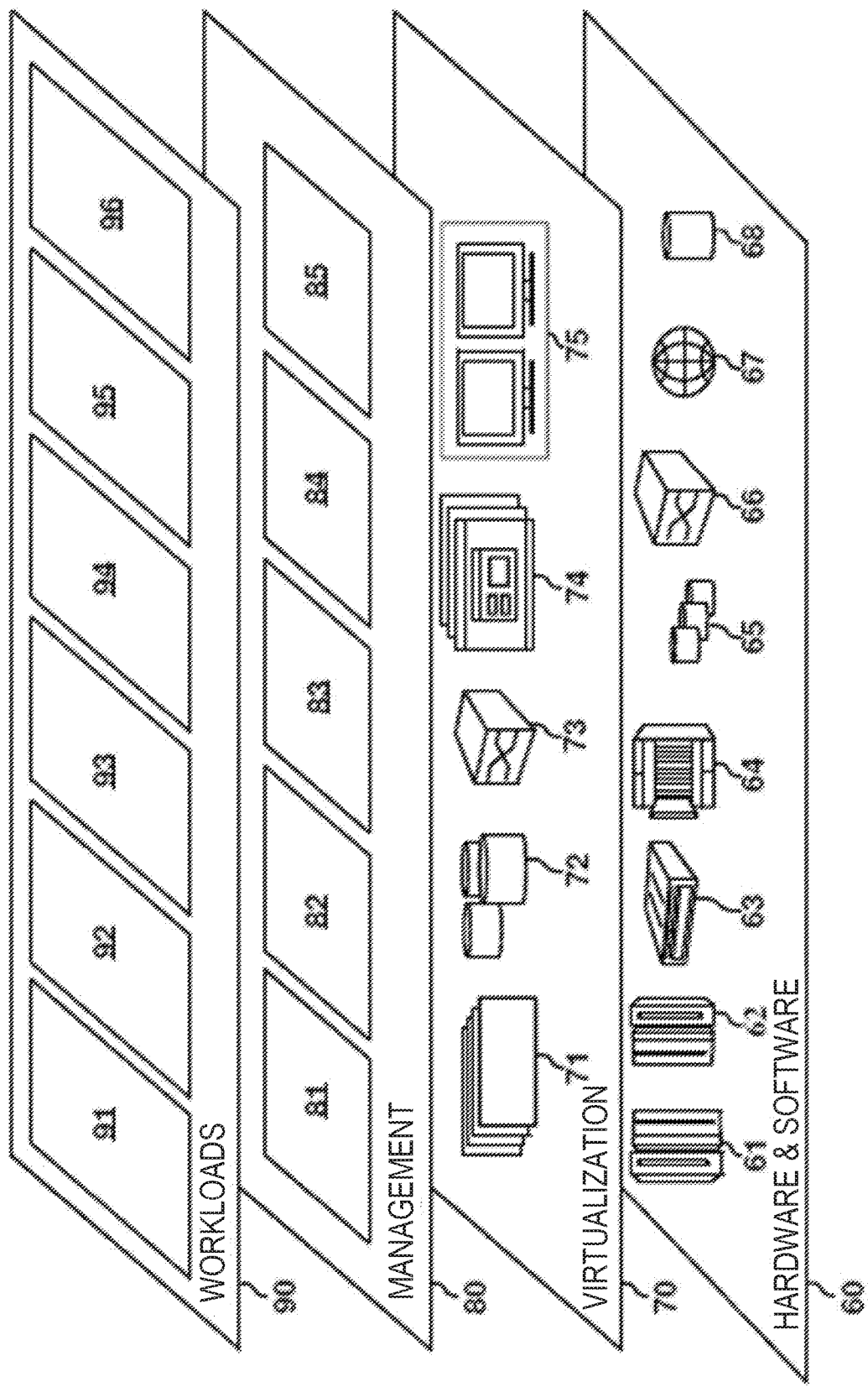
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System

Figure 3:
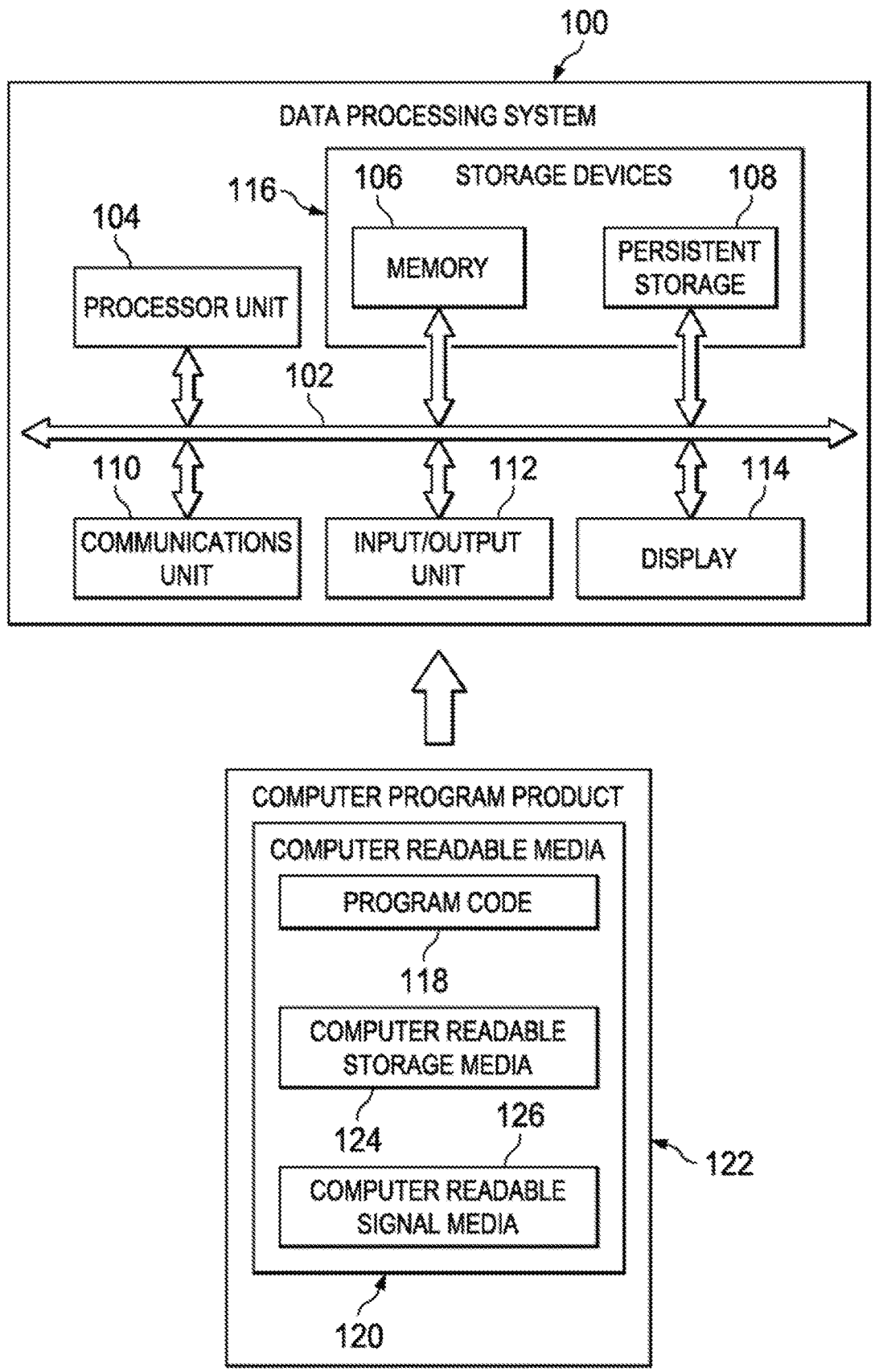
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/ output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1 may be varied from the illustrative examples shown.

When different reference numbers comprise a common number followed by differing letters (e.g., 100a, 100b, 100c), use of the reference character only without the letter (e.g., 100) may refer to the group of elements as a whole, any subset of the group, or an example specimen of the group.

Disclosed herein is a system and related method that assists vehicles in passing by each other. This is achieved by sharing information, via a V2V network, about places where vehicles can and cannot pass by each other. When such information is shared in advance of a vehicle approaching an obstacle location (e.g., on a wide road having two lanes of traffic that normally flow in opposite directions, but where an obstacle blocks a lane flowing in one direction, narrowing the road) or a passing location (e.g., on a narrow road having one lane of traffic, but having passing areas that permits vehicles to pass one another by widening the road to two lanes), a vehicle having this information may let other vehicles pass them in places where obstacles cannot be directly probed by sensors or the like. Since it is possible to assist a leading vehicle as well as succeeding vehicles, it is possible to assist a number of vehicles traveling in an opposite direction to pass by in an alternate manner. This approach may be used in, e.g., a construction site.

Overview

An overview of the disclosure herein discusses, among other things, use of a V2VN and/or a V2VN protocol in order to detect and store area information associated with a road, sharing/propagating the area information with other vehicles, processing the area information into an assistance assessment, and displaying results of the assistance assessment to a vehicle user.

Figure 4:
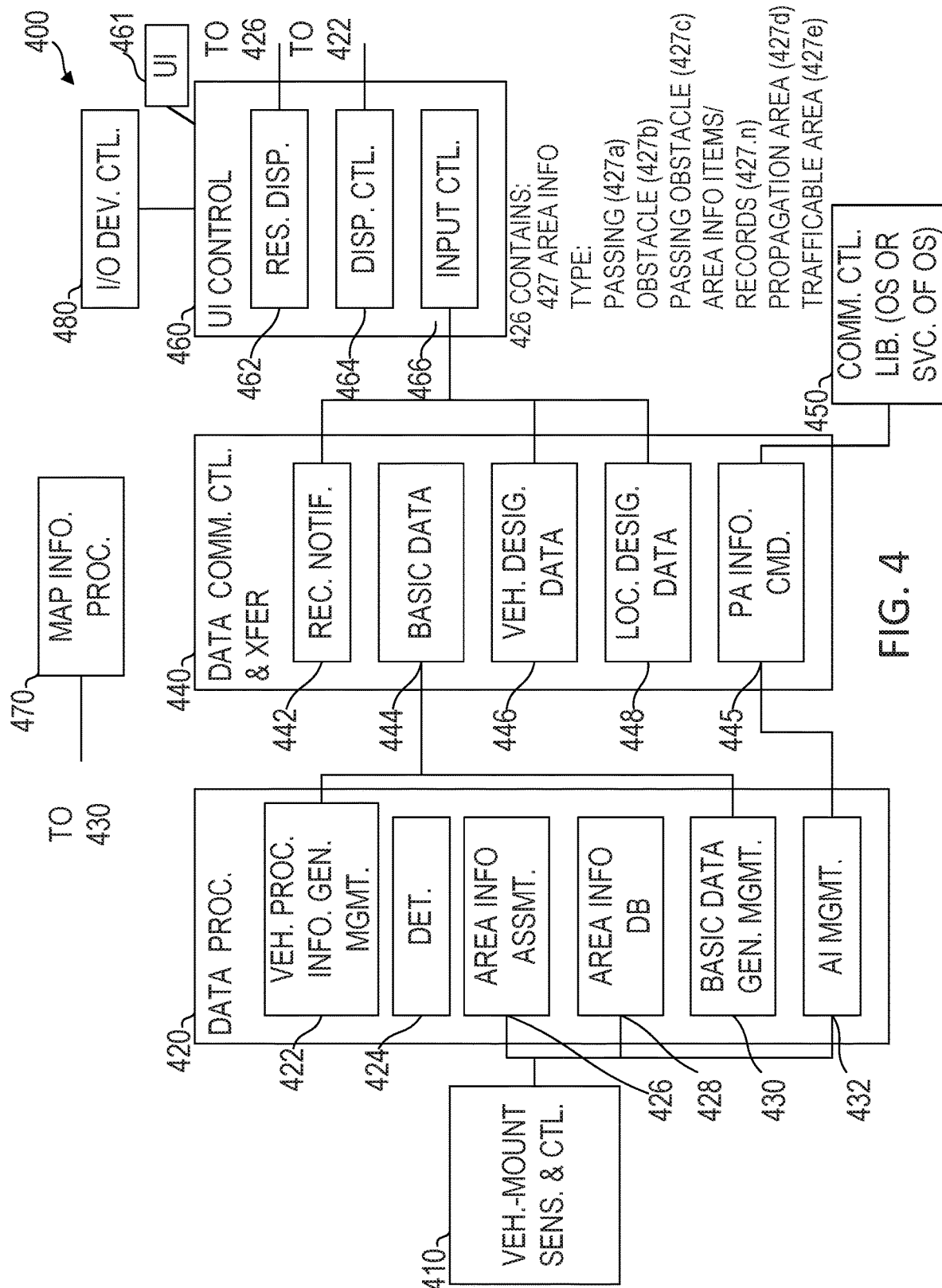
FIG. 4 is a block diagram illustrating various components of a system for intelligent vehicle pass-by information sharing, according to some embodiments.

FIG. 4 is a block diagram of an example vehicle pass-by information sharing system 400. The system may include or incorporate a DPS 100, as described herein. Although a number of example components are illustrated in FIG. 4, only the components illustrated as shaded in FIG. 4 are discussed in detail herein. The system 400 may comprise a vehicle-mounted sensor and control 410, such as an imaging system, that is able to detect various area locations described herein. The sensor 410 may be able to detect road segments and determine if an obstacle is present or if there is a narrowing of the lanes. Similarly, the sensor 410 may be able to detect road segments that have passing areas permitting two vehicles to pass one another when the road is normally narrow. In some embodiments, known image recognition technologies may be employed to accurately interpret a scene at a given location or area, such as recognizing traffic lanes and obstructions therein, danger or warning signs, traffic cones, grass vs. pavement delineations, etc. The sensor 410 may utilize any combination of imaging technology, such as a CCD camera, ranging equipment, such as RADAR or LIDAR, proximity sensors, and the like.

The system 400 may further include a data processor 420 that includes a basic data generation management section 430, a vehicle procession information generation/management section 422, a passing or obstacle detection and passing determination section 424, an area information assessment section 426, an area information database 428 that may comprise records for each point of area information 427 (each record may be referred to herein as an area information 427 item 427.1 (generically 427.n)). The records for the area information may comprise passing area information 427a, obstacle area information 427b, passing obstacle area information 427c, propagation area information 427d, and trafficable area information 427e. The data processor 420 may also include an area information management section 432.

The system 400 may further include a data communication controller 440 that may include a basic data transfer section 444, a recommendation notification transfer section 442, a vehicle designation data transfer section 446, a location designation data transfer section 448, and an area information command transfer section 445. The data communication controller 440 may utilize a communication control library 450 or a service of the OS.

The system 400 may further include a user-interface (UI) controller 460 that interfaces to a UI 461. The UI controller 460 may include an area information assessment result display section 462, a display control section 464, and an input control section 466. The UI controller 460 may work together with an I/O device controller 480. The passing or obstacle detection and passing determination section 424, area information assessment section 426, area information database 428, area information management section 432, and area information command transfer section 445 may, individually or in any combination, constitute a "controller", as discussed herein. The system components are discussed below in conjunction with various operations that may be provided by the system 400.

Detecting and Storing Area Information

Figure 5A:
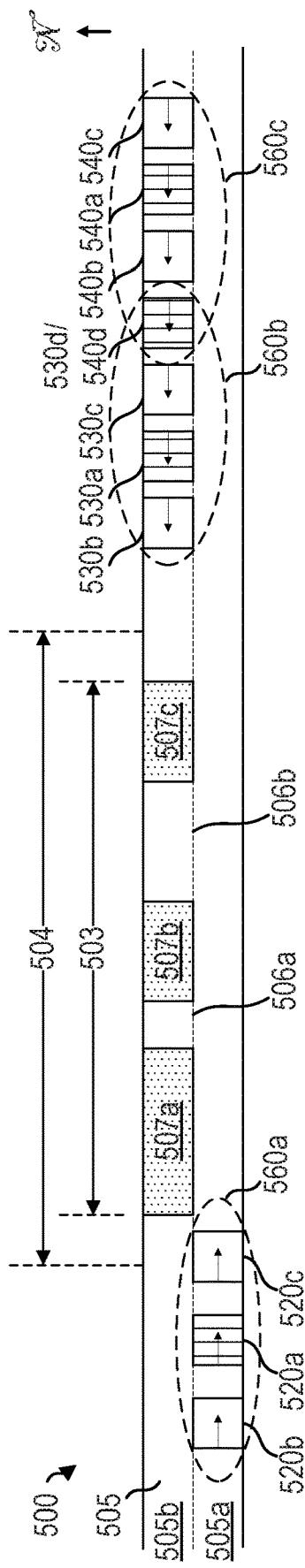
FIG. 5A is a pictorial diagram of a two-lane road with traffic and containing obstructions, according to some embodiments.

FIG. 5A is a pictorial illustration of a region 500 comprising a two-lane road 505 having a first lane 505a in which traffic flows from west to east, and a second lane 505b in which traffic flows from east to west. The second lane 505b has a series of obstacles 507a-c in an obstacle area. A first group of cars 520 that are in a first V2VN 560a are in the first lane 505a, and the first car 520c in the group is just approaching the obstacle area in a west-to-east direction. A second 530 and third 540 group of cars are approaching the obstacle area in an opposite east-to-west direction, these groups 530, 540 belonging to a second 560b and third 560c V2VN, respectively. An overlap vehicle 530d, 540d is a member of both the second 530 and third 540 group of cars and the second 560b and third 560c V2VN. These elements are discussed in more detail below.

Figure 5B:
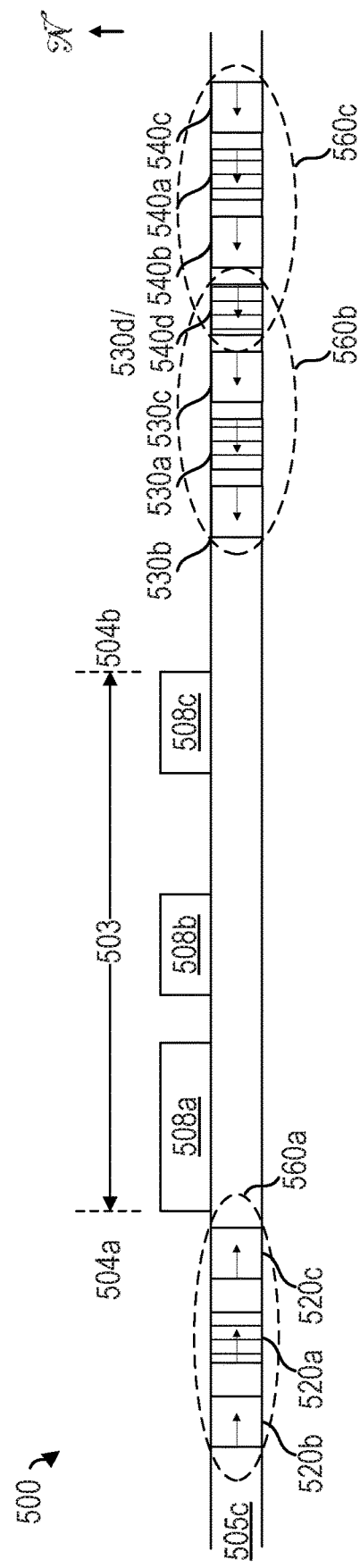
FIG. 5B is a pictorial diagram of a one-lane road with traffic and passing areas, according to some embodiments.

FIG. 5B is a pictorial illustration of a region 500' comprising a one-lane road 505c in which traffic may flow in opposite directions at different times over a given segment. The lane 505c has a series of passing areas 508a-c where a vehicle 530a may pull into in order to allow another vehicle from the opposite direction 520a to pass. The passing areas 508a-508c may be on either side (north, as illustrated in the FIG., or south) or both sides of the lane 505c. Different world regions may implement different rules as to which direction of traffic is supposed to pull into which passing areas.

In more detail, road segments 500, 500' are generally either designated as wide (a road segment 500 that allows two vehicles 520, 530 to pass each other), or narrow (a road segment 500' that does not allow two vehicles 520, 530 to pass each other). Wide road segments 500 comprise long wide sections that may be interrupted by narrow sections (e.g., obstructed areas 507). Narrow road segments 500' comprise long narrow sections that may utilize occasional wide sections (e.g., passing areas 508). These are not absolute definitions, and a road that has an equal amount of wide and narrow segments may not necessarily fit cleanly into one designation or the other. Similarly, it may be that a road segment initially considered to be a wide road may actually have more narrow segments. The designation between a wide and narrow road, however, may simply be a state that designates to a sensing vehicle whether it is more efficient to collect narrow area information or wide area information. In some embodiments, both wide and narrow information may be collected, and in these conditions, it may be unnecessary to designate a particular road as being a wide road or a narrow road. Similarly, if wide areas are known for a road, then it is possible to determine which areas of the road are narrow (i.e., they are the regions of the road that are not wide), and vice versa. With such flexibility, the various embodiments described herein can make a correct interpretation of the road condition without getting tangled in the semantics of the nature of the road as a whole.

Information on road situations that may be detected by vehicles and communicated between vehicles may be broadly classified into the following three types and may be collectively be referred to as "area information" 427: narrow road information (or passing information) 427a, wide road information (or obstacle information) 427b, and passing obstacle information 427c. The first type of information, the narrow road information 427a may include information that is collected for narrow road segments 500'. On such narrow roads, wide areas 508 (passing areas) constitute places where vehicles 520, 530 can pass by each other. This passing information 427a may thus comprise wide area information 427a for the narrow road segment 500'. This information may comprise, among other things, a location, a width and a length, a shape, an attribute, and a time of detection for each point, in addition to, or as clarified by, other descriptive portions herein.

The second type of information, the wide road information, may include information for wide road segments 500 related to narrow areas 507 (obstacle areas) where vehicles cannot pass by each other (i.e., obstacle area information 427b). This second type of information may include obstacle area information 427b for the wide road segment 500. The information may comprise a location, a width and a length, a lane identifier, an attribute, and a time of detection for each point in addition to, or as clarified by, other descriptive portions herein.

The third type of information, passing obstacle information, may include information for narrow road segments 500' related to normally wide areas 508 (passing areas) that are temporarily blocked (i.e., passing-obstacle information 427c). The passing-obstacle information 427c is information related to map (or dynamically detected) designated passing areas 508 that normally permit vehicles 520, 530 to pass one another, but that are currently unavailable as passing areas 508 due to an obstacle. The information comprises a location, a width and a length, an attribute, and a time of detection for each point. The location may be represented by a latitude and a longitude, or by a road identifier and a distance from a start point of the road, in addition to, or as clarified by, other descriptive portions herein. The detection of the various types of areas may be performed by passing or obstacle detection and passing determination section 424.

Various use cases are presented herein. In a wide road use case, the focus vehicle 520 is on a road that is represented on a map as a wide road 500. Being on a wide road 500 may mean that the focus vehicle 520 is keyed to detect and record obstacle or narrow areas 507 (as opposed to being on a narrow road 500', described below, in which case the focus vehicle 520 may be keyed to detect and record passing or wide areas 508).

Obstacle area information 427b may be obtained using a sensor or imaging device 405 of a vehicle 520 that is used for detecting the obstacle area 507 information, and thus for identifying an unavailable road lane 505b in the obstacle area 507. Information on a road segment under construction or on a lane restriction due to an accident may be available from externally supplied information, such as a VICS, a device application, or the like. In addition, it may be possible to allow users to input information on an obstacle area 507 using, e.g., a user interface 460 or audio input. These sources of information may be used in various embodiments herein.

When an obstruction is recognized as being a vehicle 520, it may be possible to distinguish between a stopped vehicle that is a temporarily parked vehicle and one that is an extended-time parked vehicle. According to some embodiments, a temporarily parked vehicle may be recognized by its response to an inquiry about its parked state (i.e., it may respond that it is either temporarily parked or extended-time parked, or provide other information, such as accident/damage information, that may be translated into its parked state). However, even if the stopped vehicle does not support embodiments of the system described herein, the status of the stopped vehicle may be recognized based on sensed or user-entered information, which may be based on, e.g., the blinking of a hazard lamp, status of brake light or signal, a warning triangle or flare, an engine status (e.g., running or not), or can be recognized by image processing in a vehicle passing by using a camera (e.g., recognition of a damaged vehicle and the like), or externally supplied information as described above.

In a narrow-road use case, the focus vehicle 520 is on a road that is represented on a map as a narrow road 500'. Being on a narrow road 500' may mean that the focus vehicle 520 is keyed to detect and record passing or wide areas 508 (as opposed to being on a wide road 505, in which case the focus vehicle 520 may be keyed to detect and record obstructed or narrow areas 507, as described above).

Passing area information 427a may be obtained using the sensor or imaging device 405 of a vehicle that is used for detecting the passing area information 427a, and thus for identifying a passing area 508. Such information may also be available from maps, or from externally supplied information, such as a VICS, a device application, or the like. In addition, it may be possible to allow users to input information on places where vehicles pass each other using, e.g., user interface 461.

Passing area information 427a may be obtained using information about where vehicles 520, 530 have actually passed one another, despite there being no other information confirming the location as a passing area 508. Caution may be used, in such situations, since information about two small or narrow vehicles 520, 530 passing each other may not necessarily generalize into two larger or wider vehicles 520, 530 passing each other. By way of example, a location on a road curve/corner may easily constitute a passing area 508 for a short Smart® car, but not constitute a passing area 508 for a long pickup truck. To that point, it may be possible to access and/or store vehicle information related to size, shape, and other characteristics associated with various vehicle types that may be taken into account. Thus, in some embodiments, a passing area 508 for one vehicle may not be a passing area 508 for another, and thus, the designation of certain areas may vary based on vehicle type.

Sharing Area Information and V2VN Communications

New V2VN and New Vehicle Participating in the V2VN

Technical details of known V2VN technologies are not described herein. When a first vehicle 520a and second vehicle 520b establish the necessary criteria for the formation of a V2VN, they may then form a first V2VN 560a. Once the first V2VN 560a is formed, the first vehicle 520a may be designated as a periodic broadcasting vehicle 520a, based on a broadcasting vehicle determining criterion that may be determined using one or more variables, such as location, relative location, available communication bandwidth and/or processing power and the like.

Periodic Broadcast

In a V2VN 560, a single vehicle (e.g., the first or periodic broadcasting vehicle 520a) may serve as a periodic broadcaster that broadcasts the area information 427 stored in its memory periodically in a propagation area 503.

The periodic broadcasting vehicle 520a may broadcast periodically any area information 427 that it has stored to other vehicles in the first V2VN 560a. The second vehicle 520b may be designated as a non-periodic broadcasting vehicle 520b. Although the second vehicle 520b does not automatically broadcast its area information 427, it may still share its area information 427 based on other criteria. The vehicle role of the periodic broadcasting vehicle 520a may be renegotiated at any time and for any of a number of reasons, such as the current periodic broadcasting vehicle leaving the road, moving out of range, etc.

The second vehicle 520b, upon receipt of the area information 427 from the first (broadcasting) vehicle 520a, merges the received area information 427 into its own area information. During the merge, the second vehicle 520b may determine that it has area information 427 that is newer than the area information 427 that it received, such as updated area information 427 on an area already in its database or area information 427 on a new area. When this happens, the second vehicle 520b may perform an update broadcast to share its updated area information 427 with others in the first V2VN 560a. During the merge, the second vehicle 520b may further update its own area information 427 on areas that are newer than the ones currently in its data storage. This process may be described herein as communications Case C. The other vehicles 520 in the first V2VN 560a may update their own area information 427 data stores responsive to both the periodic broadcasting and update broadcasting in a similar manner (performing their own update broadcasting if they have newer area information).

When the second (non-periodic broadcasting) vehicle 520b has not received a broadcast according to the conditions of the periodic broadcast (e.g., within an expected time period), it may assume the role of the periodic broadcasting vehicle 520a. In some embodiments, a random timer or some other network collision prevention measure may be taken so that multiple non-periodic broadcast vehicles in a network do not all simultaneously attempt to assume the role of the periodic broadcasting vehicle 520a. In this scenario, a first announcing vehicle may be granted this role in the network by the other vehicles. Thus, in some embodiments, when a plurality of vehicles 520 attempt to perform a periodic broadcast at substantially the same time, the vehicle that has performed the periodic broadcasting first become the periodic broadcasting vehicle 520a (i.e., the first becomes the winner).

Update of Information

A vehicle 520 may obtain updated information either from its own detection of new area information or obtain updated information from the broadcast of another vehicle (a periodic broadcast or an update broadcast).

With regard to an update of area information from its own detection, when a vehicle 520 detects a particular area for which it is to obtain area information 427 (e.g., passing area information 427a or passing obstacle information 427c when on a narrow road, or obstacle information 427b when on a wide road), it may collect the relevant area information 427 from its sensors. The vehicle 520 may also get area information from either a periodical or update broadcast from another vehicle.

In either case, the vehicle may determine if this newly received area information 427 is newer than area information 427 currently in its possession. This may include an update to area information for an existing area, or an addition of area information for an area that does not yet exist in its area information database. An update may include a removal of information, e.g., a deletion of obstacle area information 427b for a previously reported obstacle that is detected as no longer existing. If so, then the vehicle 520 may store the updated area information 427 in its own area information data store and then proceed to perform an update broadcast to other vehicles. This may be described herein as communications Case A/B.

Each of the vehicles 520 that has received a periodic broadcast may perform the following update of area information operation. The vehicle 520 may compare the received area information 427 with area information 427 already stored in its memory. When the area information is the same, the vehicle does no further processing with regard to the area information. When the area information is not the same, the vehicle merges the newer area information and performs update broadcasting, if necessary. In one implementation, when a periodic broadcasting vehicle 520a has no new area information to be exchanged, it need not perform a periodic broadcasting. In this case, when another vehicle 520b in the V2V network has new area information 427 to be exchanged, that vehicle 520b may become the periodic broadcaster to share the information in the V2VN 560. When a vehicle 520 determines that it is the only vehicle in the V2VN, in some embodiments, it need not perform periodic broadcasting, and in some embodiments, it need not perform update broadcasting.

A vehicle 520 may reach an area for which it has area information 427. When the vehicle detects that the situation has changed in this area (e.g., road construction has been completed to allow vehicles to pass by each other), the vehicle 520 may generate a new area information item 427.n changing the existing area information item 427.n, and may store the new area information item 427.n by replacing the existing item with the new item. When the situation has not changed, the vehicle need not update its existing area information item 427.n. However, the vehicle 520 may, in some embodiments, update a timestamp or expiration information of that area information item 427.n. Such a timestamp update may be based on timestamp update logic, that, for example, makes the timestamp update if the valid period of that item is close to expiration. In cases where the area information item 427.n relates to a wide road, in some embodiments, the time stamp of such an item is not updated (this is because such an area information item 427.n may have been generated to cancel information on an area where vehicles cannot pass by each other in the above described case where "the situation has changed". In that situation, that area information item 427.n should be deleted when the valid period expires). When a vehicle 520 having generated/updated its area information 427 belongs to a V2VN 560, the vehicle 520 may perform update broadcasting (corresponding to case A and case B).

Update Broadcast

The update broadcasting referenced above may be performed in the following cases: a) when a vehicle 520 in a V2VN 560 has detected a point where vehicles can or cannot pass by each other and has generated new area information 427; b) when a vehicle 520 in a V2VN 560 has detected a point where vehicles can or cannot pass by each other and has updated existing area information 427 in accordance with changes in the road 505 status; c) when a vehicle 520 in a V2VN has received broadcasted information (either periodical or update) from another vehicle, merged that information with its own area information 427, and recognized as a result of the merging that an update is beneficial or necessary; and d) when a vehicle 530d/540d belonging to a plurality of V2VNs 560b, 560c has received broadcasted information from one of the plurality of V2VNs 560b and propagated that information to another one of the plurality of V2VNs 560c.

A vehicle 520 having received an update broadcast (or a periodic broadcast) may perform the following operations: the vehicle 520 may merge the received area information 427 into its own stored area information 427 when it is determined that the received area information 427 is newer than its own using the merging operation described herein. When the vehicle 530d/540d belongs to a plurality of V2VNs 560b, 560c, it may perform an update broadcasting towards a V2VN 560c other than the V2VN 560b from which the area information 427 has been received from (above case D).

Merging Passing-by-Each-Other Assisting Place Information

When area information (P) received in a periodic broadcast or in an update broadcast differs from the area information 427 (Q) stored in the focus (receiving) vehicle 520, a merge operation may be performed as follows, in some embodiments. An area information item included only in P (received) may be incorporated (added) into the area information 427 (Q) stored in the focus/receiving vehicle 520. An area information item 427.n that is only in Q (i.e., not received in P) may be left unchanged in the stored area information 427. When the received area information item P is identical (except for the timestamp and certain other associated metadata, such as the vehicle ID collecting the information, etc.) to the stored area information item Q 427.n, the area information item with a newer timestamp may be added or retained in the focus/receiving vehicle, and the area information item with an older timestamp may be discarded. The focus vehicle may determine whether area information items 427.n match based on their locations. When an area information item (P) received from the broadcast differs from the result of the merging, the focus vehicle may perform update broadcasting (corresponding to case C of update broadcasting described herein). In this case, information outside the propagation area is not used in the determination as to whether to perform update broadcasting.

Propagation of Information between Two V2VNs

The area information 427 may be propagated by the use of a command that is communicated from a vehicle 520 in the V2VN 560 via the area information command transfer section 445. A command may comprise a data identifier (data ID) along with the area information 427. Data IDs may be generated to be unique. For example, a data ID may be generated which is based on a combination of location, time, and vehicle identifier, which would preclude another vehicle 520 from generating a confusingly similar command.

In various embodiments, map-registered information on areas or points where vehicles can pass or not pass by each other is not propagated. This may be done to minimize the amount of traffic communicated within the V2VN 560 and to avoid duplication of data. The contents/attributes of the area information 427 may be assigned based on the sensors 410 used to acquire the area information 427, the nature of the road 505, 505' (e.g., one-lane/narrow, multi-lane/wide), and the type of object detected (e.g., obstacle, passing area). A valid period for the area information 427 may be determined depending on each attribute.

When a receiving vehicle 530*b* receives a periodic broadcast of area information 427 from a periodic broadcast vehicle 530*a* in a V2VN Y 560*b*, and determines that this received area information 427 has not been shared in the V2VN Y 560*b*, the receiving vehicle 530*b* may, in some embodiments, perform update broadcasting in the V2VN Y 560*b* (case C). This may ensure, e.g., that if the receiving vehicle 530*b* joined the V2VN Y just before the periodic broadcast, can promptly access information shared in the V2VN Y. In some embodiments, other non-periodic broadcast vehicles 530*c* in the V2VN Y 560*b*, upon receiving the updated area information 427, may perform the update procedure described above.

When a vehicle 530*d*/540*d* is a dual-member of two different networks V2VN Y 560*b* and V2VN Z 560*c* and has received area information 427 from the periodic broadcaster 530*a* in one network, such as V2VN Y 560*b*, after it has updated its stored area information 427, it may perform an update broadcast in the other network V2VN Z 560*c* (case D), and the other vehicles 540*a*, 540*b*, 540*c* on the other network V2VN Z 560*c* may perform the update procedure as described above as well. In this way, new area information 472 may propagate across V2VNs 560. Update broadcasting may also be performed to the V2VN X 560*a* using the process described above. In some embodiments, vehicles 530, 540 may be attempting to join other/any available networks, even if they are already members of one or more networks.

Area Information to be Exchanged in Periodical/Update Broadcasting and Propagation Area For each area information item 427.*n*, a propagation area 427*d* may be determined. In some embodiments, when a vehicle 520 performs periodical/update broadcasting, the vehicle 520 does not need to transmit all of the area information items 427.*n* held in the storage area (e.g., area information database 428) of the vehicle 520, but may instead transmit only those area information items 427.*n* within a propagation area 427*d*. A later-described "road segment in which vehicles need to be assisted for passing by each other" corresponds to the smallest one of that area. Based on a current location of a vehicle 520*a* serving as a broadcaster and the propagation areas 427*d* of area information items 427.*n*, the vehicle 520*a* may determine which area information items 427.*n* are to be transmitted. When a vehicle 520*b* that has received a broadcast performs merge processing, the vehicle 520*b* may continue to hold certain area information items 427.*n* (out-of-propagation-area information items (OPAII)) that are outside of the propagation areas 427*d* for those items. In some embodiments, the vehicle 520*b* does not use the OPAII in the determination as to whether to perform update broadcasting.

Holding of Area Information

A vehicle 520 having received area information 427 (or a vehicle having sensed an area to collect information from and generated the area information) may, in some embodiments, continue to hold that area information 427 without discarding it, provided certain conditions are met. These conditions may comprise regional conditions and temporal conditions, and may further comprise other elements. In one illustrative example, according to an embodiment, the vehicle is present in the holding area 504. A valid period from a timestamp of the area information item 427.*n* has not yet expired. Each area information item 427.*n* may be given a valid period which may be based on an attribute of the item. By way of example only, area information designated by a user may be valid for one year; vehicle information detected by a sensor may be valid for one day, whereas sensor detected dirt and fallen trees may be valid for two weeks; traffic system information on an accident may be valid for one day, whereas the traffic system information related to construction may be valid for two weeks; and data from actual vehicles having passed by each other may be valid for two weeks. The timestamp may thus be related to an expiration date/time at which time the area information item 427.*n* is considered to be no longer valid or at least be transitioned to some other state, such as no longer included in an update or the like.

For example, as to information on a point where vehicles temporarily cannot pass by each other due to a stopped vehicle used for moving objects (e.g., a hauling truck), the valid period may be one day, based on the presumption that a moving of all of the vehicles contents will take no longer than that. At the end of the day, area information associated with the presence of the stopped vehicle may be presumed to have expired. When such a stopped vehicle is detected as having moved away, the area information item 427.*n* associated with the stopped vehicle may be canceled or tagged as expired even before its valid period expires. Expired data may be discarded from the vehicle area information database 428 once it has expired.

Not all area information items 427.*n* need be discarded in accordance with the same criterion. When the vehicle 520 has gone out of a holding area 504, the vehicle may discard the area information items 427.*n* whose valid period has expired, while holding onto other items 427.*n* that have not expired. This may allow the vehicle 520 to propagate information when returning to the holding area that has not yet expired.

Processing Area Information into Assistance Assessment

Basic Assessment 600

Figure 6A:
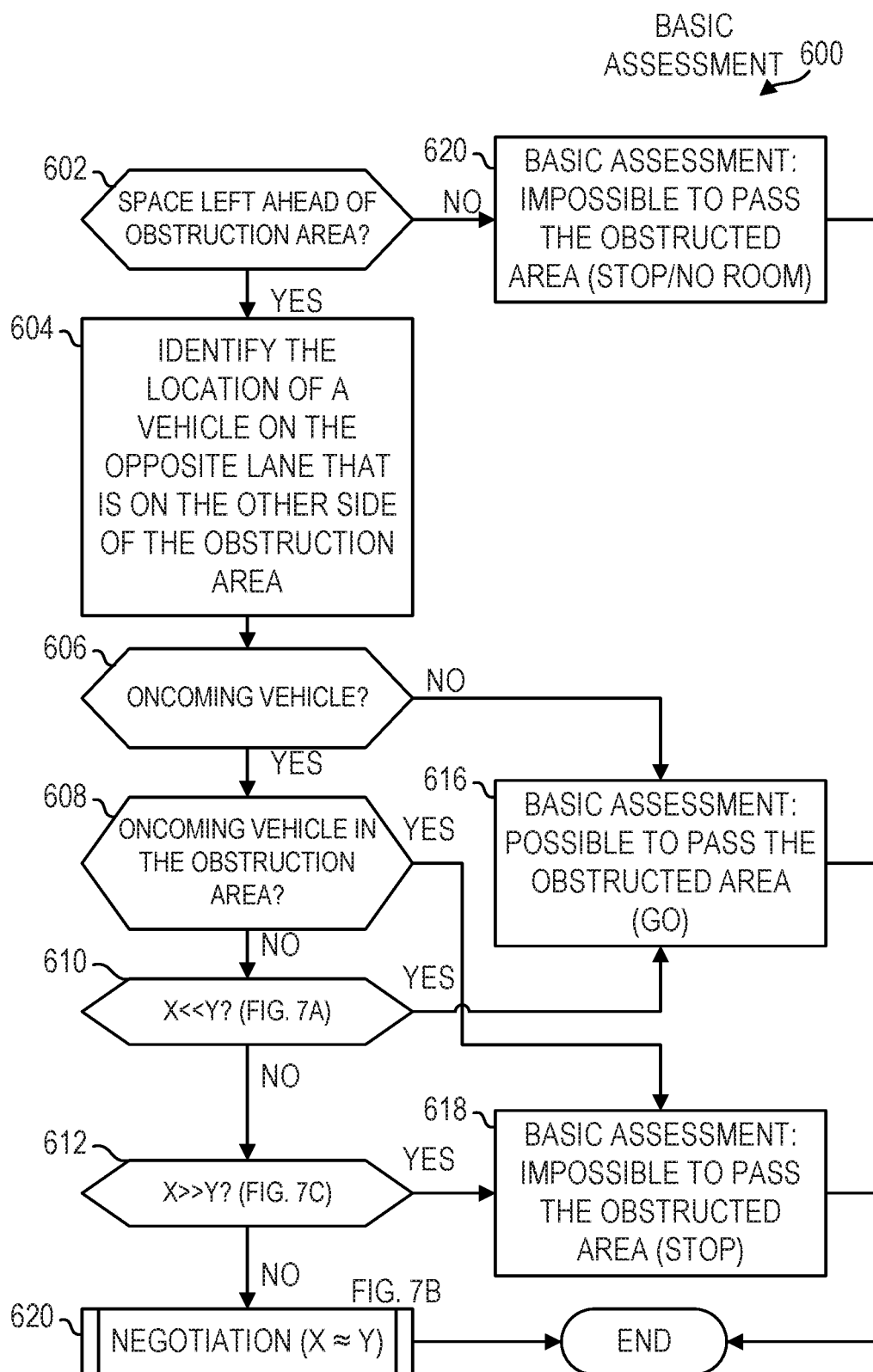
FIG. 6A is a flowchart illustrating a basic assessment process, according to some embodiments.

FIG. 6A is a flowchart illustrating a basic assessment process 600, according to some embodiments. Assistance assessment may be provided to the vehicles via the area information assessment section 426. Reference may further be made to FIGS. 7A through 7C, which are pictorial diagrams illustrating the basic assessment process, according to some embodiments. The basic assessment may ultimately produce, e.g., a focus vehicle action selected from stopping the focus vehicle, proceeding with the focus vehicle, and negotiating with the oncoming vehicle. In operation 602, a determination may be made as to whether there is any space left ahead of an obstruction area 507 in a space area 505*a*1. Referring to FIG. 7A, using vehicle 520 as the focus vehicle and its normal travel (first) lane 505*a* being a west-to-east lane, this question considers whether there is space in the space area 505*a*1 that is front (east of) the obstacle 507 in the first lane 505*a* or whether this region is clear to allow the focus vehicle 520 to pass the obstruction without interference. No space left ahead in the space area 505*a*1 may be caused by a traffic back up or some further obstruction. If there is no space left in the space area 505*a*1 (602: NO), then the result of the basic assessment may be made in operation 620 that it is impossible to pass the obstructed area and a stop/no room assessment may be made. In this situation, when no space being left is caused by traffic, it may be possible to move again once the traffic has moved out of the area.

If there is space left in the space area 505*a*1 (602: YES), then in operation 604, a location is identified of a vehicle 530 on the opposite lane (second lane, east-to-west) 505*b*. In operation 606, if there is no oncoming vehicle 530 (606: NO), then the result of the basic assessment may be made in operation 616 that it is possible to pass the obstructed area and a go assessment may be made. If there is an oncoming vehicle 530 (606: YES), then in operation 608, it is determined whether the oncoming vehicle is in the first lane 505*a* adjacent to the obstruction area 507 (Y≤0). If so (608: YES), then the result of the basic assessment may be made in operation 618 that it is impossible to pass the obstructed area and a stop assessment may be made. In this situation, it may be possible to move again once the oncoming vehicle 530 has cleared the lane adjacent to the obstruction area 507.

If there is no oncoming vehicle in the lane adjacent to the obstruction area 507 (608: NO), then in operation 610, a determination is made as to whether X<<Y, meaning the focus vehicle 520 is much closer to the obstruction 507 than the oncoming vehicle 530, according to some predefined criteria. In one implementation, this criteria may be a determination as to whether the focus vehicle 520 can safely pass the obstruction 507 without interfering with the travel of the oncoming vehicle 530. If X<<Y (610: YES), as illustrated in FIG. 7A, then operation 616, as described above, may be implemented. If this is not true, then a determination is made at operation 612 as to whether X>>Y. If so (612: YES), as illustrated in FIG. 7C, then operation 618, as described above, may be implemented. If, however, X>>Y is false (612: NO), then that implies that X Y, as illustrated in FIG. 7B, and a negotiation procedure 620 is implemented (the other conditions described above do not require negotiation).

The go, negotiate, and stop indications may be provided on a display of the vehicle 520, such as on a HUD—the display is discussed in more detail below. These indications may be described as text and/or have other forms of indication provided. In some implementations, color may be used—for example, green may be indicative of "go", yellow may be indicative of "negotiate", and red may be indicative of "stop".

Negotiation 620

Figure 6B:
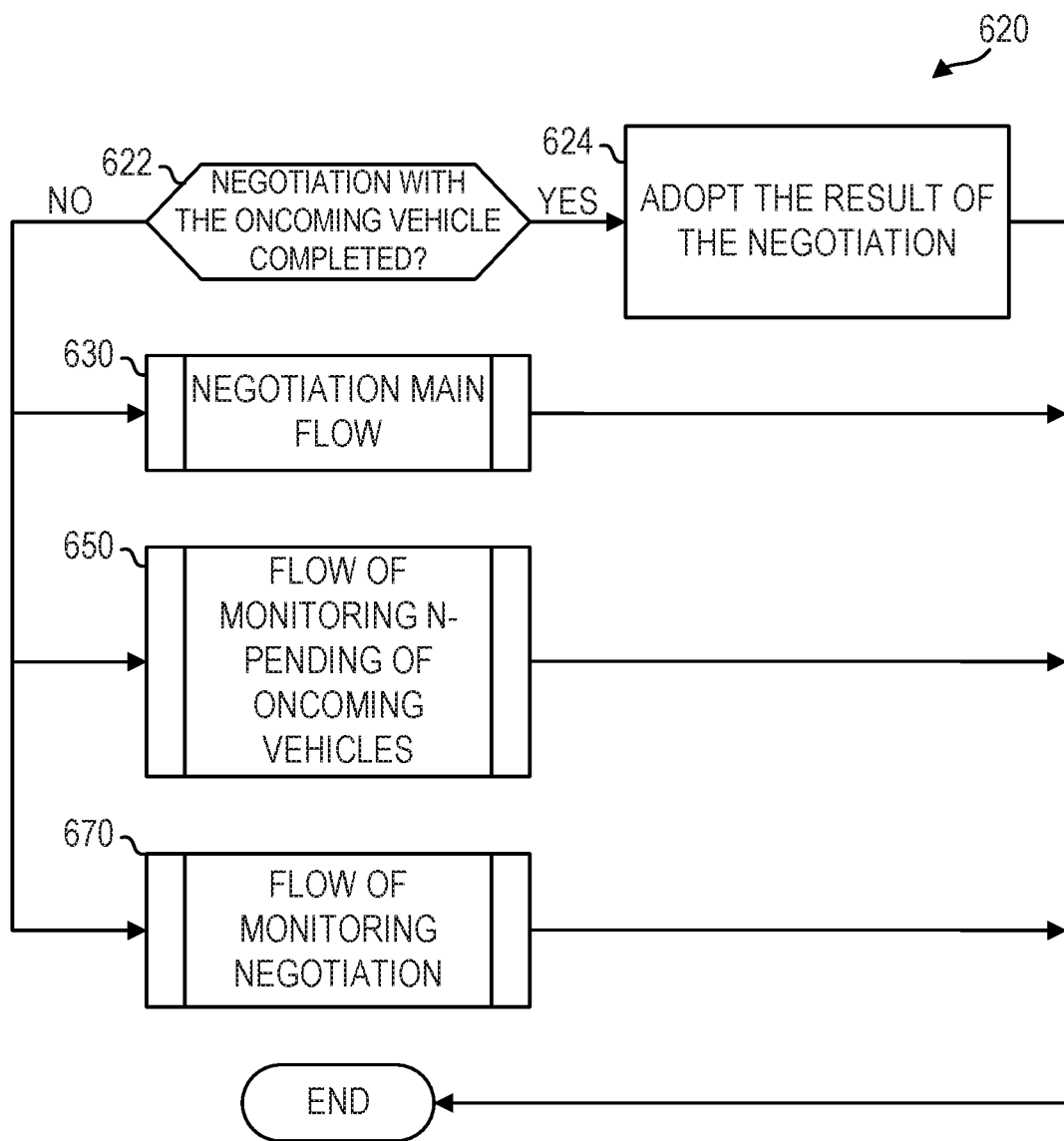
FIGS. 6B through 6E are parts of a flowchart illustrating a negotiation process, according to some embodiments.

FIGS. 6B through 6E are parts of a flowchart illustrating a negotiation process, according to some embodiments. FIG. 6B is a flowchart of an overview of the negotiation procedure 620. In operation 622, a determination is made as to whether the negotiation with the oncoming vehicle 530 is complete. When it is (622: YES), then in operation 624, the results of the vehicle are adopted by the focus vehicle 520 and the oncoming vehicle 530. When the negotiation is not complete (622: NO), then three separate processes may be concurrently invoked to run or continue to run. These processes may include: a negotiation main flow process 630, a flow of monitoring n-pending of oncoming vehicles process 650, and a flow of monitoring negotiation process 670.

Negotiation Main Flow 630

Figure 6C:
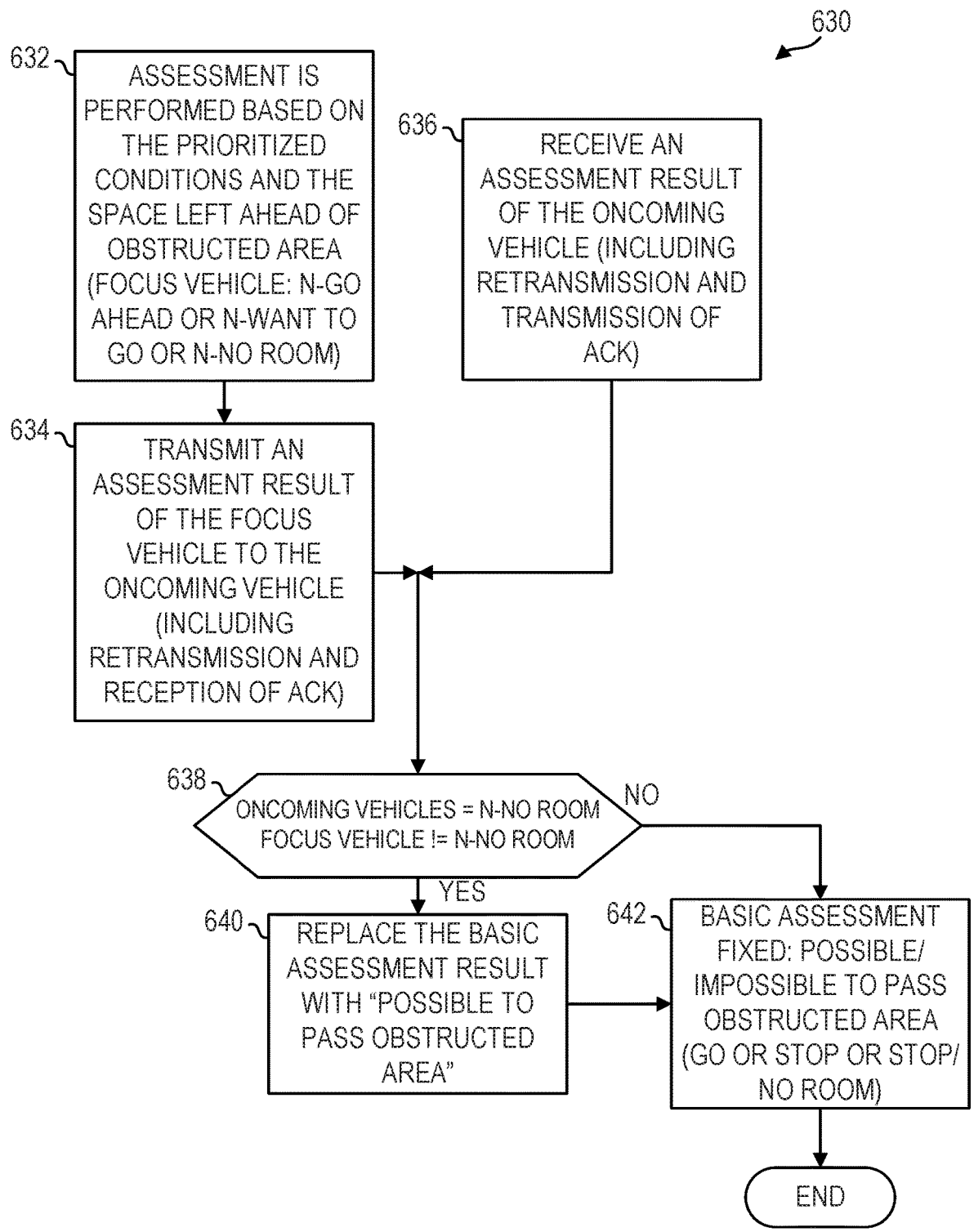

FIG. 6C is a flowchart illustrating the negotiation main flow process 630. As disclosed herein, a negotiation state may be represented by N-xxxx, and stages of the negotiation may be represented by <Xn> where X represents a broad operation category, and n is a sequential number within that category. The vehicles 520, 530 may utilize negotiation information in the course of the negotiation. This negotiation information may include: 1) a vehicle ID, which is a vehicle ID of the vehicle that issues this negotiation information; 2) target obstructed area (location) 507 information, which indicates "which area the negotiation is being performed in connection with"; 3) negotiation status (N-xxx); and 4) trafficable area state, which indicates whether (true/false) the vehicle is in a trafficable area. It may be used to identify a vehicle to negotiate with in state <L1> (for the next vehicle in the trafficable area).

Conditions for which priority for proceeding may be given (prioritized conditions) may include: the location of the obstacle 507, current or projected waiting time, whether one is ascending or descending in altitude, a number of succeeding vehicles, congestion and/or a traffic signal state on the road located ahead, and having been in wait state (or a duration in a wait state) (return from waiting in line; see state <L1>). By determining a situation under the same conditions and using the same logic means that both vehicles 520, 530 can be made to agree as to which side is selected to move forward without requiring an exchange of information.

Figure 8:
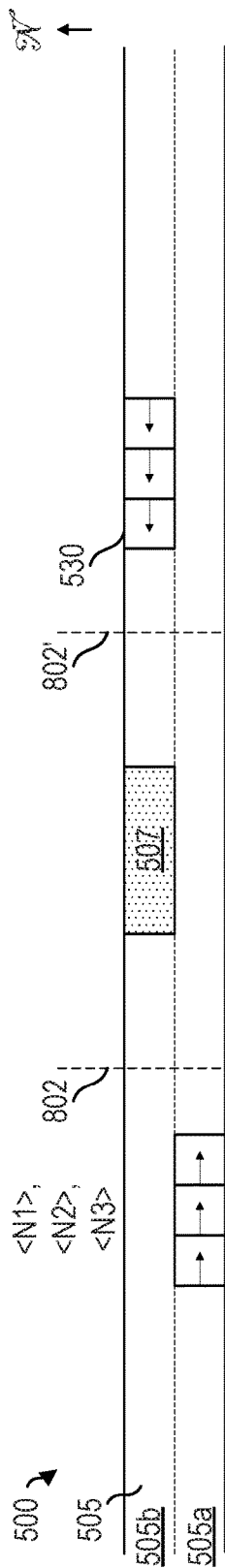
FIG. 8 is a pictorial diagram illustrating the negotiation process, according to some embodiments.

When vehicles approach each other, as shown by example in FIG. 8 where a focus vehicle 520 and an oncoming vehicle 530 are both approximately the same distance from the obstacle 507, they approach each other in state <N1> in an N-undefined state (i.e., no negotiation has taken place). Upon applying the prioritized conditions, in state <N2>, in operation 632, an assessment is performed based on: the prioritized conditions, and the space left ahead of the obstructed area 507. The focus vehicle 520 may determine a negotiation state of N-GoAhead, N-WantToGo (according to prioritized conditions), or N-NoRoom. In operation 634, the focus vehicle 520 may transmit an assessment result of itself to the oncoming vehicle 530—this may include retransmission and reception of an acknowledgement (ACK) of receipt. In operation 636, the focus vehicle 520 may also receive an assessment result of the oncoming vehicle 530—this may include retransmission and transmission of an ACK of transmission. The assessment results described herein may be provided by, e.g., the area information assessment result display section 462.

In state <N3> the vehicles 520, 530 check the N-GoAhead and N-WantToGo status of the other side, and a stop/go condition is fixed for each vehicle 520, 530. This avoids a situation in which only one side has finished negotiation. With the vehicle conditions now fixed, the status of the negotiation may revert back to N-undefined. For example, the target vehicle 520 may now have a status of stop/N-undefined, and the oncoming vehicle 530 may have a status of go/N-undefined.

Figure 9A:
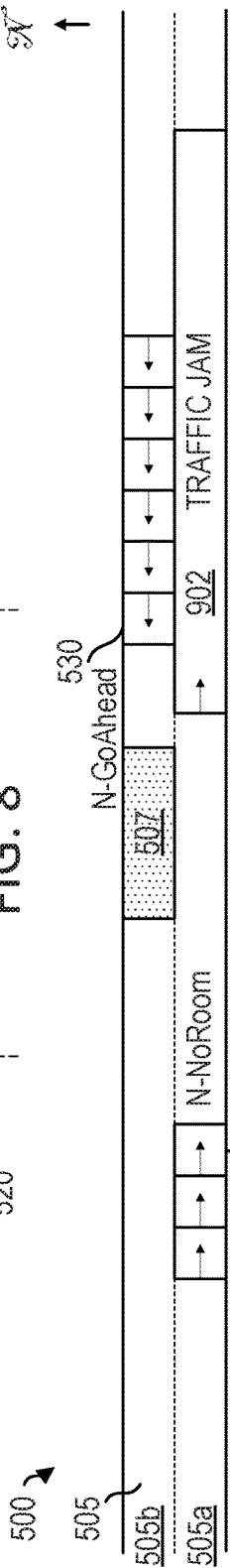
FIGS. 9A through 9C are pictorial diagrams illustrating a variation in conditions, according to some embodiments.
Figure 9B:
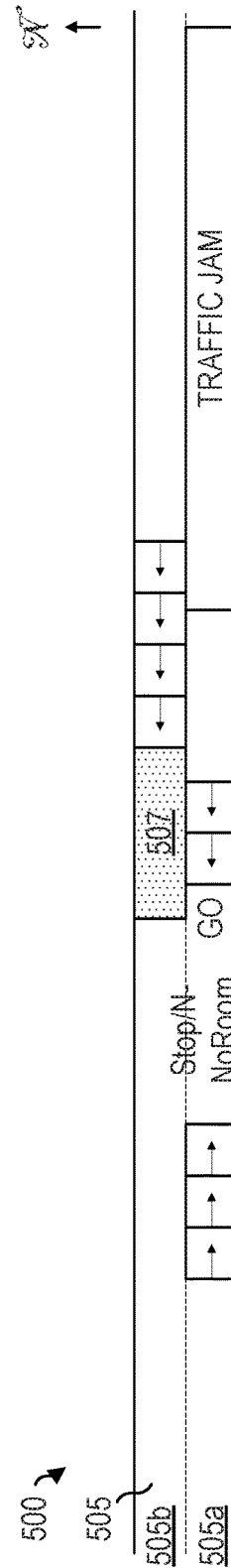
Figure 9C:
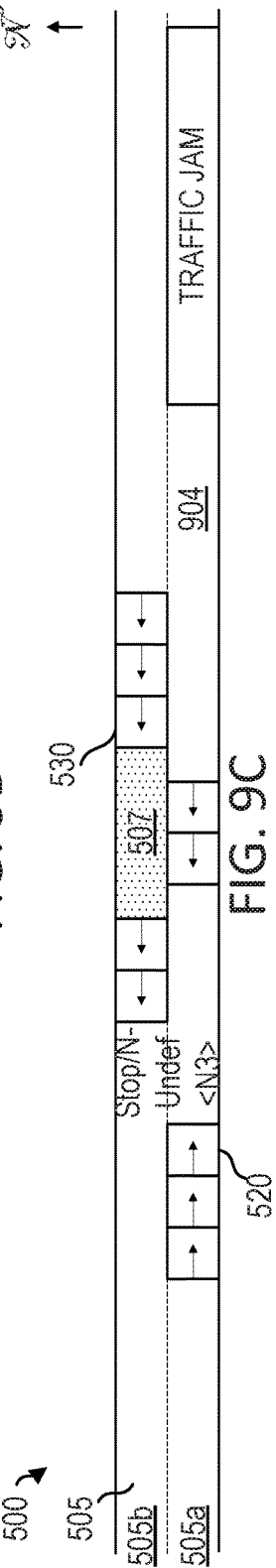

In operation 638, if a status during the negotiation results in other vehicles=N-NoRoom and focus vehicle !=N-NoRoom (638: YES), then in operation 640, the basic assessment result is replaced with "possible to pass obstructed area 507", otherwise, operation 640 is skipped and the process proceeds to operation 642, where the basic assessments is fixed into possible/impossible to pass obstructed area (go or stop or stop/no room). FIGS. 9A through 9C illustrate this situation. In FIG. 9A, a traffic jam 902 may prevent the focus vehicle 520 from proceeding beyond the obstacle 507, in which case the negotiation status for the focus vehicle 520 is N-NoRoom, and the negotiation status for the oncoming vehicle 530 is N-GoAhead. In FIG. 9B, the status of go is given to the vehicle that can proceed (in this illustration, the oncoming vehicle 530 is the vehicle that can proceed), and the other vehicle (here the focus vehicle 520) is given the status stop/N-NoRoom. In FIG. 9C the traffic jam 902 has moved far enough ahead to create a space in which it becomes possible for the focus vehicle 520 to proceed again, and thus its status becomes stop/N-undefined (negotiations are complete)—this gives the state <N3> discussed above. In FIG. 9C, the space 904 created ahead of the obstacle for the focus vehicle 520 is shown.

Flow of Monitoring N-Pending of Oncoming Vehicles 650

Figure 6D:
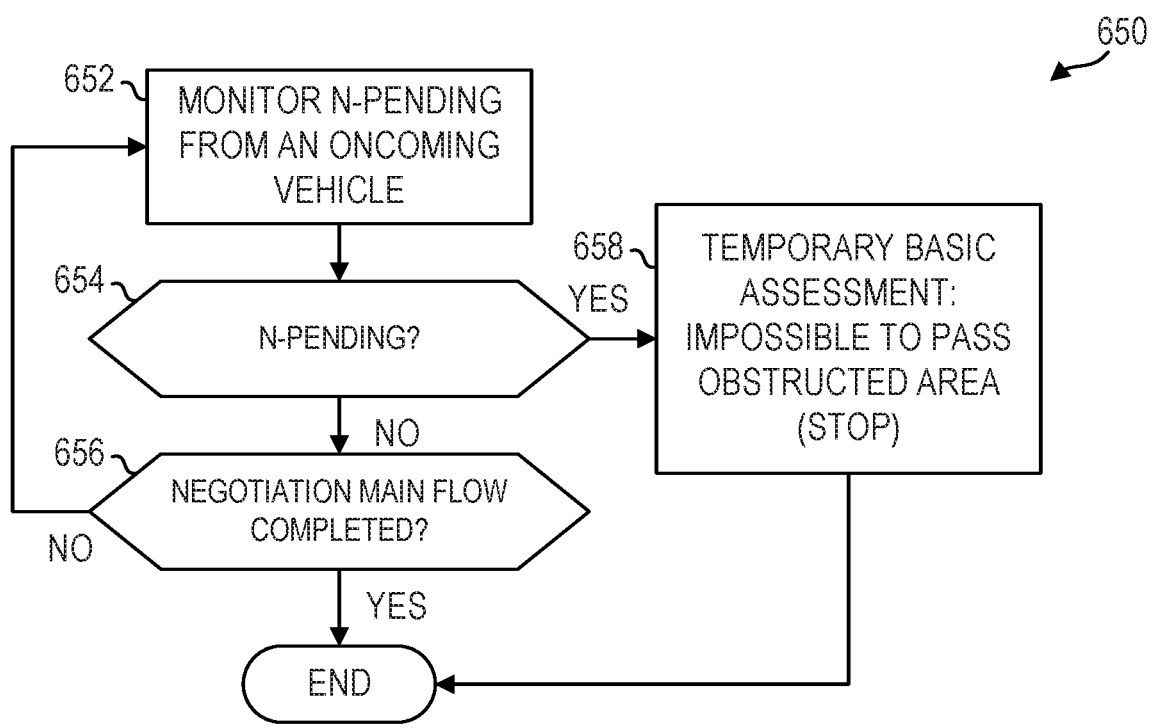

FIG. 6D is a flowchart illustrating the flow of monitoring N-Pending of oncoming vehicles process 650. A situation may occur where the negotiation may not be completed in time to implement the above, i.e., in FIG. 8, the negotiation is not completed before the vehicles 520, 530 reach a predetermined negotiation completion distance 802, 802'. If the negotiation in state <N2> has not been completed before approaching the predetermined distance 802, 802', both vehicles 520, 530 may stop and then perform the negotiation—in other words, both sides have a status of stop/N-Pending. In operation 652, the focus vehicle 520 may monitor an N-Pending status from the oncoming vehicle 530. When the oncoming vehicle's 530 status is N-Pending (654: YES), then, in operation 658, a temporary basic assessment of impossible to pass obstructed area (stop/N-Pending) is set. Otherwise, if the status is not N-Pending (654: NO), a test in operation 656 determines whether the negotiation in the main flow is completed. If not (656: NO), the process 650 returns to operation 652—otherwise (656: YES), the process 650 ends.

Flow of Monitoring Negotiation 670

Figure 6E:
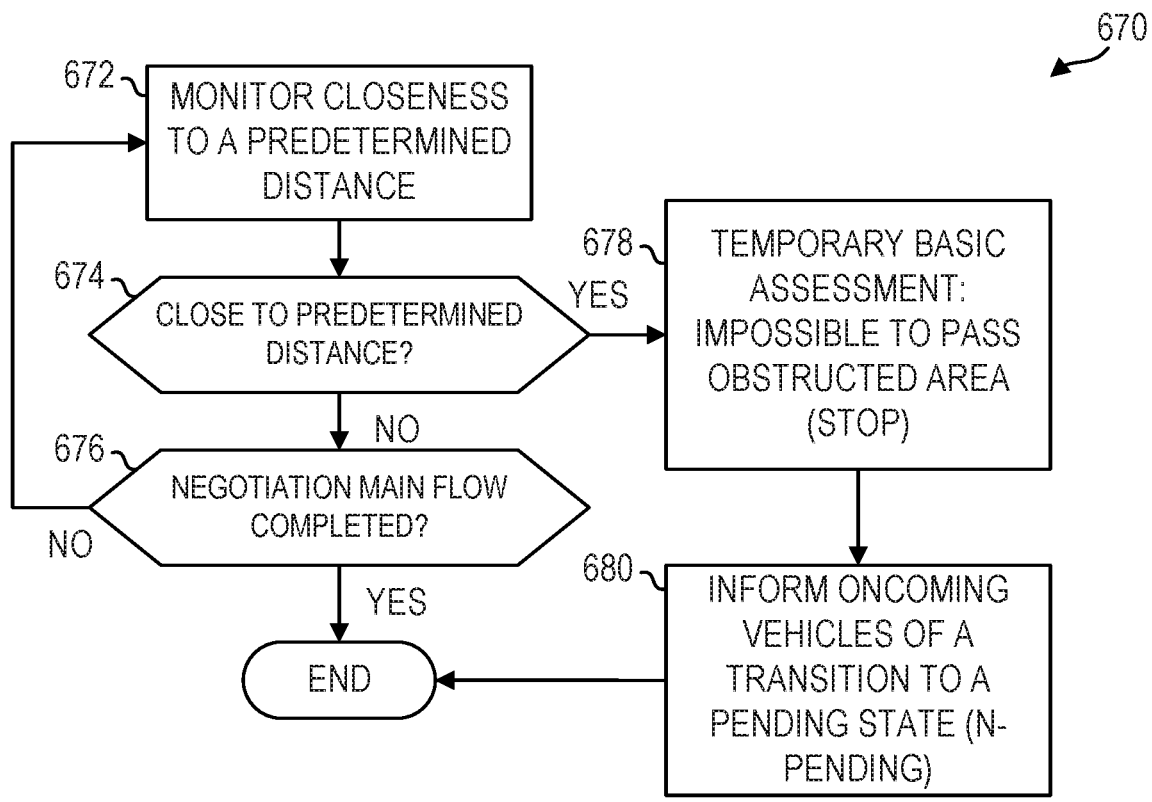

FIG. 6E is a flowchart illustrating the flow of monitoring negotiation process 670. In operation 672, the focus vehicle 520 monitors a closeness to a predetermined distance 802 from the obstacle 507. If it is not close to or beyond the predetermined distance 802 (674: NO), then if the negotiation mail flow is completed (676: YES), the process 670 ends. Otherwise (676: NO), the process returns to operation 672. If the focus vehicle 520 is close to or past the predetermined distance 802 (674: YES), then in operation 678, (similar to operation 658), a temporary basic assessment of impossible to pass obstructed area (stop/N-Pending) is set, and in operation 680, the focus vehicle 520 informs oncoming vehicles of a transition to the N-Pending state.

Short and Long Processions—Trafficable Areas

Trafficable Area

Figure 10:
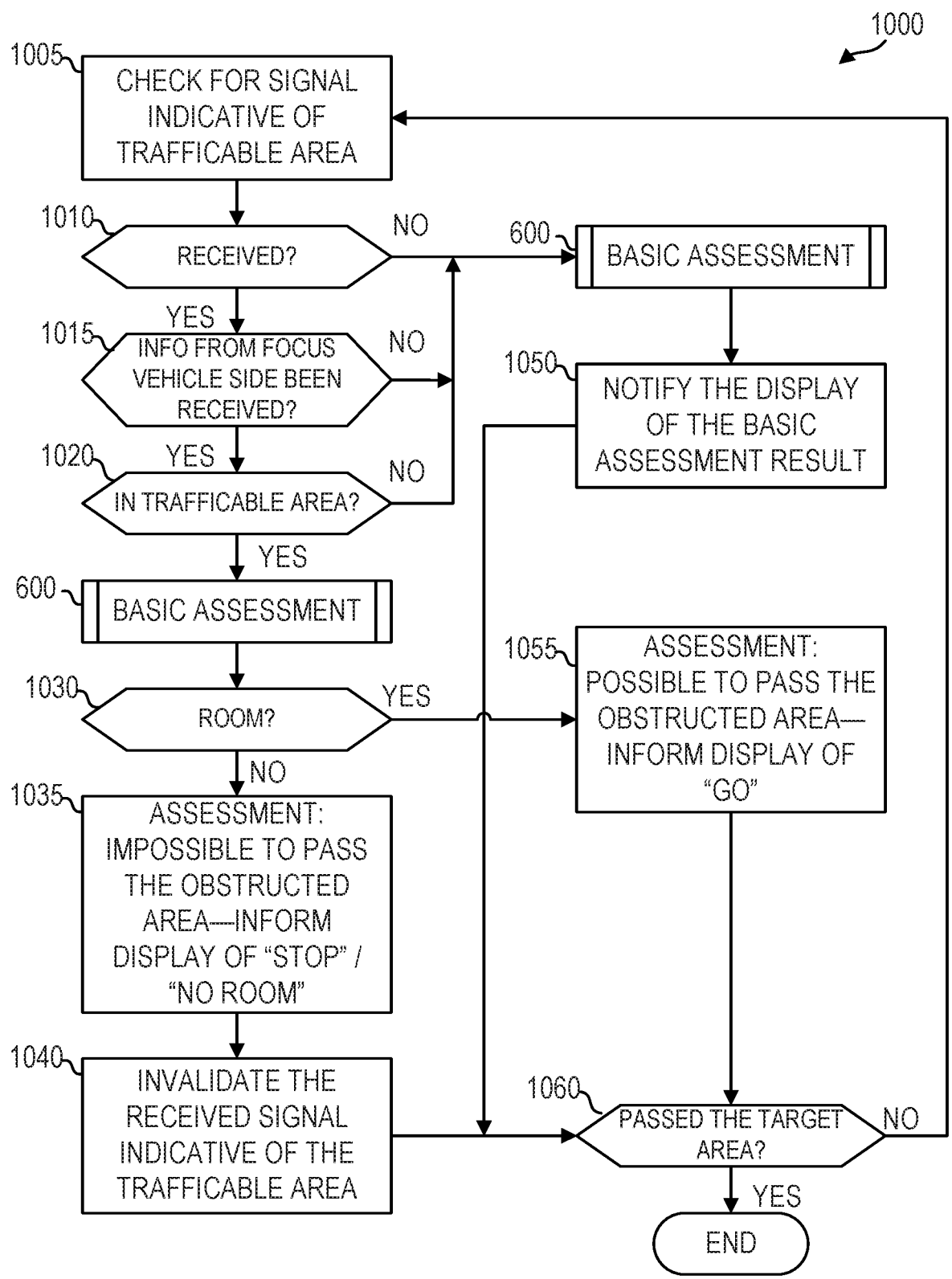
FIG. 10 is a flowchart illustrating an assisting mode in a one-side traffic segment, according to some embodiments.
Figure 11A:
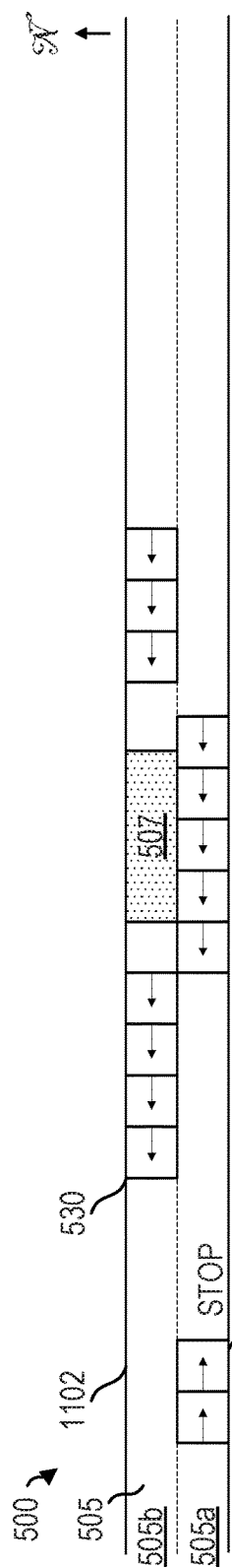
FIGS. 11A and 11B are pictorial diagrams illustrating the determination of a trafficable area, according to some embodiments.
Figure 11B:
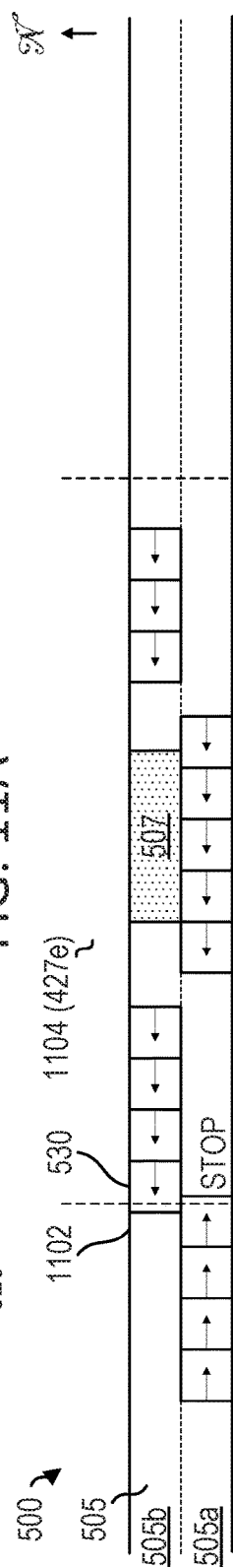

FIG. 10 is a flowchart illustrating an assisting mode in a one-side traffic segment process 1000, according to some embodiments, and FIGS. 11A-13H illustrate the determination of and use of trafficable areas. A definition of a trafficable area is provided above, and is also illustrated in the following. FIG. 11A is a pictorial illustration of vehicles prior to the creation of a trafficable area, i.e., a trafficable area does not yet exist. In FIG. 11A a first vehicle train 520 is in a state of stop (thus defining a stop area 1102) and waiting for an oncoming vehicle train 530 to move through the obstruction area 507. The creation of a trafficable area may be triggered by the oncoming vehicle train 530 entering the first vehicle train 520 stop area 1102, which has not yet occurred in the configuration shown in FIG. 11A. In the configuration shown in FIG. 11B, however, the first vehicle of the oncoming vehicle train 530 has now entered the stop area 1102, which may trigger the creation of the trafficable area 1104.

When a vehicle 520, 530 recognizes that the oncoming vehicle train 530 has entered the stop area 1102, this may trigger any vehicle 530 in the stop area 1102 to generate and broadcast information about the trafficable area 1104. The trafficable area 1104 may be calculated to extend from the start of the stop area 1102 (from the perspective of the oncoming vehicle train 530) (start of the trafficable area 1104) to a distance back into the oncoming vehicle train 530 (back west, in FIG. 11B) according to a rule. In some embodiments, the rule may dictate a particular distance, such as an absolute distance from the start of the trafficable area 1104 (e.g., 0.5 km), or an absolute distance from a start or end point of the obstacle 507. In other embodiments, the rule may dictate a time of travel for vehicles, e.g., one minute back, and a distance may be calculated based on a flow rate of the vehicle train 530. Vehicles that are within or enter the trafficable area 1104 may perform broadcasting with a flag (e.g., in the basic data) indicating that they are in the trafficable area 1104. Broadcasted flag data of vehicles may be used by a waiting vehicle to determine which vehicle is to be used to perform the basic assessment based on a positional relationship with a vehicle. Thus, in some embodiments, vehicles of the 530 train in the trafficable area may broadcast data with a setting of a flag indicating such turned ON. The first vehicle of 520 may perform the basic assessment with first vehicle of the 530 train (530.1 of FIG. 13A) that does not set this flag in the broadcast data. See FIG. 6C and the discussion above with respect to state <L1>.

Referring to FIG. 10, in operation 1005, a check is made for a signal indicative of a trafficable area 1104, i.e., whether a trafficable area 1104 exists or not. If no trafficable area 1104 signal has been received (1010: NO) then this implies that the trafficable area 1104 has not been set and the vehicle processions/trains are not passing by each other. In this condition, the target vehicle is an oncoming leading vehicle. The basic assessment process 600 is then performed and in operation 1050, a vehicle display is notified of the assessment result. A test is made in operation 1060 to determine if the vehicle is past the target area. If the vehicle is not past the one-side traffic segment (1060: NO), then the process is repeated by returning to operation 1005, otherwise (1060: YES), then the process 1000 ends.

If a trafficable area 1104 signal has been received (1010: YES), then a determination is made as to whether information from the focus vehicle 520 side has been received. If not (1015: NO), then the target vehicle is an oncoming leading vehicle and an oncoming first vehicle outside of the trafficable area 1104; with regard to the flow of vehicles on the "stop" side, a "stop" may be determined in connection with the relationship with the oncoming leading vehicle, and a "go" may be determined in connection with the relationship with the oncoming first vehicle outside the trafficable area 1104 (go-wait). Execution continues at the basic assessment process 600 as described in the previous paragraph. If so (1015: YES), then a determination is made as to whether the focus vehicle 520 is in the trafficable area. If not (1020: NO), then the target vehicle is the oncoming leading vehicle, and, for vehicles outside of the trafficable area, a "stop" may be determined according to the basic assessment 600 with the leading vehicle on the stop side; execution continues at the basic assessment process 600 as described in the previous paragraph. If so (1020: YES), then the target vehicle is the oncoming leading vehicle, and vehicles in the trafficable area 1104 are "go", unless there is "no room"; the basic assessment process 600 is performed, and, in operation 1030, a determination is made as to whether there is available room for the focus vehicle 520 to pass. If so (1030: YES), then in operation 1055, the basic assessment result is provided that it is possible to pass the obstruction area 507 and a status of "go" is assigned and displayed. Execution continues at operation 1060, as described above.

If there is no room for the focus vehicle 520 to pass (1030: NO), then, in operation 1035, the result of the basic assessment is provided that it is impossible to pass the obstructed area, and a status of "stop/no room" is assigned and displayed. Additionally, in operation 1040, the received signal indicative of the trafficable area 1104 may be invalidated, and execution may continue at operation 1060 as described above.

Short Procession

Figure 12A:
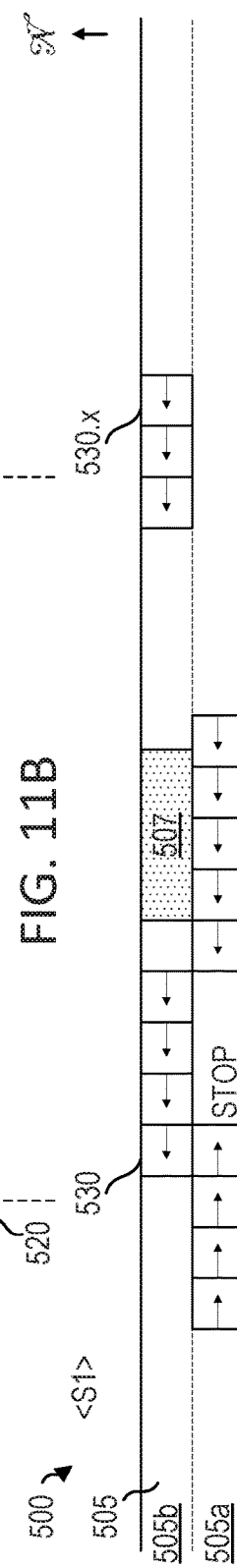
FIGS. 12A and 12B are pictorial diagrams illustrating a short vehicle procession passing by, according to some embodiments.

FIG. 12A is a pictorial diagram illustrating the process of waiting until a short vehicle procession passes by in a first state <S1>. When the length of a vehicle procession is short, stopped vehicles 520 from the opposite direction lane wait until all vehicles 530 in the short procession have passed by. This may be controlled according to the trafficable area 1104, and each vehicle may determine whether it is in the trafficable area 1104. Stopped vehicles 520 check to see if they can pass the trafficable area 1104 according to the basic assessment process 600. Not shown in FIG. 12A is a second state <S2> in which a lagging vehicle 530.x towards the end of the moving procession is somewhat apart from other vehicles in the procession. This lagging vehicle 530.x may still move through the obstruction area 507 as long as it is still within the trafficable area 1104.

Figure 12B:
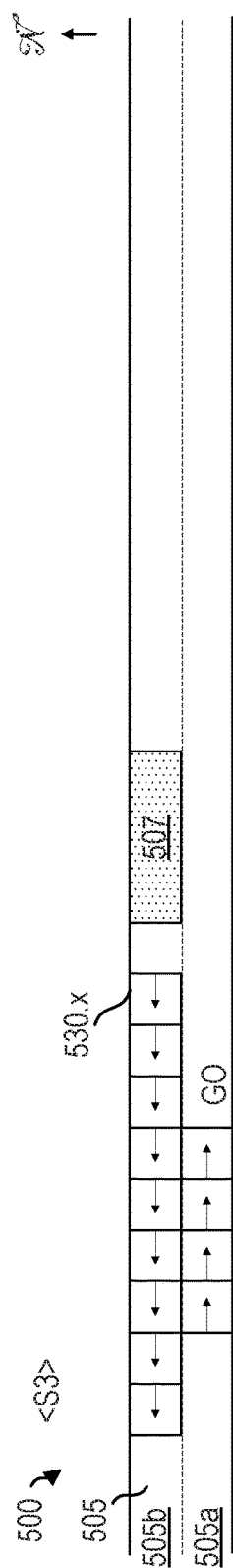
Figure 14A:
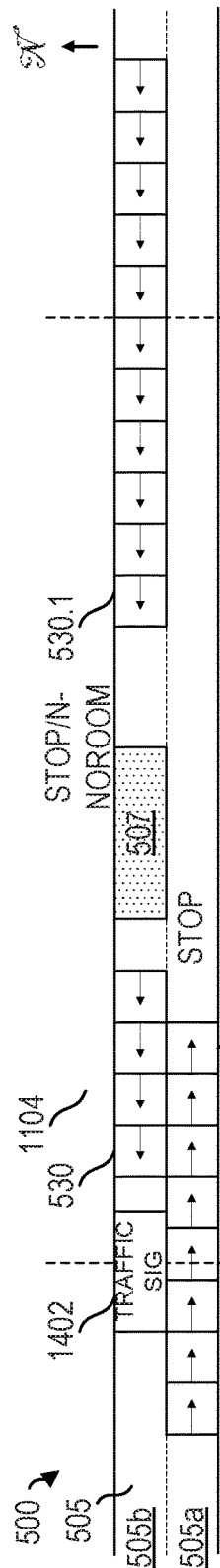
FIGS. 14A through 14D are pictorial diagrams illustrating a long vehicle procession passing by with traffic signals, according to some embodiments.
Figure 14B:
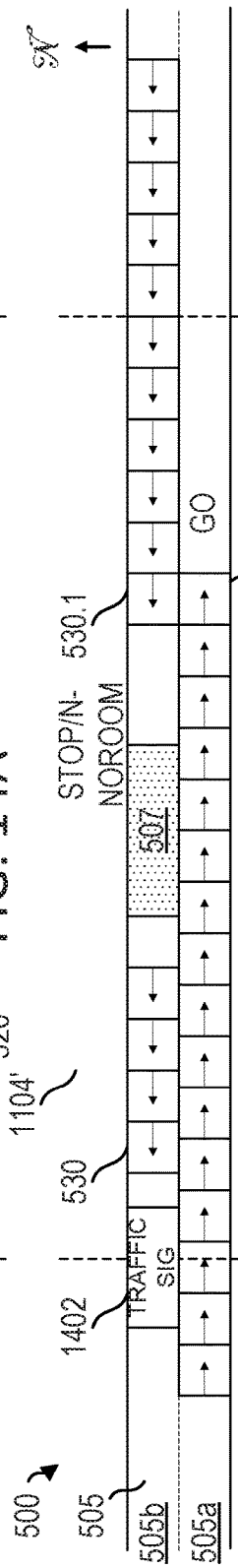
Figure 14C:
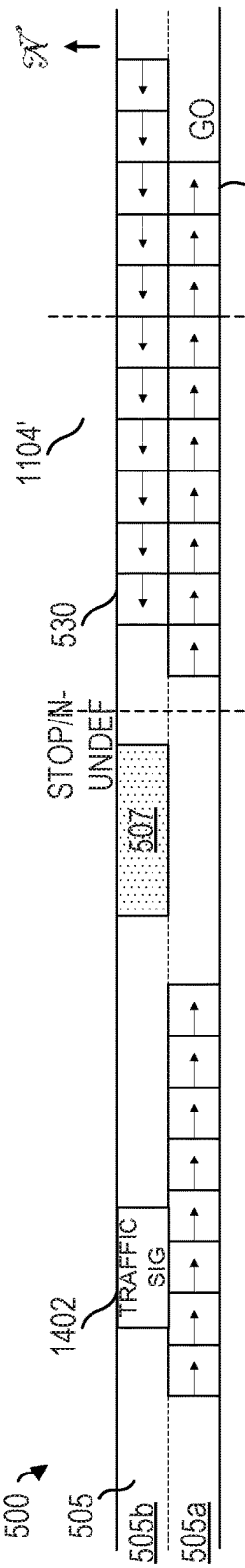
Figure 14D:
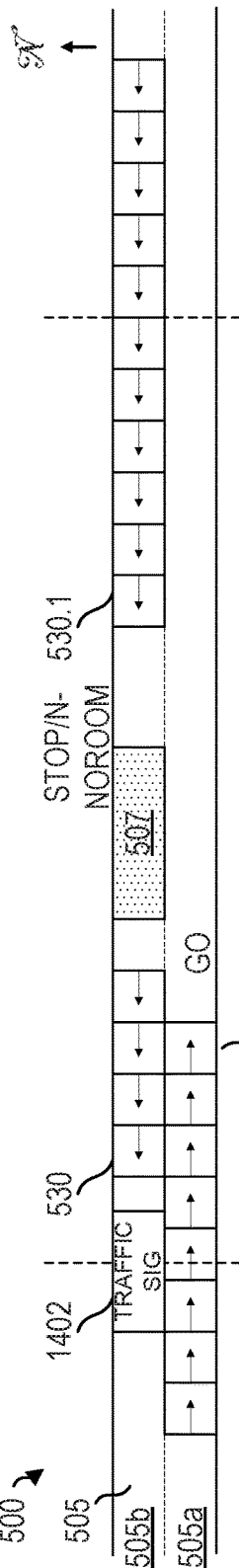

FIG. 12B is a pictorial diagram illustrating a third state <S3> in which the oncoming vehicles 530 in the short procession have passed by the obstacle 507, and the vehicles in the previously stopped vehicle procession 520 now have a state of "go". This state <S3> is equivalent to the basic assessment state <BA2> shown in FIG. 7A for operation 610.

Long Procession

FIGS. 13A through 13H are pictorial diagrams illustrating a long vehicle procession passing by with a traffic jam (in some FIGS.), according to some embodiments. A long vehicle 530 procession that extends beyond the trafficable area 1104 may be divided and a later/further back portion of the procession designated to stop at the obstacle 507. In FIG. 13A, which represents a state <L1>, the trafficable area 1104 is represented between the dashed lines, and some of the vehicles (from 530.1 and further back) are outside of the trafficable area 1104. Control of the vehicles under these conditions may be performed according to a combination of the trafficable area determination and the basic assessment.

FIG. 13B illustrates a basic assessment that is performed between the vehicle 530.1 outside of the trafficable area 1104 and vehicles 520 from the opposite direction that have stopped prior to the obstacle area 507. From the viewpoint of the vehicles 520 in the stop area, their status may transition from stop to either go or negotiate (when in a state of negotiate, since the stopped vehicles have priority, the results of the negotiation should produce a go status). As illustrated in FIG. 13B, in the state <L2>, the vehicle 530.1 outside of the trafficable area has been designated to have a "stop" state once it reaches the obstacle 507. The state of vehicle 530.1 becomes "stop" in case of FIG. 13C as state of vehicle 520 becomes "stop" in the case of FIG. 11A. From the viewpoint of a user, the meaning of the state "stop" is same in both cases (FIG. 11A and FIG. 13C). The currently stopped vehicles 530 transition from a stop to a go-wait state (which may still be represented on the user interface by a red signal or other form of signal indicating that the vehicle 520 should remain stopped).

In FIG. 13C, representing a state <L3>, the portion 530.1 of the original long vehicle 530 procession that is outside of the trafficable area 1104 approaches the obstacle 507 and transitions to a stop state, while the opposing vehicles 520 in their stop area remain in a go-wait state until the current vehicles 530 of the long procession that are within the trafficable area clear the obstacle 507. In FIG. 13D, representing a state <L4>, when the last vehicle 530.2 within the trafficable area 1104 has cleared the obstacle, the trafficable area 1104 disappears and the vehicles 520 in the go-wait state transition to a go state, which may be represented on the user interface by a green signal, or other form of signal indicating that the vehicle 520 should begin to move.

FIGS. 13E through 13H are pictorial diagrams illustrating a situation in which a traffic jam exists for the vehicles currently going around the obstacle (state <L5>). As shown in FIG. 13E, a traffic jam 1302 prevents a vehicle 530 procession currently advancing past the obstacle 507 from advancing further. Thus, despite a focus vehicle 530.1 being within the trafficable area 1104 and that would be otherwise permitted to go around the obstacle 507, it is transitioned to a stop/N-NoRoom state. The determination of which vehicle in the current vehicle procession 530 becomes the focus vehicle 530.1 may be made by one or more measurements of available open space by one or more vehicles in the current vehicle procession 530 that have already made it past the obstacle area 507 (or according to some other criteria, such as measurements done by the stopped vehicles 520 heading in the opposite direction.

In FIG. 13F, with the west-bound vehicles 530.1 and beyond in a stop/N-NoRoom state, the east-bound vehicles 520 in the opposite direction transition from stop to go, and proceed by the obstacle 507. A new trafficable area 1104' may be defined that is based on the east-bound vehicle 520 procession, and these vehicles may proceed past the obstacle 507 according to the trafficable area rules. FIG. 13G illustrates that the last east-bound vehicle procession vehicle 520.1 has passed beyond the obstacle 507, and the new trafficable area 1104' will be eliminated. The status of the west-bound vehicle procession 530 transitions to a stop/N-Undefined state as long as east-bound vehicles 520 are still in the obstacle area 507. Once the last of the east-bound vehicles 520 have cleared the obstacle area 507, the west-bound vehicles 530 may transition to a go status, which will remain the case until the available space between the obstacle 507 and the traffic jam 1104 has filled up with west-bound vehicles 530. In FIG. 13H, once the available space is filled, as described above, the east-bound vehicles' states are set to go and proceed past the obstacle 507.

FIGS. 14A through D repeat the process shown in FIGS. 13E through H with the exception that the N-NoRoom state is created by a traffic signal 1402 instead of a traffic jam 1302, and thus, a description will not be repeated for these FIGS. The details provided above may be implemented utilizing, e.g., the area information management section 432.

Narrow Road Calculations

Figure 15A:
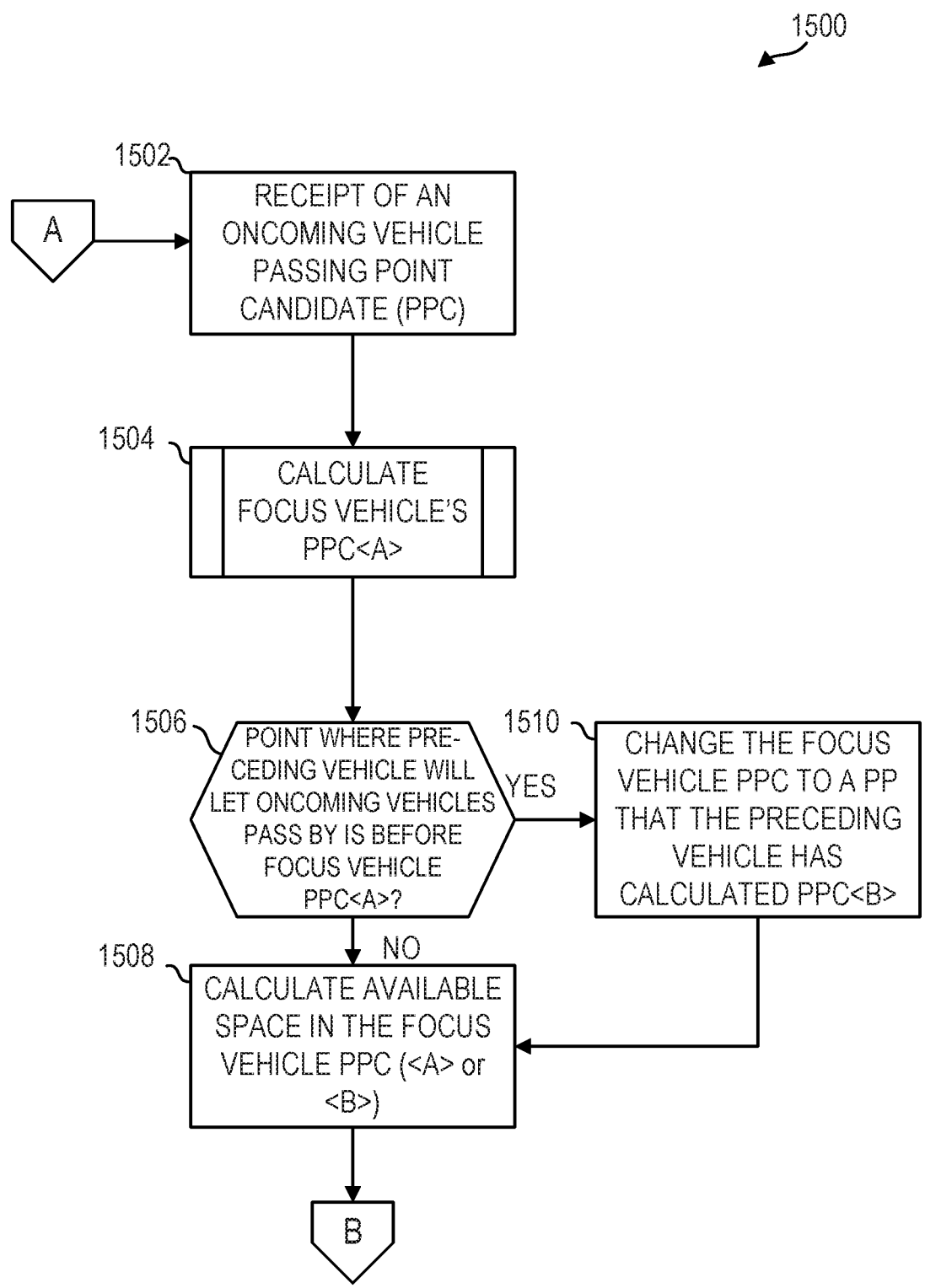
FIGS. 15A and 15B are parts of a flowchart illustrating a calculation of a point candidate where vehicles are to pass by each other, according to some embodiments.
Figure 15B:
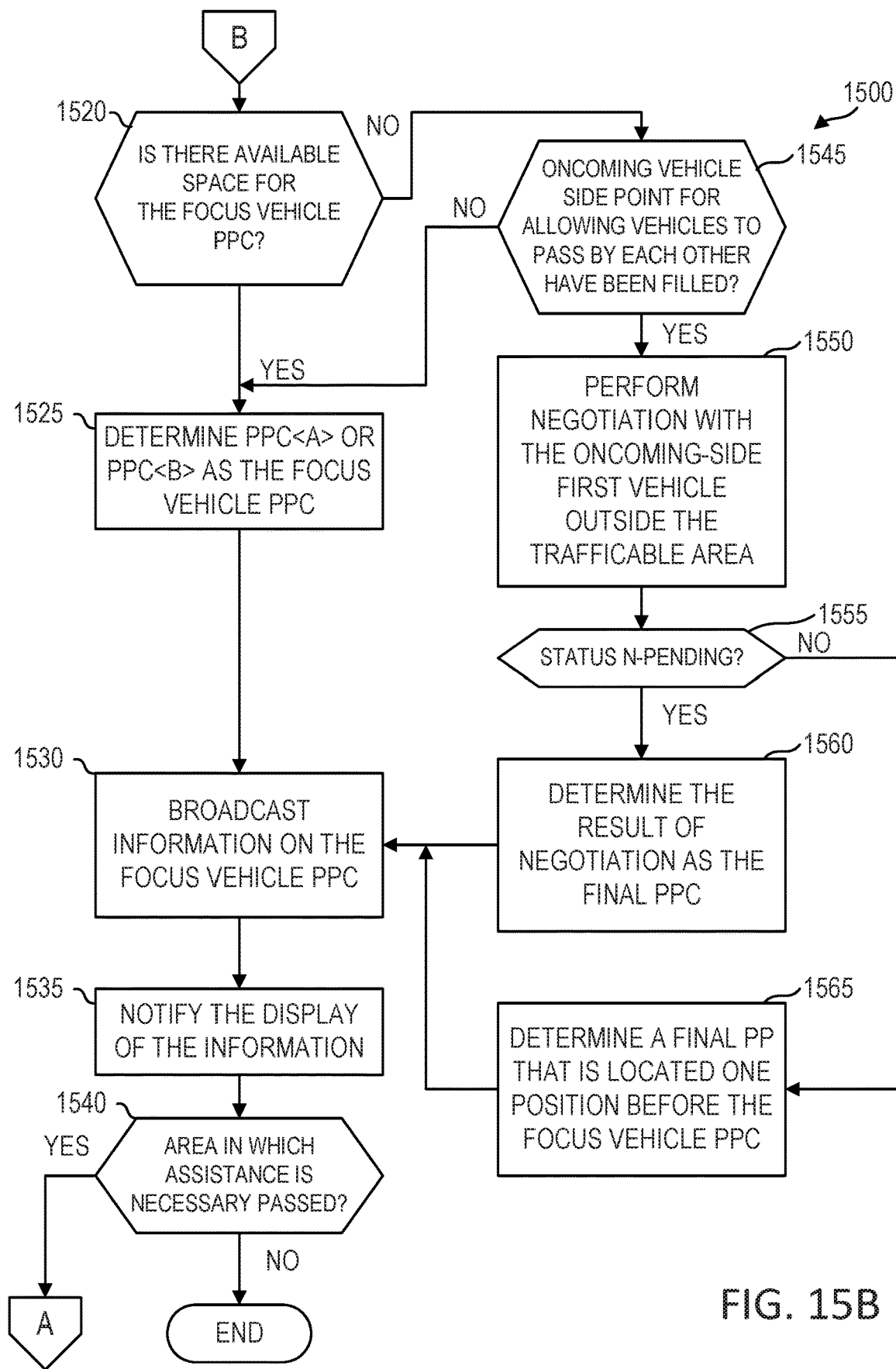

FIGS. 15A and 15B are parts of a flowchart illustrating a passing by each other assisting mode in a narrow road, according to some embodiments. FIGS. 17A and 17B illustrate some basic aspects of a vehicle advancing on a narrow road. Very broadly, both the focus vehicle 520a and the oncoming vehicle 530a must agree on a final passing point (PP) (FPP) that will be used by both vehicles 520a, 530a. However, until the final agreement is reached, each vehicle 520a, 530a calculates and communicates various PP candidates (PPCs) (focus vehicle 520a PPCs and oncoming vehicle 530a PPCs) that are subject to various tests and rules used to ultimately determine the ultimately agreed upon FPP.

In the narrow road situation, the basic assessment 600 is repeatedly applied to a second PPC located ahead of a focus vehicle 520a. As shown in FIG. 17A, the focus vehicle 520a is shown in a current passing region 1704.0. A first focus vehicle PPC located ahead of the focus vehicle 520a is shown by ref no. 1704.1 which corresponds to the PP 508a located just beyond the point 507a, and a dashed outline of the focus vehicle 520a1 is shown positioned adjacent to this first PP 508a. The second focus vehicle PPC located ahead of the focus vehicle 520a is shown by ref. no. 1704.2 which corresponds to the PP 508b located just beyond the point 507b, and a dashed outline of the focus vehicle 520a2 is shown positioned adjacent to the second PP 508b. The dashed outline vehicles 520a2 are used as "phantom vehicles" at the PPCs in the figures for the purpose of performing the basic assessment. On a two-lane road, the narrow sections 507a, 507b would be construed as obstacles, but on the one-lane road, they constitute normal sections of the narrow road.

In FIG. 17B, the focus vehicle 520a has moved forward so that it is now within the narrow road area 507a. Since the passing region 508a is passable, the first focus vehicle PPC located ahead of the focus vehicle 520a is shown by ref. no. 1704.1, which now corresponds to the PP 508b, and the second focus vehicle PPC located ahead of the focus vehicle 520a is shown by ref. no. 1704.2, which now corresponds to the PP 508c.

FIG. 17C is similar to FIG. 17B, but showing an oncoming vehicle 530a traveling in an opposite direction and repeatedly applying the basic assessment 600 to its own second oncoming vehicle PPC 1704.2'. Generally repeating the above for the oncoming vehicle 530a, the oncoming vehicle 530a is shown before a current PP 1704.0' (508f). A first oncoming vehicle PPC 1704.1' is located ahead of the oncoming vehicle 530a, which corresponds to the PP 508e located just beyond the point 507f, and a dashed outline of the oncoming vehicle 530a1 is shown positioned adjacent to the first PP 508e. The second oncoming vehicle PPC 1704.2' is located ahead of the oncoming vehicle 530a, which corresponds to the passing point 508d located just beyond the point 507e, and a dashed outline of the oncoming vehicle 530a2 is shown positioned adjacent to the second PP 508d.

Figure 16:
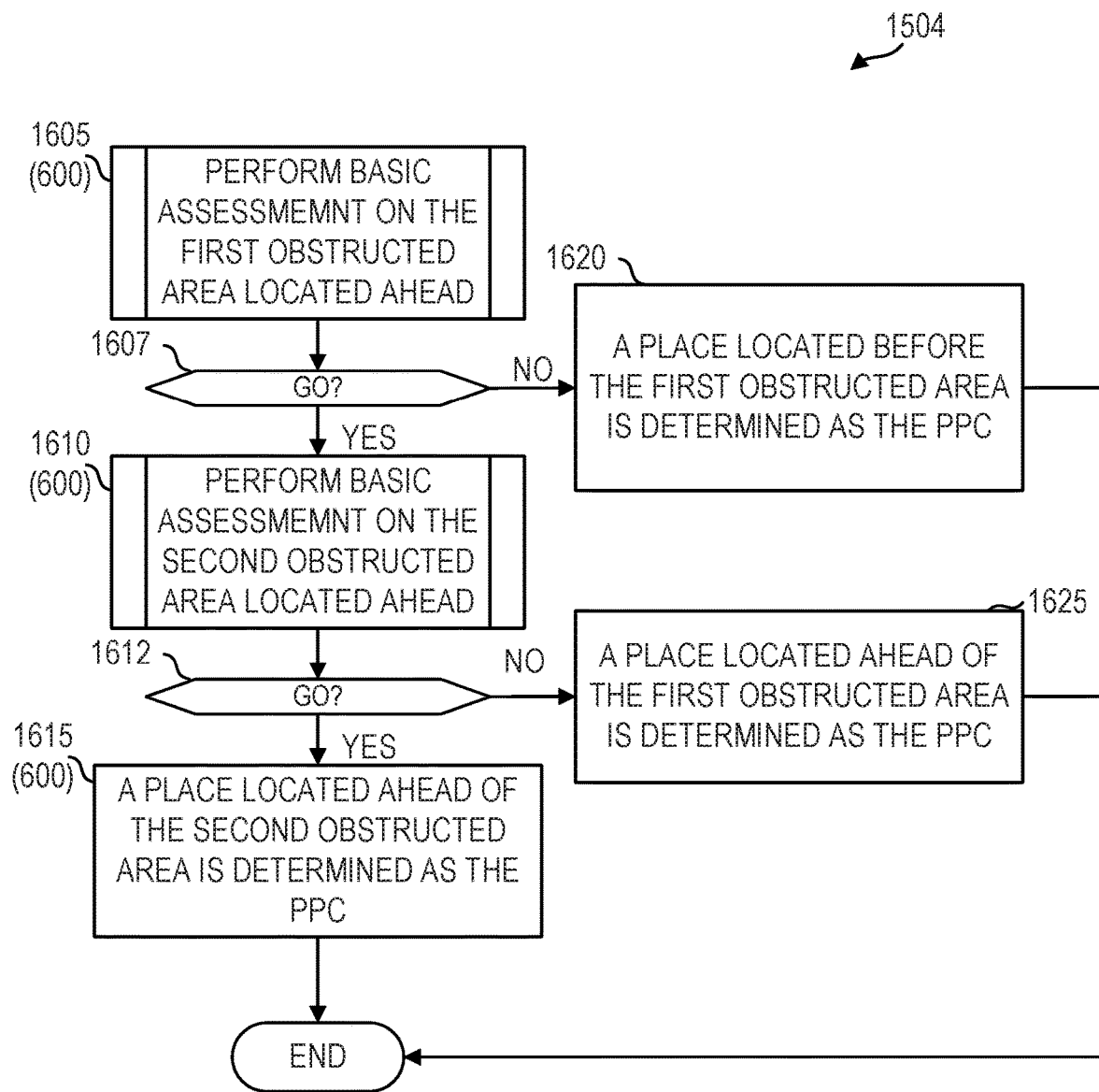
FIG. 16 is a flowchart illustrating a passing by each other assisting mode in a narrow road, according to some embodiments.

With this background, turning to FIGS. 15A and 17D, in operation 1502, the focus vehicle 520a receives the oncoming vehicle PPC 1704.2' for a passing area 508c that the oncoming vehicle 530a has determined. When the focus vehicle 520a receives the oncoming vehicle PPC 1704.2', in operation 1504, it performs a calculation of its own PPC (the focus vehicle PPC 1704.2. This operation 1504 is illustrated in more detail by FIG. 16. FIG. 16 shows that, in operation 1605, the basic assessment 600 is performed on the first obstructed area 507b located ahead by the target vehicle 520a. If the result of this basic assessment is go (1607: YES), then, in operation 1610, the basic assessment 600 is performed on the second obstructed area 507c. If the result of this basic assessment is go (1612: YES), then, in operation 1615, a place 508c located ahead of the second obstructed area 507c is determined as the PPC.

When the result of operation 1607 is not "go" (1607: NO), then in operation 1620, a place 508a located before a first obstructed area 507b is determined as the PPC (for the focus vehicle 520a, this is the focus vehicle second PPC 1704.0; for the oncoming vehicle 530a, this is the oncoming vehicle second PPC 1704.0'). When the result of operation 1612 is not "go" (1612: NO), then, in operation 1625, a place 508b located ahead of the first obstructed area 507b is determined as the focus vehicle PPC.

The process continues at operation 1506, where a determination is made as to whether a passing point where a preceding vehicle will let oncoming vehicles pass by is before the focus vehicle PPC. If not (1506: NO), then in operation 1508, a room in the passing point where the focus vehicle will let the oncoming vehicle 530a pass by is calculated. If so (1506: YES), then in operation 1510, a change is made to the passing point candidate that the preceding vehicle has calculated.

Referring to FIG. 15B, in operation 1520, it is determined whether there is room for the focus vehicle 520a in the PPC. If so (1520: YES), then in operation 1525, it is determined which candidate (candidate <A>(PPC<A>) or candidate <B>(PPC<B>)) will be the FPP for the focus vehicle 520a and the oncoming vehicle(s) 530a to pass by each other. With the FPP determined, in operation 1530, the focus vehicle 520a broadcasts the FPP, and, in operation 1535, notifies the display of the FPP information. In operation 1540, it is determined whether the area in which assistance is necessary has passed. If not (1540: NO), the process 1500 ends, otherwise (1540: YES), the process returns to operation 1502. When there is no room at the PP for the focus vehicle 520a (1520: NO), then a check is made, in operation 1545, to determine if the oncoming vehicle side PP has been filled. If not (1545: NO), then processing resumes at operation 1525.

FIG. 17E is a pictorial diagram illustrating a situation in which the vehicles 520a, 530a are unevenly approaching the passing point 508c (the oncoming vehicle 530a is closer to this 508c (its second 1704.2') passing point). When one vehicle (e.g., the focus vehicle) 520a determines that it cannot proceed to its second passing point 1704.2 (508c), as illustrated in FIG. 17F, then the passing point 508b one position before its second passing point 1704.2 (i.e., its first passing point 1704.1) is used as the FPP (final/confirmed passing point). The process returns to operation 1530 for continued processing.

FIGS. 18A through 18J are pictorial diagrams illustrating vehicle processions passing by each other on a narrow road, according to some embodiments. FIG. 18A is similar to FIG. 17C, except that the focus vehicle 520a has been replaced with a focus procession of vehicles 520a, 520b, 520c, and the oncoming vehicle 530a has been replaced with an oncoming procession of vehicles 530a, 530b. The scenario of FIG. 18A operates similarly to the scenario of FIG. 17C, with the following differences. The succeeding vehicles 520b, 520c in a procession 520 proceed while performing the same assessments as the leading vehicle 520a.

In FIG. 18B, the FPP has been determined to be the PP 508b, based on the algorithms described above. In this case, the PP 508b permits two sets of two vehicles to pass by each other, and thus, the second vehicle 520b in the focus procession 520 is allowed to proceed. Referring to FIG. 18C, the third vehicle 520c can proceed when the number of vehicles in the oncoming vehicle procession 530 is two or less. However, if the number of vehicles in the oncoming vehicle procession 530 is three or more, a negotiation must take place because they cannot pass each other (see FIG. 18D). The point where the first and second vehicles are to pass by the oncoming vehicles is recognized by receiving a broadcast of the FPP.

The vehicle checks if there is enough room in the FPP it to wait there, based on the broadcast from the preceding vehicle. In FIG. 18C, from the perspective of vehicle 530c, vehicle 530a and 530b are senders. For vehicle 530b, vehicle 530a is a sender.

If the assessment is not completed in time, the vehicles stop (as described above). As shown in FIGS. 18D and 18E, with the addition of the third vehicle 830c in the oncoming procession 530, all of the vehicles cannot proceed. The vehicles other than those that can pass by each other (in this example, 520c and 530c) perform a negotiation. FIG. 18E helps to illustrate the flow on the right-hand side of FIG. 15B (operations 1545 through 1565).

If an oncoming vehicle side point for allowing vehicles to pass by each other has been filled (1545: YES), then in operation 1550, negotiation is performed between the focus vehicle 520a and the first oncoming vehicle 530a outside of the trafficable area. Stated differently, in operation 1520, a check is made to see if the focus vehicle can wait at the PP. If the result of 1520 is NO, then some vehicles preceding the focus vehicle are waiting at the PP. In operation 1545, a check is made to see if the preceding vehicles of the focus vehicle can leave the PP and move forward and the focus vehicle can move to the PP and wait. If the oncoming vehicle procession occupies the space, it is not possible (as in FIG. 18E). In FIG. 18E, the vehicle 520*b* cannot leave the PP because the vehicle 530*c* is in the way.

If the result of the negotiation is N-Pending (1555: YES), then in operation 1560, a result of the negotiation is determined as the FPP, and processing continues at operation 1530. Otherwise (1555: NO), in operation 1565, the FPP is determined by the focus vehicle 520*a* and the oncoming vehicle 530*a* as being located one position before a passing point for where the target vehicles are to pass by each other as the passing point. If one vehicle 520*a* determines that it cannot proceed to its second passing point 1704.2 (508*c*), then the passing point is determined to be a passing point 508*b* near one of the vehicles 520*a*.

The way this situation may be handled, according to some embodiments, is illustrated in FIGS. 18F through 18J. When the vehicle 520*c* cedes the road to oncoming vehicles because it is behind the PPs where the vehicles can let oncoming vehicles pass by, the vehicle 520*c* stops at a FPP 508*a* which can allow vehicles to pass by each other and which is located one position before the FPP 508*b* of the first 520*a* and second 520*b* vehicles and the oncoming vehicles 530*a*, 530*b*, 530*c* in order to give the road to the oncoming vehicles 530*a*, 530*b*, 530*c*. FIGS. 18G and 18H illustrate how the vehicles pass by each other. In FIG. 18G, the last vehicle 520*c* in the focus vehicle train 520 pulls into the PP 508*a*, which permits the oncoming vehicles 530*a*, 530*b*, 530*c* to pass by it. In FIG. 18H, the first two vehicles 520*a*, 520*b* pulls into the PP 508*b*, which permits the oncoming vehicles 530*a*, 530*b*, 530*c* to pass by them.

FIG. 18I is similar to FIG. 18D, but shows the addition of the predetermined negotiation completion distance 802, 802' as discussed above with respect to FIG. 8. Negotiation is performed by the time the vehicles pass near the predetermined negotiation completion distance 802, 802' of a first PP 508*a* that can allow vehicles to pass by each other, the first PP 508*a* being located one position before a second PP 508*b* where the focus vehicles 520 and the oncoming vehicles 530 will pass by each other. FIG. 18J illustrates that if the negotiation is not completed, then the negotiating vehicles 520*c*, 530*c* should perform the negotiation stops, as described above, to wait at the respective first points 508*a*, 508*c*.

Mixed Vehicles

Figure 19A:
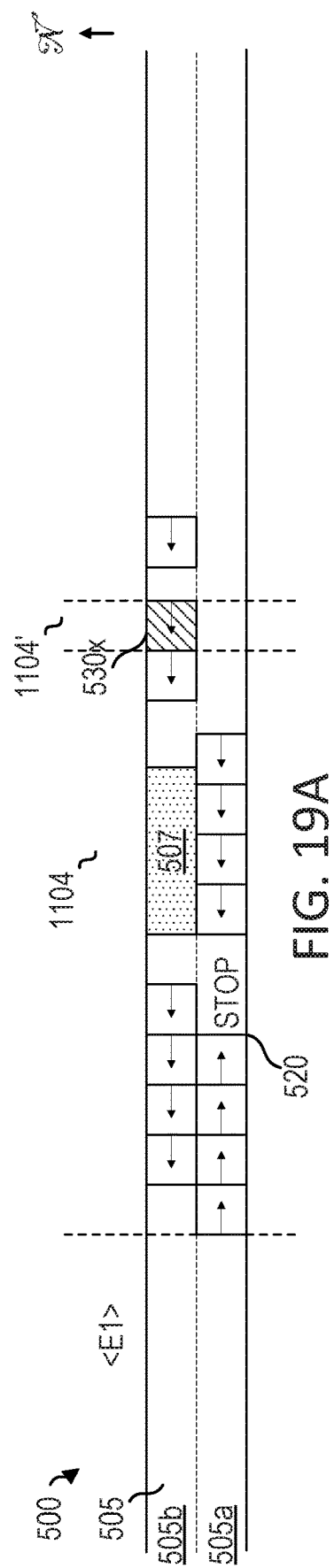
FIGS. 19A and 19B are pictorial diagrams illustrating a mixture of vehicles implementing a system for intelligent vehicle pass-by information sharing, and those that do not implement this system, according to some embodiments.
Figure 19B:
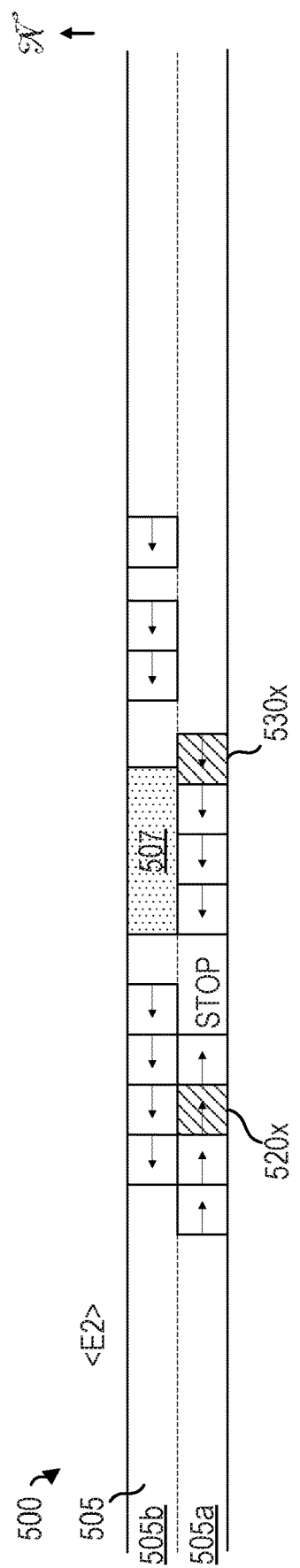

FIGS. 19A and 19B are pictorial diagrams illustrating a mixture of vehicles 520, 530 implementing a system for intelligent vehicle pass-by information sharing, and those vehicles 520*x*, 530*x* that do not implement this system, according to some embodiments. When a vehicle on which the system has not been implemented is at the rearmost position, the trafficable area 1104 may be extended 1104' until an implemented vehicle is included as the rearmost vehicle. Other algorithms or rules are also possible to utilize here, such as those that might prevent an extremely long trafficable area when a large number of vehicles do not implement this system. FIG. 19B just shows that unimplemented vehicles 520*x*, 530*x* that travel and stop according to the flow of implemented vehicles require no special processing on the implemented vehicles. The presence of an unimplemented vehicle 520*x*, 530*x* may be recognized by at least one of the following: a first implemented vehicle recognizes another implemented vehicle from a front or rear image of the vehicle—thus, an unrecognized vehicle is an unimplemented vehicle; no data is received from another vehicle.

Displaying Assistance Assessment

FIG. 20 is a pictorial illustration of a vehicle display for one oncoming vehicle, according to some embodiments. In some embodiments, the vehicle display 2000 may be implemented using a HUD system. In some embodiments, the HUD may be implemented using a projection system that projects images onto a front windshield of a vehicle. The focal point of the image may be adjusted so that a user's eyes do not have to refocus when viewing projected images. In some embodiments, the projection simply reflects off of a glass surface of the windshield. In other embodiments, a self-luminous intermediate film may be placed on or in the windshield. In this configuration, when the film is irradiated with a special laser light, the irradiated portion emits light causing characters and images to be displayed. With this configuration, displayed objects are visible from all angles and therefore can be seen by occupants in other seats. These are just examples, and any known form of HUD may be utilized.

Shown on a windshield 2000 of a focus vehicle 520*a* are vehicle display elements that may be used to assist a driver of the vehicle. In the case shown in FIG. 20, only one oncoming vehicle is present. In one implementation, an image area 2002 may be displayed that shows an image, series of images, and/or video depicting a view from the oncoming vehicle 530*a*. A graphic illustration 2003 may be provided that shows a map or other graphic of the vehicle situation. For example, in the one oncoming vehicle situation, an oncoming vehicle graphic 2004 for the oncoming vehicle 530*a* may be shown along with a focus vehicle (one's own vehicle) graphic 2006, and an indicator 2005, such as an arrow, that shows the view perspective illustrated in the image area 2002. An enhanced graphic illustration 2008 e.g., in a form of a birds-eye view display may be shown as the graphic illustration 2003 or in addition to it, showing the focus vehicle 520*a*, the oncoming vehicle 530*a*, the passing area 508*a*, and the narrow areas 507*b*, 507*c*. This may provide a driver of the focus vehicle 520*a* to fully view the situation from both their own perspective as well as the oncoming vehicle's 530*a* perspective. An instruction element, which may be in the form of a virtual traffic sign (for travel guidance) 2010 or other virtual traffic information, such as directional information in a form of arrows, boxes, lines and the like, or such as the stop status described above, may also be displayed to the user. Color indications may be implemented as described above, e.g., red for stop, green for go, etc.

FIG. 21 is a pictorial illustration of a vehicle display for multiple oncoming vehicles, according to some embodiments. In this situation, multiple image areas 2002*a*, 2002*b* may be provided showing both a front and rear view from the perspective of a vehicle 530*c* in a nearby area. Such front and rear images may be shown for some or all of the oncoming vehicles 530*a*, 530*b*, 530*c*, along with respective vehicle graphics 2004*a*, 2004*b* and respective indicators showing the various view perspectives (e.g., the front and rear scenes of the leading vehicle, front and rear scenes of the rearmost vehicle, etc.) In one embodiment, the images 2002 are displayed in an order representative of the places that are being captured by imaging devices of the other vehicles.

FIG. 22 is a pictorial illustration of a HUD on a windshield 2000 showing stop guidance, according to some embodiments. In FIG. 22, the focus vehicle 520*a* has been provided with the instruction element 2010 instructing the driver to slow down. The focus vehicle graphic 2006 illustrates a blocked area and an arrow indicating a motion instruction for the focus vehicle 520a. In an augmented reality manner, an instruction indicator 2202 may indicate positional information associated with an instruction, such as a stop position, as shown in FIG. 22. In FIG. 22, the stop position line is shown to leave a space where an oncoming vehicle can pass by.

FIG. 23 is a pictorial illustration of a HUD showing go guidance, according to some embodiments. In FIG. 23, instruction element 2010 indicates that the focus vehicle 520a should go, and the instruction indicator 2202 illustrates a position and direction that the focus vehicle 520a should move in. The enhanced graphic illustration 2008 may provide an indication of the nearby vehicles along with their respective positions.

FIG. 24 is a pictorial illustration of a HUD showing further stop guidance, according to some embodiments. In this FIG., the instructions guide the focus vehicle 520a driver into a specific stop position illustrated as slot 2. The detailed travel route and recommended stop position may be displayed in a superimposed manner to allow all vehicles to pass one another in an efficient manner. The enhanced graphic illustration 2008 provides the birds-eye view of the nearby vehicles as well as slot positions. The instruction indicator 2202 may provide a text indication, such as a "stop here" indication, along with rectangles showing numbered spots and an indication as to which spot the driver of the focus vehicle should move into. A dashed line rectangle may be used not only to show the slot positions, but to provide an indication of the position of the oncoming vehicle 530a that might not yet be visible.

In some embodiments, a virtual center line may be illustrated in the HUD in conjunction with any positional information to help the driver of the focus vehicle 520a better position the vehicle. For example, this detailed travel route and recommended position may be displayed to guide the vehicle in following the preceding vehicle. Such a virtual center line may take into account a width of one's own (focus) vehicle 520a along with the width of other vehicles. It may also take into account levels of driving skill of the driver of the focus vehicle 520a and levels of driving skill of other drivers. Such driver skill levels may be manually entered or detected and assessed by sensors in the vehicles.

Although the system and methods described herein relate to vehicles sharing detected and saved area information with other vehicles, it may also be possible for vehicles to receive area information from stationary elements and share area information with stationary elements as well, and any discussion herein relating to the sharing of area information between vehicles should be contemplated as the sharing of area information between vehicles and stationary elements. Such stationary elements may include portable wireless communication devices, such as IoT devices, that are located at various locations along a roadway. Furthermore, it may be possible for vehicles or stationary elements possessing area information to share that information with other elements forming part of a network, such as server devices or other IoT devices and the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Various examples are described below.

In Example 1, a device is associated with a focus vehicle, the device comprising a sensor that senses area information about an information area usable to assist the focus vehicle and an oncoming vehicle to pass each other, a transmitter that broadcasts the area information via a vehicle-to-vehicle network (V2VN) protocol, and a controller. The controller produces an assisting result from the area information and vehicle information related to the focus vehicle and the oncoming vehicle. The vehicle information includes first distance information of the focus vehicle from the information area, and second distance information of the oncoming vehicle from the information area. The device includes a display that displays virtual traffic information representing at least stopping and proceeding of the focus vehicle onto a windshield of the vehicle.

Example 2 may include the elements of example 1, in which a first vehicle procession includes a plurality of vehicles, including the focus vehicle, that travel in a first direction, a second vehicle procession includes a plurality of vehicles, including the oncoming vehicle, that travel in a second direction opposite the first direction, the area information is shared among the first vehicle procession vehicles and those that succeed them, and the area information is shared among the second vehicle procession vehicles and those that succeed them.

Example 3 may include elements of any of the above examples, where the virtual traffic information comprises a virtual traffic sign related to the stopping and proceeding.

Example 4 may include elements of the preceding example, where the virtual traffic information is color coded to relate to stopping and proceeding.

Example 5 may include elements of any of the above examples, where the virtual traffic information comprises directional information showing a vehicle driver where to direct the focus vehicle and when to direct the focus vehicle as instructed.

Example 6 may include elements of the preceding example, where the directional information includes arrows, boxes, and lines that correspond with directions and positions for the vehicle driver to move the focus vehicle.

Example 7 may include elements of any of the above examples, where the controller produces the assisting result in a first assisting mode for wide roads primarily having a plurality of lanes that permit vehicles to pass by each other but that contain a narrowing obstruction area that obstructs all but one lane, and a second assisting mode on narrow roads primarily having narrow sections of one lane that do not permit vehicles to pass by each other, but that contain widening sections where vehicles are able to pass by each other.

Example 8 may include elements of the preceding example, where, in the first assisting mode, the controller performs a basic assessment in which it compares a first distance from the obstruction area to the focus vehicle and a second distance from the obstruction area to the oncoming vehicle so that the controller selects a focus vehicle action selected from the group consisting of: stop the focus vehicle, proceed with the focus vehicle, and negotiation with the oncoming vehicle; and the display displays the virtual traffic information in accordance with the selection that displays the stop, proceed, and negotiation vehicle action.

Example 9 may include elements of the preceding example, where, in response to the controller selection of the negotiation with the oncoming vehicle, the controller broadcasts negotiation information indicative of a vehicle ID of the focus vehicle, a prioritized condition, and a trafficable area, to succeeding vehicles and oncoming vehicles, via the V2VN, and the controller selects the stopping of the focus vehicle or the proceeding of the focus vehicle based on the prioritized condition included in the negotiation information.

Example 10 may include elements of the preceding example, where, the prioritized condition is based on the following: an obstacle location, a current or projected waiting time, whether the focus vehicle is ascending or descending in altitude, a count of succeeding vehicles, a traffic aspect selected from the group consisting of congestion and a traffic signal state on a road located ahead, and a duration in a wait state.

Example 11 may include elements of any of the above examples, where a same prioritized condition is utilized by the focus vehicle and the oncoming vehicle so that agreement of the negotiation is reached without requiring an exchange of information.

Example 12 may include elements of any of the above examples, where the controller determines a trafficable area in which all vehicles of a first vehicle train passing the obstruction area are allowed to pass the obstruction area without interruption while other vehicles of a second vehicle train from an opposite direction remain stopped.

Example 13 may include elements of any of the above examples, where the controller further determines when a space area is available beyond the narrowing obstruction area, and resulting from a determination that no space is available beyond the narrowing obstruction area, always selecting for the focus vehicle to stop until a determination is made that space is available beyond the narrowing obstruction area.

Example 14 may include elements of any of the above examples, where the controller determines a propagating area in which an item of the area information is to be propagated to other vehicles.

Example 15 is a device associated with a focus vehicle, the device comprising a sensor that senses area information about an information area usable to assist the focus vehicle and an oncoming vehicle to pass each other, a transmitter that broadcasts the area information via a vehicle-to-vehicle network (V2VN) protocol, and a controller. The controller, in a basic assessment, produces an assisting result from the area information and vehicle information related to the focus vehicle and the oncoming vehicle. The vehicle information includes first distance information of the focus vehicle from the information area, and second distance information of the oncoming vehicle from the information area. The controller produces the assisting result in: a first assisting mode for wide roads primarily having a plurality of lanes that permit vehicles to pass by each other but that contain narrowing sections that obstruct all but one lane, and a second assisting mode on narrow roads primarily having narrow sections of one lane that do not permit vehicles to pass by each other, but that contain widening sections where vehicles can pass by each other. In the first assisting mode, the controller compares a first distance from the information area to the focus vehicle and a second distance from the information area to the oncoming vehicle to select a focus vehicle action. The focus vehicle action may be to stop the focus vehicle. This results from the first distance being much larger than the second distance, based on a predefined distance criterion. The focus vehicle action may be to proceed, with the focus vehicle resulting from the second distance being much larger than the first distance, based on the predefined distance criterion. The focus vehicle action may be to negotiate with the oncoming vehicle in other cases. The device may further comprise a display that displays virtual traffic information in accordance with the result of the selection that differentiates the stop, proceed, and negotiation vehicle action.

Example 16 may include elements of example 15, where the controller receives a signal indicative of a trafficable area, determines if the focus vehicle is within the trafficable area in which all vehicles of a first vehicle train passing an obstruction area are allowed to pass the obstruction area without interruption while other vehicles of a second vehicle train from an opposite direction remain stopped, resulting from a determination that the focus vehicle is within the trafficable area and that room is available on an other side of the obstruction area, displaying a proceed result as the virtual traffic information.

Example 17 may include elements of examples 15 and 16, where, in the second assisting mode, the controller receives an oncoming vehicle passing point candidate (PPC) from the oncoming vehicle, calculates a focus vehicle PPC, calculates available space in the focus vehicle PPC, responsive to available space in the focus vehicle PPC, determines a final focus vehicle PPC, and broadcasts information on the final focus vehicle PPC. The display displays information related to the final focus vehicle PPC.

Example 18 is a computer-implemented method for operating a focus vehicle device, comprising sensing area information with a sensor about an information area usable to assist the focus vehicle and an oncoming vehicle to pass each other, broadcasting with a transmitter the area information via a vehicle-to-vehicle network (V2VN) protocol, producing, with a controller, an assisting result from the area information and vehicle information related to the focus vehicle and the oncoming vehicle, the vehicle information including first distance information of the focus vehicle from the information area, and second distance information of the oncoming vehicle from the information area, and displaying, with a display, virtual traffic information representing at least stopping and proceeding of the focus vehicle onto a windshield of the vehicle.

Example 19 may include elements of example 18, where the controller produces the assisting result in a first assisting mode for wide roads primarily having a plurality of lanes that permit vehicles to pass by each other but that contain a narrowing obstruction area that obstructs all but one lane, and a second assisting mode on narrow roads primarily having narrow sections of one lane that do not permit vehicles to pass by each other, but that contain widening sections where vehicles are able to pass by each other.

Example 20 may include elements of example 19, and further comprise, in the first assisting mode performing a basic assessment comprising, comparing a first distance from the obstruction area to the focus vehicle and a second distance from the obstruction area to the oncoming vehicle, and selecting, by the controller, a focus vehicle action comprising: stop the focus vehicle, proceed with the focus vehicle, and negotiation with the oncoming vehicle, and displaying the virtual traffic information on the display in accordance with the result of the selecting that differentiates the stop, proceed, and negotiation vehicle action.

Example 21 is a computer-implemented method for operating a focus vehicle device. The method comprises sensing area information with a sensor about an information area usable to assist the focus vehicle and an oncoming vehicle to pass each other. The method further comprises broadcasting with a transmitter the area information via a vehicle-to-vehicle network (V2VN) protocol. The method further comprises producing, in a basic assessment operation using a controller, an assisting result from the area information and vehicle information related to the focus vehicle and the oncoming vehicle, the vehicle information including first distance information of the focus vehicle from the information area, and second distance information of the oncoming vehicle from the information area. The controller produces the assisting result in different assisting modes. A first assisting mode is for wide roads primarily having a plurality of lanes that permit vehicles to pass by each other but that contain narrowing sections that obstruct all but one lane. A second assisting mode is for narrow roads primarily having narrow sections of one lane that do not permit vehicles to pass by each other, but that contain widening sections where vehicles can pass by each other. In the first assisting mode, the method comprises comparing a first distance from the information area to the focus vehicle and a second distance from the information area to the oncoming vehicle to select a focus vehicle action. The focus vehicle action comprises stop, when the focus vehicle resulting from the first distance being much larger than the second distance, based on a predefined distance criterion. The focus vehicle action comprises proceed, when the focus vehicle resulting from the second distance being much larger than the first distance, based on the predefined distance criterion. The focus vehicle action comprises negotiating with the oncoming vehicle in other cases. The method further comprises displaying, with a display, virtual traffic information representing at least stopping and proceeding of the focus vehicle onto a windshield of the vehicle.

Example 22 may include elements of example 21, and further comprise receiving a signal indicative of a trafficable area, determines if the focus vehicle is within the trafficable area in which all vehicles of a first vehicle train passing an obstruction area are allowed to pass the obstruction area without interruption while other vehicles of a second vehicle train from an opposite direction remain stopped and, resulting from a determination that the focus vehicle is within the trafficable area and that room is available on an other side of the obstruction area, displaying a proceed result as the virtual traffic information.

Example 23 may include elements of examples 21 and 22, and further comprise, in the second assisting mode, receiving an oncoming vehicle passing point candidate (PPC) from the oncoming vehicle, calculating a focus vehicle PPC, calculating available space in the focus vehicle PPC, responsive to available space in the focus vehicle PPC, determining a final focus vehicle PPC, and broadcasting information on the final focus vehicle PPC, and displaying information related to the final focus vehicle PPC.

Example 24 is a computer program product for operating a focus vehicle device, the computer program product comprising a computer readable storage medium having computer-readable program code embodied therewith to, when executed on a processor sense area information about an information area usable to assist the focus vehicle and an oncoming vehicle to pass each other broadcast the area information via a vehicle-to-vehicle network (V2VN) protocol, produce an assisting result from the area information and vehicle information related to the focus vehicle and the oncoming vehicle, the vehicle information including first distance information of the focus vehicle from the information area, and second distance information of the oncoming vehicle from the information area, and display virtual traffic information representing at least stopping and proceeding of the focus vehicle onto a windshield of the vehicle.

Example 25 may include elements of example 24, where the program code is further configured to produce the assisting result in a first assisting mode for wide roads primarily having a plurality of lanes that permit vehicles to pass by each other but that contain a narrowing obstruction area that obstructs all but one lane, and a second assisting mode on narrow roads primarily having narrow sections of one lane that do not permit vehicles to pass by each other, but that contain widening sections where vehicles are able to pass by each other.

What is claimed is:

1. A device associated with a focus vehicle, comprising:
a sensor that senses area information about an information area usable to assist the focus vehicle and an oncoming vehicle to pass each other;
a transmitter that broadcasts the area information via a vehicle-to-vehicle network (V2VN) protocol;
a controller that produces an assisting result from the area information and vehicle information related to the focus vehicle and the oncoming vehicle, the vehicle information including first distance information of the focus vehicle from the information area, and second distance information of the oncoming vehicle from the information area; and
a display that displays virtual traffic information representing, in a driver perspective view, at least a stopping position at which the vehicle is to stop shown within a roadway, and proceeding of the focus vehicle onto a windshield of the vehicle;
wherein:
the virtual traffic information comprises directional information showing a vehicle driver where to direct the focus vehicle and when to direct the focus vehicle as instructed;
the directional information includes data for a bird's-eye view that is a plan view comprising arrows, boxes, and lines that correspond with directions and positions shown within the roadway for the vehicle driver to move the focus vehicle; and
the driver perspective view and the bird's-eye view are displayed simultaneously.

2. The device of claim 1, wherein:
a first vehicle procession includes a plurality of vehicles, including the focus vehicle, that travel in a first direction;
a second vehicle procession includes a plurality of vehicles, including the oncoming vehicle, that travel in a second direction opposite the first direction;
the area information is shared among the first vehicle procession vehicles and those that succeed them; and
the area information is shared among the second vehicle procession vehicles and those that succeed them.

3. The device of claim 1, wherein the virtual traffic information comprises a virtual traffic sign related to the stopping and proceeding.

4. The device of claim 3, wherein the virtual traffic information is color coded to relate to stopping and proceeding.

5. The device of claim 1, wherein the controller produces the assisting result in:
a first assisting mode for wide roads primarily having a plurality of lanes that permit vehicles to pass by each other but that contain a narrowing obstruction area that obstructs all but one lane; and
a second assisting mode on narrow roads primarily having narrow sections of one lane that do not permit vehicles to pass by each other, but that contain widening sections where vehicles are able to pass by each other.

6. The device of claim 5, wherein:
in the first assisting mode, the controller performs a basic assessment in which it compares a first distance from the obstruction area to the focus vehicle and a second distance from the obstruction area to the oncoming vehicle so that the controller selects a focus vehicle action selected from the group consisting of: stop the focus vehicle, proceed with the focus vehicle, and negotiation with the oncoming vehicle; and the display displays the virtual traffic information in accordance with the selection that displays the stop, proceed, and negotiation vehicle action.

7. The device of claim 6, wherein:
in response to the controller selection of the negotiation with the oncoming vehicle, the controller broadcasts negotiation information indicative of a vehicle ID of the focus vehicle, a prioritized condition, and a trafficable area, to succeeding vehicles and oncoming vehicles, via the V2VN; and
the controller selects the stopping of the focus vehicle or the proceeding of the focus vehicle based on the prioritized condition included in the negotiation information.

8. The device of claim 7, wherein the prioritized condition is based on the following: an obstacle location, a current or projected waiting time, whether the focus vehicle is ascending or descending in altitude, a count of succeeding vehicles, a traffic aspect selected from the group consisting of congestion and a traffic signal state on a road located ahead, and a duration in a wait state.

9. The device of claim 7, wherein a same prioritized condition is utilized by the focus vehicle and the oncoming vehicle so that agreement of the negotiation is reached without requiring an exchange of information.

10. The device of claim 6, wherein the controller determines a trafficable area in which all vehicles of a first vehicle train passing the obstruction area are allowed to pass the obstruction area without interruption while other vehicles of a second vehicle train from an opposite direction remain stopped.

11. The device of claim 5, wherein the controller further:
determines when a space area is available beyond the narrowing obstruction area; and
resulting from a determination that no space is available beyond the narrowing obstruction area, always selecting for the focus vehicle to stop until a determination is made that space is available beyond the narrowing obstruction area.

12. The device of claim 1, wherein the controller determines a propagating area in which an item of the area information is to be propagated to other vehicles.

13. A device associated with a focus vehicle, comprising:
a sensor that senses area information about an information area usable to assist the focus vehicle and an oncoming vehicle to pass each other;
a transmitter that broadcasts the area information via a vehicle-to-vehicle network (V2VN) protocol;
a controller that, in a basic assessment, produces an assisting result from the area information and vehicle information related to the focus vehicle and the oncoming vehicle, the vehicle information including first distance information of the focus vehicle from the information area, and second distance information of the oncoming vehicle from the information area wherein the controller produces the assisting result in:
a first assisting mode for wide roads primarily having a plurality of lanes that permit vehicles to pass by each other but that contain narrowing sections that obstruct all but one lane; and
a second assisting mode on narrow roads primarily having narrow sections of one lane that do not permit vehicles to pass by each other, but that contain widening sections where vehicles can pass by each other;

wherein:
in the first assisting mode, the controller compares a first distance from the information area to the focus vehicle and a second distance from the information area to the oncoming vehicle to select a focus vehicle action comprising:
stop the focus vehicle resulting from the first distance being much larger than the second distance, based on a predefined distance criterion;
proceed with the focus vehicle resulting from the second distance being much larger than the first distance, based on the predefined distance criterion; and
negotiation with the oncoming vehicle in other cases; and
a display that displays virtual traffic information in accordance with the result of the selection that differentiates the stop, proceed, and negotiation vehicle action;
wherein:
the display displays the virtual traffic information representing, in a driver perspective view, at least a stopping position at which the vehicle is to stop shown within a roadway, and proceeding of the focus vehicle onto a windshield of the vehicle;
the virtual traffic information comprises directional information showing a vehicle driver where to direct the focus vehicle and when to direct the focus vehicle as instructed;
the directional information includes data for a bird's-eye view that is a plan view comprising arrows, boxes, and lines that correspond with directions and positions shown within the roadway for the vehicle driver to move the focus vehicle; and
the driver perspective view and the bird's-eye view are displayed simultaneously.

14. The device of claim 13, wherein the controller:
receives a signal indicative of a trafficable area;
determines if the focus vehicle is within the trafficable area in which all vehicles of a first vehicle train passing an obstruction area are allowed to pass the obstruction area without interruption while other vehicles of a second vehicle train from an opposite direction remain stopped;
resulting from a determination that the focus vehicle is within the trafficable area and that room is available on an other side of the obstruction area, displaying a proceed result as the virtual traffic information.

15. The device of claim 13, wherein, in the second assisting mode:
the controller:
receives an oncoming vehicle passing point candidate (PPC) from the oncoming vehicle;
calculates a focus vehicle PPC;
calculates available space in the focus vehicle PPC;
responsive to available space in the focus vehicle PPC:
determines a final focus vehicle PPC; and
broadcasts information on the final focus vehicle PPC; and
the display displays information related to the final focus vehicle PPC.

16. A computer-implemented method for operating a focus vehicle device, comprising:
sensing area information with a sensor about an information area usable to assist the focus vehicle and an oncoming vehicle to pass each other;
broadcasting with a transmitter the area information via a vehicle-to-vehicle network (V2VN) protocol;

producing, with a controller, an assisting result from the area information and vehicle information related to the focus vehicle and the oncoming vehicle, the vehicle information including first distance information of the focus vehicle from the information area, and second distance information of the oncoming vehicle from the information area;

displaying, with a display, virtual traffic information representing, in a driver perspective view, at least stopping, at which the vehicle is to stop shown within a roadway, and proceeding of the focus vehicle onto a windshield of the vehicle;

a first assisting mode for wide roads primarily having a plurality of lanes that permit vehicles to pass by each other but that contain a narrowing obstruction area that obstructs all but one lane using a first set of operations; and a second assisting mode on narrow roads primarily having narrow sections of one lane that do not permit vehicles to pass by each other, but that contain widening sections where vehicles are able to pass by each other using a second set of operations that differ from the first set of operations;

wherein:

the virtual traffic information comprises directional information showing a vehicle driver where to direct the focus vehicle and when to direct the focus vehicle as instructed;

the directional information includes data for a bird's-eye view that is a plan view comprising arrows, boxes, and lines that correspond with directions and positions shown within the roadway for the vehicle driver to move the focus vehicle; and the driver perspective view and the bird's-eye view are displayed simultaneously.

17. The method of claim 16, further comprising, in the first assisting mode:

performing a basic assessment comprising:

comparing a first distance from the obstruction area to the focus vehicle and a second distance from the obstruction area to the oncoming vehicle; and selecting, by the controller, a focus vehicle action comprising: stop the focus vehicle, proceed with the focus vehicle, and negotiation with the oncoming vehicle; and displaying the virtual traffic information on the display in accordance with the result of the selecting that differentiates the stop, proceed, and negotiation vehicle action.

18. A computer-implemented method for operating a focus vehicle device, comprising:

sensing area information with a sensor about an information area usable to assist the focus vehicle and an oncoming vehicle to pass each other;

broadcasting with a transmitter the area information via a vehicle-to-vehicle network (V2VN) protocol;

producing, in a basic assessment operation using a controller, an assisting result from the area information and vehicle information related to the focus vehicle and the oncoming vehicle, the vehicle information including first distance information of the focus vehicle from the information area, and second distance information of the oncoming vehicle from the information area wherein the controller produces the assisting result in:

a first assisting mode for wide roads primarily having a plurality of lanes that permit vehicles to pass by each other but that contain narrowing sections that obstruct all but one lane; and a second assisting mode on narrow roads primarily having narrow sections of one lane that do not permit vehicles to pass by each other, but that contain widening sections where vehicles can pass by each other;

wherein:

in the first assisting mode, comparing a first distance from the information area to the focus vehicle and a second distance from the information area to the oncoming vehicle to select a focus vehicle action comprising:

stop the focus vehicle resulting from the first distance being much larger than the second distance, based on a predefined distance criterion;

proceed with the focus vehicle resulting from the second distance being much larger than the first distance, based on the predefined distance criterion; and negotiation with the oncoming vehicle in other cases; and displaying, with a display, virtual traffic information representing, in a driver perspective view, at least stopping and proceeding of the focus vehicle onto a windshield of the vehicle;

wherein:

the virtual traffic information comprises directional information showing a vehicle driver where to direct the focus vehicle and when to direct the focus vehicle as instructed;

the directional information includes data for a bird's-eye view that is a plan view comprising arrows, boxes, and lines that correspond with directions and positions shown within the roadway for the vehicle driver to move the focus vehicle; and the driver perspective view and the bird's-eye view are displayed simultaneously.

19. The method of claim 18, further comprising:

receiving a signal indicative of a trafficable area;

determining if the focus vehicle is within the trafficable area in which all vehicles of a first vehicle train passing an obstruction area are allowed to pass the obstruction area without interruption while other vehicles of a second vehicle train from an opposite direction remain stopped; and resulting from a determination that the focus vehicle is within the trafficable area and that room is available on an other side of the obstruction area, displaying a proceed result as the virtual traffic information.

20. The method of claim 18, further comprising, in the second assisting mode:

receiving an oncoming vehicle passing point candidate (PPC) from the oncoming vehicle;

calculating a focus vehicle PPC;

calculating available space in the focus vehicle PPC;

responsive to available space in the focus vehicle PPC:

determining a final focus vehicle PPC; and broadcasting information on the final focus vehicle PPC; and displaying information related to the final focus vehicle PPC.

* * * * *